US007635236B2

(12) United States Patent
Zhao et al.

(10) Patent No.: US 7,635,236 B2
(45) Date of Patent: Dec. 22, 2009

(54) IN SITU REMEDIATION OF INORGANIC CONTAMINANTS USING STABILIZED ZERO-VALENT IRON NANOPARTICLES

(75) Inventors: Dongye Zhao, Auburn, AL (US); Yinhui Xu, Lake Mary, FL (US)

(73) Assignee: Auburn University, Auburn, AL (US)

( * ) Notice: Subject to any disclaimer, the term of this patent is extended or adjusted under 35 U.S.C. 154(b) by 26 days.

(21) Appl. No.: 11/694,314

(22) Filed: Mar. 30, 2007

(65) Prior Publication Data
US 2007/0256985 A1 Nov. 8, 2007

Related U.S. Application Data

(60) Provisional application No. 60/872,616, filed on Dec. 1, 2006, provisional application No. 60/787,626, filed on Mar. 30, 2006.

(51) Int. Cl.
*B09B 1/00* (2006.01)
(52) U.S. Cl. .................. 405/128.75; 977/903; 588/319
(58) Field of Classification Search ............... 588/256, 588/319, 407, 412; 405/128.45, 128.5, 128.7, 405/128.75; 977/903
See application file for complete search history.

(56) References Cited

U.S. PATENT DOCUMENTS

| 6,719,902 | B1 | 4/2004 | Alvarez et al. |
| 6,777,449 | B2* | 8/2004 | Vance et al. ................. 516/35 |
| 2002/0006658 | A1* | 1/2002 | Horn et al. ............... 435/262.5 |
| 2002/0006867 | A1* | 1/2002 | Ponder et al. ............... 502/405 |
| 2003/0134409 | A1* | 7/2003 | Mallouk et al. ........... 435/262.5 |
| 2003/0217974 | A1* | 11/2003 | Uegami et al. ............... 210/722 |
| 2004/0069720 | A1 | 4/2004 | Clausen et al. |
| 2005/0051493 | A1 | 3/2005 | Hensman et al. |
| 2005/0133458 | A1 | 6/2005 | Gurol |
| 2005/0199556 | A1 | 9/2005 | Zhang |

FOREIGN PATENT DOCUMENTS

| WO | 03013252 | 2/2003 |
| WO | 2005014492 | 2/2005 |

OTHER PUBLICATIONS

Raveendran P, Fu J, Wallen SL. Complete "green" synthesis and stabilization of metal nanoparticles. J Am Chem Soc. 2003;125:13940-13941.*
He et al, "Preparation and Characterization of a New Class of Starch-Stabilized Bimetallic Nanoparticles for Degradation of Chlorinated Hydrocarbons in Water," 2005, pp. 3314-3320, vol. 39, Environ. Sci. Technol.

* cited by examiner

*Primary Examiner*—John Kreck
(74) *Attorney, Agent, or Firm*—Andrus, Sceales, Starke & Sawall, LLP

(57) ABSTRACT

A method for preparing highly stabilized and dispersible zero valent iron nanoparticles and using the nanoparticles as a remediation technology against inorganic chemical toxins in contaminated sites. The method employs a composition containing select polysaccharides (starch or cellulose) as a stabilizer for the iron nanoparticles in a liquid carrier, and results in suspensions of iron nanoparticles of desired size and mobility in water, brine, soils or sediments. The stabilizer facilitates controlling the dispersibility of the iron nanoparticles in the liquid carrier. An effective amount of the composition is delivered to a contaminated site so that the zero valent iron nanoparticles can remediate one or more toxins such as an arsenate, a nitrate, a chromate, or a perchlorate in the contaminated site.

22 Claims, 31 Drawing Sheets

IN SITU REMEDIATION OF INORGANIC CONTAMINANTS USING STABILIZED ZERO-VALENT IRON NANOPARTICLES

CROSS REFERENCE TO RELATED APPLICATIONS

This application claims priority from U.S. Provisional Patent Application Nos. 60/787,626, filed Mar. 30, 2006 and 60/872,616, filed Dec. 1, 2006.

BACKGROUND OF THE INVENTION

The present invention relates to mitigating the toxic effect of inorganic contaminants in contaminated sites, and more particularly, to using stabilized zero-valent iron nanoparticles for the in situ immobilization and/or remediation of toxic inorganic contaminants such as chromate ($CrO_4^{2-}$), perchlorate ($ClO_4^-$), nitrate ($NO_3^-$), and arsenate ($AsO_4^{3-}$) in water, brine, and soil.

Chromium has been widely detected in groundwater and soils, particularly at sites associated with metal plating, wood processing, leather tanning, metal corrosion inhibition, and pigment production. From 1987 to 1993, releases of various chromium compounds to land and water in the U.S. totaled nearly 200 million pounds (EPA, 2006). Compared to the much less soluble Cr(III) species, Cr(VI) species is much more mobile, toxic and carcinogenic. To reduce human exposure to chromium, the U.S. environmental Protection Agency (EPA) has set a maximum contaminant level (MCL) of 0.1 mg/L for total chromium in drinking water.

Traditionally, Cr(VI) is removed from water through reduction of Cr(VI) to Cr(III) using a reducing agent such as ferrous sulfate, sulfur dioxide, or sodium bisulfite, followed by precipitation as Cr(III). In recent years, researchers also demonstrated that Cr(VI) can be effectively reduced by Fe(II) according to the following generic reaction scheme:

$$Cr(VI) + 3Fe(II) \rightarrow Cr(III) + 3Fe(III) \quad (1)$$

Reduction of Cr(VI) to Cr(III) by powder or granular zero valent iron (ZVI) particles and non-stabilized or agglomerated nanoparticles has been investigated in a number of laboratory and field studies. For example, permeable reactive barriers (PRBs) with commercially available ZVI powder have elicited great interest for in situ treatment of groundwater contaminated with various redox active compounds including Cr(VI). A field-scale PRB using granular ZVI particles to remove Cr(VI) from groundwater was installed at the U.S. Coast Guard Support Center in North Carolina in June of 1996. After eight years of operation, the PRB remained effective for reducing more than 1,500 µg/L of Cr(VI) to less than 1 µg/L.

Metal reduction by zero-valent iron particles follows the general pseudo-first order equation (Ponder, et al, 2002):

$$v = kA_s[Me] \quad (2)$$

where v is the reaction rate, k is the rate constant ($M^{-1}m^2s^{-1}$), [Me] is the metal ion concentration (M), and $A_s$ is the specific surface area of the iron particles ($m^2/g$). Eqn (2) indicates that the reaction rate is directly proportional to the specific surface area of the ZVI particles. Consequently, reducing particle size is expected to greatly enhance the reaction rate exponentially. For example, reducing the particle size from 10 µm to 10 nm can potentially increase the specific surface area, and thus, the reaction rate, by six orders of magnitude. Ponder et al. (2000) tested a class of resin-supported ZVI nanoparticles (Ferragels, 10-30 nm in diameter) to reduce Cr(VI) in aqueous solutions, and they observed that the reduction of Cr(VI) is 20-30 times faster than the commercial iron filings or iron powder per unit mass of Fe applied. Cao and Zhang (2006) tested non-stabilized ZVI nanoparticles for reduction and immobilization of Cr(VI) in ore processing samples, and observed that the surface-area-normalized reaction rate constant of Cr(VI) reduction by the non-stabilized nanoparticles was about 25 times greater than that by iron powders (100 mesh).

However, ZVI nanoparticles prepared using traditional methods tend to either agglomerate rapidly or react quickly with the surrounding media (e.g. dissolved oxygen or water), resulting in rapid loss in soil mobility as well as reactivity. Because agglomerated ZVI particles are often in the range of micron scale, they are essentially not transportable or deliverable in soils, and thus, cannot be used for in situ applications.

To control nanoparticle agglomeration, various particle stabilizing strategies have been reported. Chen et al. (2004) prepared ZVI nanoparticles with cetylpyridinium chloride (CPC) as a stabilizer for nitrate removal from water. The nanoparticles were reported to have a specific surface area of 25.4 $m^2/g$. He and Zhao (2005b) prepared a new class of starch-stabilized bimetallic nanoparticles to degrade TCE and PCBs. The starched nanoparticles offered a surface area of about 55 $m^2/g$ (He and Zhao, 2005b). Schrick et al. (2004; 2002) observed that addition of hydrophilic carbon or poly (acrylic acid) as a supporting agent can enhance the permeability of ZVI nanoparticles in sand and soils.

More recently, He and Zhao (2005a and 2005b) and He et al. (2006) developed a technique for preparing stabilized palladized iron (Fe—Pd) nanoparticles by applying low concentrations of a starch or carboxymethyl cellulose (CMC) as a stabilizer. The stabilized nanoparticles exhibited marked soil mobility and greater reactivity when used for dechlorination of TCE or PCBs in water.

Perchlorate ($ClO_4^-$) has been primarily used in solid rocket fuels. It is also widely used in firework powder, roadside flares, airbag inflators, and fertilizers imported from Chile. Past massive application of perchlorate has left a contamination legacy. Perchlorate has been detected at about 400 sites in groundwater, surface water, soil or public drinking water in more than 35 states across the United States with concentrations ranging from 4 µg·$L^{-1}$ to more than 3.7 million µg·$L^{-1}$. Perchlorate has been also detected in milk and bottled water.

When ingested, perchlorate can alter the endocrine function by blocking iodide from entering a person's thyroid gland, thereby reducing the production of thyroid hormones. The adverse health effects are reported to be more profound for newborns, children, and pregnant women. A study from the U.S. Centers for Disease Control (CDC) found that of the 36 percent of U.S. women with low iodine intake, almost any amount of perchlorate exposure was linked to a significant change in levels of thyroid hormones. To reduce the related human exposure, the US EPA adopted a Drinking Water Equivalent Level (DWEL) of 24.5 µg·$L^{-1}$. Meanwhile, California adopted a public health goal of 6 µg·$L^{-1}$ and Massachusetts set the nation's first drinking water standard of 2 µg·$L^{-1}$ for perchlorate.

Perchlorate is highly water-soluble, non-complexing, non-volatile, and chemically stable. For its unique chemistry, it has been highly challenging to remove perchlorate from water by traditional water treatment approaches. In recent years, various treatment technologies have been developed and/or tested, including biological reduction (Logan et al., 2002; Min et al., 2004; Xu et al., 2003), ion-exchange (IX) (Gu et al., 2001; 2003; Tripp and Clifford, 2004; 2006; Xiong et al., 2006), tailored activated carbon sorption (Chen et al., 2005; Parette et al., 2005), filtration (Yoon et al., 2003), and chemical reduction (Moore et al., 2003; Gu et al., 2006). However, these technologies are constrained with some critical technical and economic drawbacks such as slow degradation kinetics and production of large volumes of concentrated process waste residuals. For instance, IX has been considered as one of the best available technologies for perchlorate removal. While many commercial IX resins can offer high perchlorate sorption capacity, regeneration efficiency of the IX resins has been found prohibitively poor. As a result, current IX processes are often used on a disposable basis (i.e. the resin is disposed of after only one service run) or, when resin regeneration is practiced, it will result in large volumes of spent regenerant brine. The spent regenerant is often characterized with high salinity (e.g. 6% or higher (w/w) NaCl), concentrated perchlorate, and/or mixture of concentrated acids and salts (1 M $FeCl_3$ and 4 M HCl). Because of the highly stressful conditions, biological treatment of the spent brine is rather challenging and very limited. Consequently, cost-effective technologies that can destroy perchlorate in fresh water and regenerant brine are in dire need.

In recent years, zero-valent iron (ZVI), has attracted increasing interest for abiotic dechlorination of chlorinated organic compounds (Wang and Zhang, 1997), removal of nitrate (Huang and Zhang, 2004; Yang and Lee, 2005), chromate (Wilkin et al., 2005), and arsenic (Kanel et al., 2006). Reduction of perchlorate using ZVI has also been explored by a number of researchers. For instance, Moore et al. (2003; 2005) investigated perchlorate removal by commercial iron filings (size=20-100 mesh, surface area=0.08-5.65 $m^2 \cdot g^{-1}$). Up to 66% of perchlorate (0.1 mM) was removed in 336 h at a high iron dosage of 1.25 $g \cdot mL^{-1}$. Gurol and Kim (2000) reported that UV light can accelerate the perchlorate reduction rate with a dose of 20 $g \cdot L^{-1}$ or higher metallic iron (size=100 mesh, surface area=0.74 $m^2 \cdot g^{-1}$). Oh et al. (2006a) reported that 98% of perchlorate in water was reduced by cast iron (surface area=1.29 $m^2 \cdot g^{-1}$) in 1 h at 200° C. via microwave heating and at pH 7.4. In another study, Oh et al. (2006b) reported that perchlorate in wastewater was completely removed by iron at an elevated temperature of 150° C. in 6 hours without pH control. Cao et al. (2005) observed that non-stabilized iron particles were able to degrade perchlorate at temperatures from 25 to 75° C. and determined an activation energy of 79.02±7.75 $kJ \cdot mol^{-1}$ for the reaction.

Because ZVI-based reactions are surface-mediated processes, increasing surface area of Fe(0) was found to increase the reaction rates (Wang and Zhang, 1997). It has been reported that decreasing the size of Fe(0) particles to the nanoscale can greatly enhance the reaction rates for perchlorate reduction (Cao et al., 2005) and nitrate removal (Yang and Lee, 2005). However, because nanoscale ZVI particles tend to agglomerate rapidly (in a few minutes), "nanoparticles" without a stabilizer are actually agglomerates or flocs of ZVI particles in the scale of micron or sub-millimeter.

To maximize the reactivity of Fe(0) nanoparticles, He and Zhao (2005) and He et al. (2007) modified the conventional water-based approach for preparing ZVI nanoparticles by applying a food-grade water-soluble starch or sodium carboxymethyl cellulose (CMC) as a stabilizer. Compared to conventional non-stabilized ZVI "nanoparticles", the stabilized nanoparticles displayed much greater surface area, superior physical stability and much faster TCE-dechlorination rates.

Nitrate contamination of groundwater is also a widespread environmental problem, and has been associated with agricultural land runoff, leaching of nitrogen fertilizers, concentrated animal feeding operations, food processing, and industrial waste effluent discharge. Each year, about 11.5 million tons of nitrogen is applied as fertilizer in agricultural areas of the United States. Commercial fertilizer uses in the United States increased by a factor of 20 between 1945 and 1985. Manure produced yearly by farm animals in the United States contributes an estimated 6.5 million tons of nitrogen. The National Research Council (NRC, 1994) reported that there were approximately 300-400 thousands of nitrate-contaminated sites in the United States.

Ingestion of nitrate in drinking water by infants can cause dangerously low oxygen levels in the blood. Nitrate-N concentrations of 4 mg/L or more in rural drinking water supplies have been associated with increased risk of non-Hodgkin's lymphoma. The US EPA has established a maximum contaminant level (MCL) of 10 mg/L nitrate as N (US EPA, 1995). Although nitrate concentration in natural groundwater is generally less than 2 mg/L, it is common for ground water in 10%-25% of the water-supply wells in large regions of the U.S. to exceed the MCL for nitrate.

Because of our tremendous dependence of groundwater, cost-effective remediation of nitrate-contaminated groundwater has been consistently sought for decades. Among the most cited technologies for nitrate removal are ion exchange (IX), biological denitrification, membrane process, and chemical reduction. Although IX-selective resin has been commercially available and IX is an EPA-designated best available technology, IX does not degrade nitrate but rather concentrates nitrate in spent regenerant brine, which demands further costly handling and treatment. Membrane process is another commonly used separation/concentration process. In addition to its prohibitive process cost, disposal of nitrate-laden membrane rejects remains to be a costly obstacle. Biological denitrification has been a rather mature technology for nitrate removal from municipal wastewater. However, it has not gained popularity in drinking water treatment for its slow kinetics under typical drinking water conditions, pH sensitivity, and unfavorable byproducts including taste and odor in the treated water. Thermal nitrate destruction requires an anaerobic condition at temperatures of 200-350° C. and pressures of 600-2800 psig and at pH 13 with the presence of reducing agents, such as ammonia, formate, urea, glucose, methane, and hydrogen. In recent years, a number of studies on reduction of nitrate by zero-valent-iron (ZVI) have been reported (Alowitz and Scherer, 2002; Choe et al., 2000; Huang and Zhang, 2004; Mishra and Farrell, 2005). According to these studies, nitrate is reduced to nitrite, nitrogen gas, and/or ammonia by ZVI following the one of more of the reactions below:

$$Fe^0 + NO_3^- + 2H^+ \rightarrow NO_2^- + Fe^{2+} + H_2O \quad (3)$$

$$NO_2^- + 3Fe^0 + 8H^+ \rightarrow 3Fe^{2+} + NH_4^+ + 2H_2O \quad (4)$$

$$4Fe^0 + NO_3^- + 10H^+ \rightarrow NH_4^+ + 4Fe^{2+} + 3H_2O \quad (5)$$

$$5Fe^0 + 2NO_3^- + 12H^+ \rightarrow N_2(g) + 5Fe^{2+} + 6H_2O \quad (6)$$

Eqn (3) was proposed by Alowitz and Scherer (2002) using iron powers (18-35 mesh) and Fisher Scientific iron fillings (40 mesh) under controlled solution pH (5.5-9.0). Eqn (4) was proposed by Huang et al. (1998) by assuming nitrite is one of the intermediate products of nitrate reduction. Eqn (5) was suggested to be the main nitrate reduction pathway when nanoscale zero-valent iron (BET specific surface area to mass ratio equal to 31.4 $m^2/g$) was used in anaerobic system under ambient conditions with no pH control (Choe et al., 2000).

Studies have demonstrated that solution pH plays an important role in nitrate reduction by $Fe^0$. Nitrate reduction by iron powder at near-neutral pH was negligible in an unbuffered system, but it was greatly enhanced in the presence of a pH buffer (Zhang and Huang, 2005; Cheng et al., 1997). Ruangchainikom et al. (2006) used a $CO_2$-bubbled system to create an acidic environment favorable to nitrate reduction and found that the bubbling of $CO_2$ flow rate at 200 mL/min was sufficient for supplying $H^+$ to these reactions.

Several strategies have been used to speed up nitrate reduction by ZVI including 1) iron surface pretreatment; 2) addition of selected cations; 3) deposition of a second metal on iron surface; 4) presence of ultraviolet (UV) light and hydrogen peroxide ($H_2O_2$); and 5) increasing ZVI surface area by preparing nanoscale ZVI. Liou et al., (2005a) pretreated iron powder (99.6%, electrolytic and finer than 100 mesh) surface with a flow of $H_2/N_2$ (20 vol %, 50 mL/min) and maintained at 400° C. for 3 hours to remove the surface passive oxide layers. With this pretreatment, nitrate reduction rate was doubled. Huang and Zhang (2005) found that adding certain selected cations ($Fe^{2+}$, $Fe^{3+}$, or $Al^{3+}$) in feed solution could significantly enhance nitrate reduction. A second metal, such as copper, was loaded onto iron surface as a catalyst for nitrate reduction. However, considerable amounts of nitrite were released (Liou et al., 2005a; 2005b).

Another effective strategy to enhance nitrate reduction by ZVI is to reduce the ZVI particle size, thereby increasing the particle surface area and reactivity. However, current iron nanoparticles, which are typically prepared following the classical borohydride reduction of ferrous or ferric ions in water, tend to agglomerate to large flocs (micrometer to millimeter scale) and precipitate in minutes. Because of the agglomeration, the unique advantage (e.g. high surface area and high reactivity) of nanoscale iron particles is diminished. To prevent the agglomeration, Chen et al. (2005) applied polyvinyl pyrolidine (PVP) and a cationic surfactant cetylpyridinium chloride (CPC) as stabilizers. When used for nitrate reduction, the stabilized iron particles were able to remove 60%-78% nitrate (20 mg/L as $NO_3^-$—N) within 10 hours at a iron dosage of 0.5 g/L (12.7 $m^2$/L) under pH 4-7. Recently, He and Zhao developed a new class of Fe—Pd bimetallic nanoparticles by modifying the conventional preparation approach by using an environment-friendly and low-cost starch and a food-grade cellulose (known as sodium carboxymethyl cellulose, NaCMC) as a stabilizer. The stabilized nanoparticles displayed both superior physical stability and much faster reactivity than their non-stabilized counterparts when used for degradation of chlorinated hydrocarbons (He and Zhao, 2005; 2006).

Compared to nitrate removal from fresh water, research on nitrate reduction in saline water has been very limited and remains in its exploratory stage. Biological denitrification has been found effective to denitrify nitrate in seawater (Labelle et al., 2005) and in ion exchange regenerant brine containing 1%-12.5% NaCl (Clifford and Liu, 1993b; Okeke et al., 2002; Peyton et al., 2001). However, Clifford and Liu (1993b) reported a 10% drop in denitrification rate in 0.5 N NaCl than in fresh-water controls a bench-scale biological reactor was used to treat ion-exchange brine and time for >95% denitrification was 8 hours. Earlier, Van der Hoek et al. (1987) reported a combined ion exchange/biological denitrification process for nitrate removal from ground water, in which nitrate was removed by ion exchange and the nitrate-laden regenerant brine was denitrified by a biological denitrification reactor. But a decrease in denitrification capacity was observed when high NaCl concentration (10-30 g/L) presented. Bench-scale sequencing batch reactors using activated sludge have been reported to remove a wastewater containing 36,000 mg/L $NO_3^-$ with ionic strength of 3.0 (18% total dissolved solids) and both nitrite and nitrate reduction rates reduced with increasing salinity (Glass and Silverstein, 1999). Peyton et al. (2001) reported specific nitrate reduction rate coefficients in a range from $1.20\times10^{-2}\pm7.22\times10^{-4}$ (L/h mg TSS) to $5.54\times10^{-3}\pm3.94\times10^{-4}$ (L/h mg TSS) depending on carbon sources in a pH 9 solution containing 12.5% NaCl. To date, there has been no research reported on the abiotic degradation of nitrate in saline water using stabilized ZVI.

Arsenic in soils and groundwater results from natural sources (e.g. natural geochemical reactions) as well as anthropogenic activities, such as mining, discharges of industrial wastes, military activities, and application of agricultural pesticides. Arsenic is ranked the second most common inorganic pollutant in the U.S. superfund sites. Arsenic-contaminated soils, sediments and waste slurry are major sources of arsenic in food and water. To mitigate the toxic effect on human health, the maximum contaminant level (MCL) for arsenic in drinking water was lowered from the previous 50 ppb to 10 ppb, effective in January 2006.

Arsenic is a redox active element, with As(V) or (III) being the two most common stable oxidation states in soils. In general, inorganic arsenic is more toxic than organic arsenic, and arsenic in soils is less bioavailable and less bioaccessible than As in water due to soil adsorption effect.

Arsenate can strongly interact with soils, especially, iron (hydr)oxides. Adsorption of arsenate by iron (hydr)oxides have been widely studied. These studies have focused on the adsorption and surface complexation of arsenic on the amorphous and crystalline iron oxide structures, such as ferrihydrite and goethite. The complexation between arsenate and iron (hydr)oxide surfaces has been known to be inner-sphere surface complexation as either monodentate sharing, bidentate sharing, or bidentate edge sharing complexes.

Laboratory-scale and field-scale studies have been reported on in situ remediation of As-contaminated groundwater by zero-valent iron (ZVI) (Nikolaidis et al. 2003; Su and Plus 2001; Su and Puls 2001) and iron oxides (Fendorf et al. 1997). They observed that ZVI can reduce the concentration of As in aqueous phase. Recently, nanoscale iron-based media (such as zero-valent iron) have been studied for potential uses in environmental remediation (Huber 2005; Jegadeesan et al. 2005; Zhang 2003). Because of the small particle size, large surface area, and high reactivity, these nanoscale materials have showed great potential for treatment of contaminated soil and groundwater (Chen et al. 2005; Joo et al. 2004; Yang and Lee 2005). Cumbal and Sengupta (Cumbal and Sengupta 2005) studied arsenic removal from water by hydrated iron oxides nanoparticles loaded on polymer-matrix, and the immobilized nanoscale iron oxides displayed high sorption capacity for both arsenite and arsenate. For arsenic removal in groundwater by iron-based nanoparticles, surface adsorption appears to be an important mechanism (Kanel et al. 2006). Compared to commercial iron powder or granular iron particles, ZVI nanoparticles offer much faster sorption kinetics and are more deliverable in the subsurface. Consequently, iron nanoparticles hold great potential to immobilize arsenic in situ in contaminated soil and groundwater.

However, as previously noted herein, because of the high reactivity and inter-particle interactions, ZVI nanoparticles tend to agglomerate rapidly, resulting in the formation of much larger aggregated particles and loss of reactivity and soil mobility. To prevent iron nanoparticle agglomeration, various particle stabilization strategies were reported (He and Zhao 2005; Ponder et al. 2001; Raveendran et al. 2003). He and Zhao (2005, 2006) reported a new method for synthesizing stabilized iron nanoparticles by using some low-cost and environmentally benign starch and cellulose as a stabilizer. The stabilized nanoparticles displayed much improved physical stability, soil mobility, and reactivity compared to non-stabilized iron particles.

To quantify relative As mobility and leachability in soil, two operationally defined measures, bioaccessibility and TCLP (toxicity characteristic leaching procedure) leachability, have been commonly used. Bioaccessibility is quantified by a physiologically based extraction test (PBET), which mimics the conditions in human stomach and essentially reflects an in vivo accessibility of As (Ruby et al. 1999). TCLP is an EPA-defined standard method for measuring extractability of various chemicals from solid wastes. Earlier, a number of researchers (Akhter et al. 2000; Jing et al. 2005; Miller et al. 2000) used TCLP tests to evaluate the leachability of As in contaminated soils.

Akhter et al. (2000) concluded that higher iron content in soil reduces the leachability of arsenic. Yang et al. (2002) observed that high iron content reduced the bioaccessibility of arsenic in soil.

SUMMARY OF THE INVENTION

The present invention provides a method for preparing highly stabilized and dispersible zero valent iron nanoparticles and using the nanoparticles as a remediation technology against inorganic chemical toxins in contaminated sites. The method employs a composition containing select polysaccharides (starch or cellulose) as a stabilizer for the iron nanoparticles in a liquid carrier, and results in suspensions of iron nanoparticles of desired size and mobility in water (surface water, ground water or fresh water), brine (especially from ion exchange processes), soils or sediments. The stabilizer facilitates controlling the dispersibility of the iron nanoparticles in the liquid carrier. An effective amount of the composition is delivered to a contaminated site so that the zero valent iron nanoparticles can remediate one or more inorganic chemical toxins such as an arsenate, a nitrate, or chromate or a perchlorate in the contaminated site.

The step of delivering the iron nanoparticle suspension to a contaminated site preferably comprises injecting, spraying or just mixing the nanoparticles into the contaminated site, which is typically a contaminated surface or subsurface zone or location, and which may comprise soil, sediment, ground water, solid wastes, brine, or surface water in order to promote the remediation of the inorganic chemical toxin. The iron nanoparticles react with the inorganic chemical toxin to transform, degrade or immobilize the toxin to a less toxic form. These zero valent iron nanoparticles can be easily delivered, e.g. sprayed, mixed and/or injected, to surface or sub-surface contaminated sites or zones. The nanoparticles can thus be applied in situ and are an especially effective method to completely transform and degrade inorganic chemical toxins in both fresh water and brine residue from ion exchange regeneration. The relatively high surface area, relatively high reactivity, and the ability to diffuse and disperse in water, soil, brine and sediment makes the stabilized iron nanoparticles disclosed herein ideally suited for the present method. The iron nanoparticles typically have a particle size ranging from about 1 nm to about 200 nm.

The composition includes about >80% by weight zero valent iron nanoparticles, preferably >95% by weight. The composition also includes about <20% by weight stabilizer. The iron nanoparticles are prepared in a water solution at a concentration ranging from 0.2 to 10 g/L. The preferred stabilizers are selected from the group consisting of water soluble starch, carboxymethyl starch, thiolated starch, aminated starch, sodium carboxymethyl cellulose, carboxymethyl chitosan, and mixtures thereof.

The herein described methods and compositions provide numerous advantages over traditional remediation technologies. First, the desired iron nanoparticles can be prepared with the aid of select low cost and environmentally friendly starch or cellulose as a stabilizer. Second, the stabilized iron nanoparticles can be directly injected, mixed or dispersed into contaminated sites such as ground water, surface water, fresh water, brine, soils or sediments, and the size, growth rate, and dispersibility of the nanoparticles can be controlled by manipulating the types and concentration of the stabilizer used. Third, the application of the nanoparticles will not pose any harmful effect on the local environment. These and other advantages can be discerned by those skilled in this art from the description set forth herein.

BRIEF DESCRIPTION OF THE DRAWINGS

In the drawings:

FIG. 5($a$) shows Total Cr; and FIG. 5($b$) shows Cr(VI); (Insets: close-up of Cr elution histories after 1.9 BV).

DETAILED DESCRIPTION OF THE INVENTION

Figure 1:
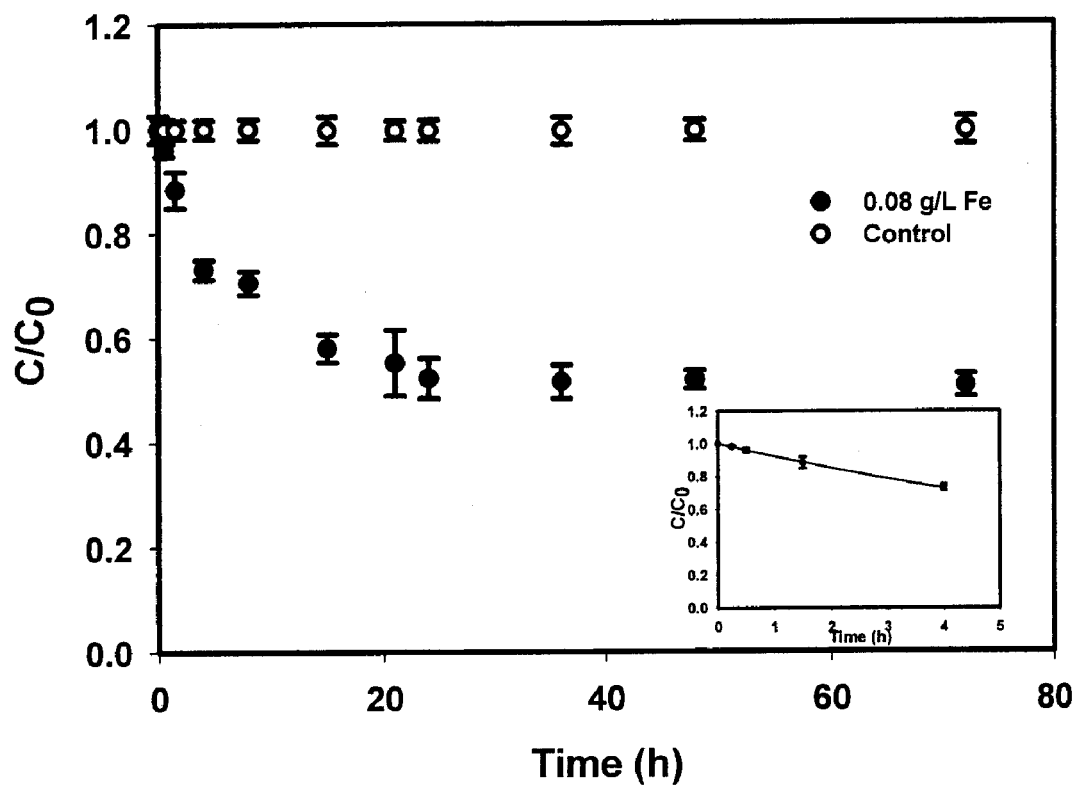
FIG. 1 is a graph illustrating reduction of Cr(VI) in water over time by CMC-stabilized Fe nanoparticles. NaCMC=0.2% (w/w); Fe=0.08 g/L; Initial Cr=34 mg/L. (Inset: Cr(VI) removal within the first 4 hours).

The present invention provides a method for preparing novel stabilized zero valent iron (ZVI) nanoparticles of controlled size, and using the iron nanoparticles as a remediation technology for immobilizing and/or degrading inorganic chemical toxins such as arsenates, nitrates, chromates or perchlorates in contaminated sites. The technology employs zero valent iron nanoparticles dispersed in a liquid carrier (water) and utilizes a stabilizer to control the dispersibility of the iron nanoparticles in the liquid carrier and in the targeted media (soils, sediments, water, brine, or solid and hazardous wastes). The nanoparticles are particularly advantageous because they have high surface area, are highly reactive with the inorganic chemical toxins to be remediated, and are readily able to be delivered in soils, sediments, brine and water to reach the contaminated sites or zones. Thus, the nanoparticles can be easily delivered, e.g. mixed, sprayed or injected, to surface or subsurface sites of contaminated solid wastes, soils, sediments, brine, ground water or surface water. The composition can be used in-situ to remediate the contaminated site.

The preferred metal nanoparticles useful in the present invention are zero valent iron ($Fe^0$) nanoparticles. Zero valent iron nanoparticles are highly stable, extremely insoluble in water, unavailable to biota, innocuous to the environment and extremely reactive with arsenates, nitrates, chromates and perchlorates. The preparation of the nanoparticles involves a water-based approach. In general, the zero valent iron nanoparticles are prepared in three steps. The first step is to prepare a dilute aqueous solution of a stabilizer, such as a water soluble cellulose or starch containing about 0.001% to about 1.0% (w/w/) of the stabilizer (preferably sodium carboxymethyl cellulose; i.e. NaCMC with a molecular weight from 5,000 to 500,000), preferably with nitrogen purged deionized water, while also preparing an aqueous solution containing 0.05 to 1 g/L as Fe of $Fe^{2+}$ containing 0.1 to 1.0 M $Fe^{2+}$ and/or of $Fe^{3+}$ containing 0.1 to 1.0 M $Fe^{3+}$, and adjusting the pH of the solutions between 6 and 7 with, for example, sodium hydroxide (NaOH). The $Fe^{2+}$ solution may, for example, be obtained by preparing an aqueous solution of Fe $SO_4.7H_2O$. The second step is to mix the two solutions together, and vary the stabilizer-to-Fe molar ration and/or types of stabilizer for preparing nanoparticles of desired concentration, size and dispersibility. The third step is to add stoichiometric amounts of an electron donor ($BH_4^-$) such as a sodium borohydride ($NaBH_4$) solution into the mixture of step 2 and allow for reaction for about 20 minutes under vacuum and at room temperature. Non-magnetic stirring should be employed during both steps 2 and 3. In Step 3, $Fe^{3+}/Fe^{2+}$ is reduced to Fe(0) with 1 to about 1.3 times stoichiometric amounts of sodium borohydride ($NaBH_4$). To ensure efficient use of the reducing agent and to preserve the reactivity of the resultant $Fe^0$ nanoparticles, the reactor system is operated under vacuum. The type and concentration of the stabilizer can be varied to optimize the preparation. The optimal nanoparticles will be determined based on: 1) reactivity for perchlorate and nitrate reduction in the target media; 2) cost; and 3) environmental friendliness.

To control the dispersibility of the nanoparticles, it is necessary to sue a stabilizer/dispersant to cap the nanoparticles. For environmental remediation uses, a novel stabilizer should possess the following essential attributes: 1) it can effectively facilitate dispersion of the nanoparticles; 2) it must not cause any harmful environmental effect; 3) it will not alter the conductivity of soils or sediments; and 4) it must be cost-effective.

In accordance with the present invention, it has been discovered that select low-cost, food-grade polysaccharides (e.g. starch and cellulose) and their derivatives can act as effective and "green" stabilizers to yield nanoparticles suitable for the in-situ uses. Zero valent iron nanoparticles of desired physical-chemical characteristics (size, dispersibility, mobility and reactivity) can be prepared with the aid of low cost and environmentally friendly starch or cellulose as a capping agent. These novel stabilizers are either commercially available or can be easily obtained by modifying native polysaccharides. These polyhydroxylated and/or polycarboxylated macromolecules possess some novel features, which may be valuable for stabilizing nanoparticles. First, they can serve as molecular level capsules to control the agglomeration or growth rate of the resultant nanoparticles and to yield a class of nanoparticles of controlled mobility and dispersibility. Second, they are much cheaper than virtually all other stabilizers tested so far (e.g. cost of a water-soluble starch is 0.17-0.46 $/lb. and 2.7 $/lb for sodium carboxymethyl cellulose, NaCMC). Third, they are environmentally benign and biodegradable. Fourth, there exists a tremendous pool of starch or cellulose products covering a wide range of physical and chemical characteristics (e.g. molecular weight, functionality), which offers great flexibility for preparing capped nanoparticles of desired characteristics.

Starch and cellulose are the most abundant polysaccharide members. As such, they are the preferred stabilizers.

The physical-chemical characteristics of nanoparticles are governed by four major factors, including a) particle size, b) surface properties, c) particle-solvent interactions, and d) particle-particle interactions. Accordingly, the present invention's strategy for preparing the "smart" nanoparticles is geared toward controlling the particle size and growth/agglomeration rate with the aid of select starch or cellulose as a capping agent or surface modifier.

Agglomeration of zero valent iron nanoparticles is a thermodynamically favorable process and can take place in a number of fashions, including a) Oswald ripening (i.e. smaller particles dissolve and are then consumed by larger particles), b) arrested precipitation (precipitation facilitated by the formation of nucleation centers), and c) direct interparticle interactions due to van der Walls forces, magnetic and electrostatic dipolar interactions. Agglomeration increases the particle size, thereby diminishing particle mobility in soils or sediments. However, in accordance with the present invention, the rate and degree of agglomeration of nanoparticles can be well controlled with the aid of low concentrations of starch or cellulose.

A capping or dispersing/stabilizing agent can regulate the size growth of nanoparticles through: a) electrostatic interactions (adsorption of charged stabilizer molecules to the metal core, resulting in an electrical double layer and Coulombic repulsion between capped particles), and/or b) steric stabilization (coating metal core with sterically bulky agents such as polymers impedes particle agglomeration).

The physical-chemical characteristics of the resultant nanoparticles can be affected by: a) the physical-chemical properties of the capping agents (e.g. molecular weight, structural orientation, and functionalities); b) concentration of the stabilizers (i.e., stabilizer: metal molar ratio); c) solution chemistry (pH and ionic strength); and d) temperature. For the nanoparticles of interest, solution chemistry and temperature should be compatible with the brine, subsurface and groundwater conditions. Therefore, the greatest flexibility in preparing the desired nanoparticles comes from the diverse choices of available starch or cellulose (e.g. the molecular weight for starch/cellulose ranges from a few thousands to 1 million).

Starch and cellulose are the most abundant polysaccharide members. As such, they are the preferred stabilizers/capping agents. Water soluble starch and water soluble cellulose (NaCMC) are the most preferred capping agents for preparing the nanoparticles. However, nanoparticles having different physical-chemical properties can be obtained with the aid of different capping agents, and thus Table 10 shows a list of useful polysaccharides for use as stabilizers or capping agents.

TABLE 10

A list of polysaccharides for modifying/capping nanoparticles.

| Name | Description | Molecular Weight | Functional Group | Commercial Availability | Reported Application as a Stabilizer for |
|---|---|---|---|---|---|
| Water Soluble Starch | A complex carbohydrate $(C_6H_{10}O_5)_x$ chief storage form of carbohydrate in plants | 5,000-750,000 | —OH | Yes | Ag, iron oxide, Te, and Fe nanoparticles |
| Carboxymethyl starch | Starch with —OH groups replaced by carboxymethyl groups | 10,000-500,000 | —OH, —COO$^-$ | Yes | N/A (Not available) |
| Thiolated Starch | Starch with —OH groups replaced by thiol groups | 10,000-500,000 | —OH, —SH | No | N/A |
| Aminated Starch | Starch with —OH groups replaced by quaternary amine groups | 25,000-30,000 | —OH Amine | Yes | Iron oxide nanoparticles |

TABLE 10-continued

A list of polysaccharides for modifying/capping nanoparticles.

| Name | Description | Molecular Weight | Functional Group | Commercial Availability | Reported Application as a Stabilizer for |
|---|---|---|---|---|---|
| NaCMC | A gummy water soluble cellulose | 60,000–700,000 | OH, $CH_3COO^-$ | Yes | Iron oxide, Ag, Se & Fe nanoparticles |
| CM-Chitosan | Carboxymethylated chitosan (a transformed polysaccharide) | >10,000 | $-NH_2$, $-OH$, $-COOO^-$ | Yes | Iron oxide nanoparticles |

The following key factors should be considered in the selection of a capping agent: a) molecular weight, size and their distribution; b) molecular structure (linear vs. globular); c) functional groups; d) degree of functionalization/substitution; e) viscosity; and f) water solubility. Molecular weight of the coating polymer plays a crucial role in stabilization of nanoparticles. For example, low-molecular-weight stabilizers may form coatings too thin to screen van der Waals forces, while high-molecular-weight stabilizers may bridge between particles to form flocs. It appears that the carboxymethyl groups in NaCMC facilitate sorption of the stabilizer to Fe(0) nanoparticles, resulting in improved stabilization.

Table 10 is not intended to be exhaustive, nor is every compound necessarily a suitable agent for all of the nanoparticles. Where comparable functional stabilizers are not commercially available, functionalization of select starch and cellulose can be carried out in a laboratory following the well-established procedures used for preparing various food-grade functionalized starch or cellulose derivatives.

Depending upon the stabilizer as well as the concentration and size of the iron nanoparticle to be prepared, about 0.001% to about 1.0% by weight (w/w) of the stabilizer should be incorporated into a composition containing the nanoparticles. The preferred amounts will typically be between about 0.001% to about 0.5% (w/w), and the most preferred amounts between about 0.001% to about 0.2% (w/w).

The composition containing the nanoparticles and stabilizer will also include from about 95% to about 99.9% (w/w) of a liquid carrier in which the nanoparticles are dispersed by the stabilizer. The liquid carrier is preferably water so that the composition is an aqueous solution, but other liquids could be employed so long as the liquid carrier is compatible with the stabilizer and nanoparticles, is environmentally friendly, and is relatively inexpensive.

In one preferred embodiment, the present invention provides a method for degrading a perchlorate in spent ion exchange (IX) brine and/or water (ground water, surface water and fresh water). Measuring the production rates of the intermediates and final chloride will provide direct evidence of the perchlorate degradation rates and completeness. Moderate heating to between about 50° C. and 90° C. can increase the degradation kinetics substantially.

In another preferred embodiment, the present invention provides a method for degrading a nitrate in spent ion exchange (IX) brine and/or water (ground water, surface water and fresh water). The stabilized zero valent iron ($Fe^0$) nanoparticles can degrade nitrates in brine/water highly effectively under ambient conditions. However, as with perchlorate degradation, moderate heating (50° C.–90° C.) will increase the degradation kinetics significantly.

In still another preferred embodiment, the present invention provides a method for in situ reductive immobilization of a chromate and/or arsenate in soils, water or other industrial wastes. Stabilized zero valent iron nanoparticles can reduce leachability of chromates and arsenates in soils by 90%, depending on the particle size and concentration used.

As used herein, the term "arsenate" refers to a salt or ester of an arsenic acid. Typically examples include lithium arsenate, sodium arsenate, potassium arsenate, magnesium arsenate, calcium arsenate, ammonium arsenate, lead arsenate, and mixtures thereof.

As used herein, the term "nitrate" refers to a salt or ester of nitric acid. Typical examples include lithium nitrate, sodium nitrate, potassium nitrate, magnesium nitrate, calcium nitrate, ammonium nitrate, lead nitrate, and mixtures thereof.

As used herein, the term "chromate" refers to a salt or ester of chromic acid. Typical examples include lithium chromate, sodium chromate, potassium chromate, magnesium chromate, calcium chromate, ammonium chromate, lead chromate, and mixtures thereof.

As used herein, the term "perchlorate" refers to a salt or ester of perchloric acid. Typical examples include lithium perchlorate, sodium perchlorate, potassium perchlorate, magnesium perchlorate, calcium perchlorate, ammonium perchlorate, lead perchlorate, and mixtures thereof.

In yet another preferred embodiment, the present invention provides for the recycling and reuse of brine treated with zero valent iron nanoparticles for regeneration of perchlorate and/or nitrate exhausted ion exchange (IX) resins. For the case of perchlorate brine, the nanoparticle treatment converts all perchlorate to chloride. The resultant $Cl^-$ is not only innocuous, but also compensates the chloride loss in the brine upon regeneration uses. The ferrous ions are fully soluble and will not interfere with the regeneration runs. Therefore, the treated brine can be reused for regeneration. After the reuse, the brine will contain both $ClO_4^-$ and $Fe^{2+}$ ions. This new brine can be treated following the same concept. However, the $Fe^0$ nanoparticles in this case will be produced by reducing the $Fe^{2+}$ ions in the spent brine with stoichiometric amounts of sodium borohydride in a sealed vessel. The resultant nanoparticles then destroy the perchlorate (note: despite the strong reducing power, sodium borohydride cannot reduce perchlorate). The treated brine is then reused for regeneration, and the loop goes on. Consequently, the process results in minimal amounts of waste residuals. The schematic of the proposed brine treatment and reuse process is as follows:

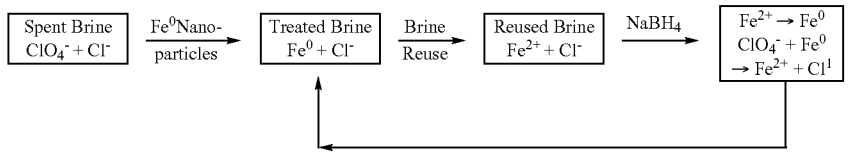

For the case of nitrate brine, both $Fe^{2+}$ and $NH_4^+$ ions are present in the treated brine. Again, both cations do not affect the regeneration of nitrate, and thus, the treated brine can be reused for regenerating nitrate-laden resin. After the reuse, $Fe^{2+}$ can be reduced by borohydride to form the $Fe^0$ nanoparticles in-situ in the same manner as for perchlorate. The $Fe^0$ nanoparticles then reduce nitrate to ammonium. As the treated brine is repeatedly used, the ammonium in the brine is further concentrated. The concentrated ammonium can then be removed from the brine via the following reaction:

$$Mg^{2+}+NH_4^-+PO_4^{3-}+6H_2O \rightarrow MgNH_4PO_4^{3-}.6H_2O K_{sp}=3\times10^{-13}$$

This reaction has been widely studied for phosphate removal from wastewater, and is highly effective by adding stoichiometric amounts of magnesium chloride and sodium phosphate. The resultant struvite is a valuable, slow-release fertilizer. As a result, almost no process waste is produced in the process.

Cost-effective treatment of IX brine is of critical importance to the overall process feasibility. For nearly a decade, researchers have been exploring technologies to transform nitrate or perchlorate in spent IX brine or saline water. However, all reported approaches so far as limited to biological processes, which employ certain types of salt-tolerant microorganisms. While various degrees of perchlorate and nitrate reduction have been reported, long-term process stability and viability remain under investigation (especially for perchlorate). Studies on abiotic degradation of perchlorate and nitrate have been limited only to fresh water. For examples, researchers have reported degradation of perchlorate and nitrate using powder $Fe^0$ particles or non-stabilized $Fe^0$ "nanoparticles". However, no research has been reported on abiotic treatment of perchlorate-or nitrate-laden brine or saline water.

This innovative abiotic technology employs a new class of stabilized $Fe^0$ nanoparticles for rapid and complete destruction of perchlorate and nitrate in spent IX brine or saline water. The most distinctive innovation of this technology includes: First, it employs a new class of starch-or cellulose-stabilized $Fe^0$ nanoparticles. The nanoparticle stabilizing technique represents a substantial advancement in preparing $Fe^0$ nanoparticles suitable for various environmental cleanup uses, and can prevent the $Fe^0$ "nanoparticles" from agglomerating to larger "flocs" and thereby preserve the maximum reactivity of the nanoparticles. Second, this maybe the first study of an abiotic approach for degradation of perchlorate and nitrate in salt water. Third, compared to biological processes, this proposed technology offers some key advantages, including a) it degrades perchlorate or nitrate much faster and completely, and thus, requires a much smaller reactor size and results in no harmful intermediate by-products, b) it does not produce any process wastes, c) it is more viable and stable, and d) it requires no sophisticated operation and maintenance.

EXAMPLE 1

The overall goal of this experiment was to test the feasibility of using the CMC-stabilized ZVI nanoparticles developed by He et al. (2006) for in situ reductive immobilization of Cr(VI) in contaminated soils. The specific objectives of this work were to: (1) test the CMC-stabilized nanoparticles for reducing and removing Cr(VI) in water and in a sandy loam soil slurry under various experimental conditions, and (2) test the stabilized nanoparticles for reductive immobilization of Cr(VI) in a contaminated sandy loam through fixed-bed column elution experiments.

1. Materials and Methods

Chemicals of analytical grade or higher were used in this research, including iron(II) sulfate heptahydrate (FeSO4.7H20, Acros Organics, Morris Plains, N.J., USA), sodium borohydride (NaBH4, ICN Biomedicals, Aurora, Ohio, USA), sodium carboxymethyl cellulose (CMC, Acros Organics, Morris Plains, N.J., USA), sodium chromate tetrahydrate (Na2Cr04.4H2O, Aldrich, Milwaukee, Wis., USA), and 1,5-diphenylcarbohydrazide and acetone (Aldrich, Milwaukee, Wis., USA).

A sandy loam soil, obtained from a local farm in Auburn Ala., was used in this study. Before use, the raw soil was sieved with a 2 mm standard sieve. The soil contains 0.43% of organic matter and was initially free of chromium. Cr(VI) was loaded to the soil by equilibrating 1 L of a solution containing 315 mg/L Cr(VI) (in $Na_2CrO_4.4H_2O$) with 180 g of an air-dried soil sample in a batch reactor at pH 6.5 (pH was maintained at pH 6.5 by intermittent adjusting using 1 N HCl or 1 N NaOH solution), which resulted in a 83 mg/kg Cr(VI) uptake in the air-dried soil.

The stabilized ZVI nanoparticles were prepared in water by reducing Fe(II) to Fe(0) using BH4" in the presence of CMC as a stabilizer. Detailed preparation procedures were reported elsewhere (He and Zhao, 2005b; He et al, 2006). In brief, a stock FeSO4 solution was added to a CMC solution to yield a solution with a desired concentration of Fe (0.04-0.12 g/L) and CMC (0.2%, w/w). Then, NaBH4 stock solution was added to the flask dropwise through a burette and at 1.4 times the stoichiometric amount. The stabilized Fe suspension was then sealed and stored for 20 minutes before every use.

The stabilized ZVI nanoparticles were then tested in batch experiments for reduction of Cr(VI) in water. Batch kinetic tests were carried out with a pool of twenty 15-mL glass vials. The reaction was initiated by injecting a Cr(VI) stock solution (Cr=440 mg/L) into 15 mL of the Fe nanoparticle suspension, which resulted in an Fe concentration of 0.08 g/L and an initial Cr(VI) concentration of 34 mg/L. Zero headspace was maintained in all vials. The mixtures were then shaken on a rotator at 30 rpm. At pre-determined times duplicate vials were sacrificed for analysis. The solutions were transferred to centrifuging tubes and centrifuged at 5,000 g-force with a high-speed centrifuge (AcuuSpin™ 400, Fisher Scientific, Pittsburgh, Pa., USA) for 10 minutes. The supernatant was then analyzed for total Cr as well as Cr(VI), and the Cr(VI) reduction rate was calculated based on mass balance calculations. The initial and final pH was measured. A control test was conducted in parallel with DI water and under otherwise identical conditions. All the experimental points were duplicated to assure data quality.

To study the effect of ZVI dose on the reduction of Cr (VI) in water, parallel batch experiments were carried out at an Fe concentration of 0.04 g/L, 0.08 g/L, and 0.12 g/L, respectively, and under otherwise identical conditions. The reaction was initiated by injecting a Cr(VI) stock solution (Cr=440 mg/L) into 15 mL of the Fe nanoparticle suspension in the 15-mL glass vials, which resulted in an initial Cr(VI) concentration of 34 mg/L and zero head space in the vials. Control tests in the presence of CMC or sodium borohydride but without the nanoparticles were also carried out. The mixtures were allowed to react for 48 hours to reach equilibrium. Then, the solutions were transferred to centrifuging tubes and centrifuged at 5,000 g-force. The concentration of total Cr and Cr (VI) were analyzed. All the experimental points were duplicated.

The reduction kinetics of Cr(VI) preloaded onto the soil by Fe-nanoparticles was tested in both batch and column experiments. The batch kinetic tests were carried out at an initial pH of 9.0. The experimental set consisted of twenty 15-mL centrifuge tubes, each of which received 1.5 g of the Cr(VI)-loaded soil and 15 mL of a nanoparticle suspension (Fe=0.08 g/L) (soil:solution=1 g: 10 mL). At predetermined times, duplicate tubes were centrifuged at 5,000 g-force, and the supernatant was analyzed for total Cr and Cr(VI). Control tests were carried out in the absence the nanoparticles but under otherwise identical conditions.

To further study the effect of treatment pH on Cr(VI) reduction and immobilization in the Cr-contaminated soil, the Cr-loaded soil samples were amended with the nanoparticle suspension at an initial pH 9.0, 7.0, and 5.0, respectively, and at a soil-to-solution ratio of 1 g:10 mL. The mixtures were allowed to react for 24 hours. Upon centrifuging at 5,000 g-force for 10 min, supernatants were sampled and analyzed for total Cr and Cr (VI).

To test the effectiveness of the CMC-stabilized Fe nanoparticles for in situ reductive immobilization of Cr(VI), fixed-bed column experiments were conducted. The column setup consisted of an HPLC pump (Series II-Acuflow), a glass column (inner diameter of 1.0 cm and length of 10 cm; Omnifit, Cambridge, England) with adjustable headspace (Omnifit, Cambridge, England), and a fraction collector (Eldex Laboratories, Napa, Calif.). Five grams of the Cr(VI)-loaded soil were packed in the column, which resulted in a soil bed volume (BV) of 3.14 mL. The hydraulic conductivity of the soil bed was measured to be 0.25 cm/min. The Cr(VI)-laden soil was then treated by passing about 5.7 BVs of the Fe nanoparticle suspension (Fe=0.06 g/L and pH=5.6) through the soil bed in an up-flow mode. The flow rate was kept constant at 0.15 mL/min, which translates into an empty bed contact time (EBCT) of 21 minutes and a superficial velocity (SLV) of $4.2 \times 10^{-5}$ m/s. A control column test was also performed in parallel but using deionized water and CMC at pH 5.6 as the influent. The concentration of total Cr and Cr(VI) in the effluent was then followed. To quantify the transportability of the Fe nanoparticles through the soil bed, the concentration of total Fe in the influent and effluent was also analyzed and compared.

To investigate the transport behavior of reduced Cr, i.e. Cr(III), in the soil over an extended distance, an additional two-beds-in-series column run was carried out. The two beds were prepared by adding an additional 5.0 g of the Cr-free but otherwise the same soil on top of 5.0 g of the Cr-loaded soil bed. The same ZVI suspension or DI water was then passed through the beds following the same procedures as in the one-bed column experiments. The Cr concentration history at the exit of the two-bed column was followed and compared with that from the single-bed column run.

The effectiveness of the stabilized ZVI nanoparticles for Cr immobilization was quantified by comparing the leachability of Cr in the soil before and after the nanoparticle treatment. The leachability was determined following the EPA TCLP method (EPA method 1311) as well as the California Waste Extraction Test (WET, California HML Method 910). In the TCLP tests, the so-called Fluid #1 was used as the extractant. Typically, air-dried soil samples were mixed with the TCLP fluid at a solid-to-solution ratio of 1 g to 20 mL. The mixtures were then rotated on an end-to-end rotator at 30 rpm and at room temperature (21±1° C.) for 19 hours and then centrifuged at 500 g-force for 20 min. The supernatant was then collected and filtered with 0.45 pm membranes. The filtrate was then acidified to pH <2.0 with 1 N HNO3 and analyzed for Cr concentration. In the WET tests, air-dried soil samples were extracted with a stronger citric acid solution for 48 hours at a solid-to-solution ratio of 1 g to 10 mL on a rotating shaker. The mixtures were then centrifuged at 5,000 g-force for 20 min, and the supernatants filtered with 0.45 μm membranes. The filtrate was then acidified with 5% (v/v) nitric acid, and analyzed for Cr.

Total Cr was analyzed using a graphite atomic absorption spectrophotometer (GF-AA, Perkin Elmer 3110). Cr(VI) was analyzed following the standard 3500-CrB. Colorimetric Method (Clesceri et al. 1998), which employed a UV-Visible spectrophotometer (HP 8453) operated at 540 nm wavelength. Total Fe was analyzed using a flame atomic-absorption spectrophotometer (FLAA, Varian model 220FS).

2. Results and Discussion 2.1. Reduction and Removal of Cr(VI) in Water

FIG. 1 shows the batch kinetic data during reduction of Cr(VI) by CMC-stabilized ZVI nanoparticles at an initial pH of about 9.0. The final pH was 9.2 to about 9.4 for all the points. For comparison, results from the control tests are also plotted in FIG. 1. It is evident that at an Fe dose of 0.08 g/L (about 2.3 times stoichiometric amount), about 53% of 34 mg/L of Cr(VI) was reduced at equilibrium, which as reached after about 36 hours of reaction. The control tests did not show any reduction.

It has been proposed that elemental Fe reduces Cr(VI) to Cr(III) following the stoichiometry below,

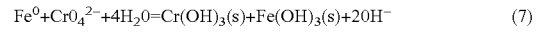

$$Fe^0 + CrO_4^{2-} + 4H_2O = Cr(OH)_3(s) + Fe(OH)_3(s) + 2OH^- \qquad (7)$$

In the absence of a stabilizer, the resultant Cr(OH)3 is a sparingly soluble precipitate ($K_{sp}$ $6.3 \times 10^{-1}$), and thus, can be easily separated from water. In addition, Cr(III) can also be precipitated via the formation of Fe(III)-Cr(III) hydroxide according to Eqn (8)

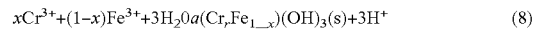

$$xCr^{3+} + (1-x)Fe^{3+} + 3H_2Oa(Cr_xFe_{1-x})(OH)_3(s) + 3H^+ \qquad (8)$$

where x is equal to 0.75. The solubility of $Cr_xFe_{i-x}(OH)3$ is lower than that of Cr(OH)3 Alternatively, Cr(III) may also precipitate in a form of $Cr, Fe_{1-x}$, OOH. In the presence of CMC, the particle agglomeration and precipitation may be somewhat inhibited. However, CMC is vulnerable to biodegradation and/or hydrolysis, and can be decomposed in days to weeks. Once decomposed, its particle stabilizing ability is ceased. Consequently, any residual fine precipitates will be separately. On the other hand, the lifespan of CMC is long enough to sustain the desired reductive uses of the stabilized ZVI nanoparticles.

The initial (<4 hours) reduction rate of Cr(VI) can be described by a pseudo-first order kinetic model:

$$\frac{d[C]}{dt} = -k_{obs}[C] \quad (9)$$

where C is the concentration of Cr(VI) in water (mg/L), t the time (h), and $k_{b}$, the observed first-order rate constant (h$^{-1}$). The value of $k_{o}b_{s}$ was determined to be 0.08 h$^{-1}$ by fitting the solution of Eqn (9) to the initial reduction rate data of Cr(VI) in FIG. 1. Similar approach was also used by Alowitz and Scherer (2002) and Ponder et al. (2000) for determining the initial rate constant. The observed value of k, b$_s$ in this study is lower than the reported 1.18 h$^{-1}$ where a resin supported Fe was employed at an Fe-to-Cr molar ratio of 8:1 (Ponder, et al., 2000), which is about 3.5 times greater than the Fe dose used in FIG. 1. It was reported that the rate constant increases linearly with increasing Fe-to-Cr molar ratio (Alowitz and Scherer, 2002; Ponder et al., 2000).

The fact that the ZVI nanoparticles at a dose of about 2.3 times greater than the stoichiometric quantity degraded only 53% of Cr(VI) at equilibrium indicates that a good fraction of the reductive reactivity of Fe is consumed by side reactions. The reactivity loss is attributed to unusually greater reactivity of the Fe nanoparticles especially when they are fresh. In addition to the reaction with the targeted Cr(VI), the ZVI nanoparticles also react with water via:

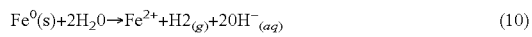

$$Fe^0(s)+2H_2O \rightarrow Fe^{2+}+H2_{(g)}+2OH^-_{(aq)} \quad (10)$$

Although the resultant hydrogen and Fe$^{2+}$ remain to be strong reducing agents, they are not strong enough to reduce Cr(VI) under the experimental conditions. As a result, this side reaction can considerably diminish the reaction rate and extent of Cr(VI) reduction.

It should be noted that the CMC molecules in the system not only stabilize the Fe nanoparticles, they can also complex with the resultant Cr$^{3+}$ and Fe$^{3+}$ ions and their metal hydroxide precipitates. The initial pH of the solution in the batch tests was about 9.0, and the final pH was increased to 9.2 to about 9.4, which was high enough to precipitate Cr(OH)$_3$ (K$_{sp}$ of 6.3×10$^{-31}$) and Fe(OH)$_3$ (K$_{sp}$ of 4×10$^{-38}$). However, no precipitation was observed during the reaction.

Figure 2:
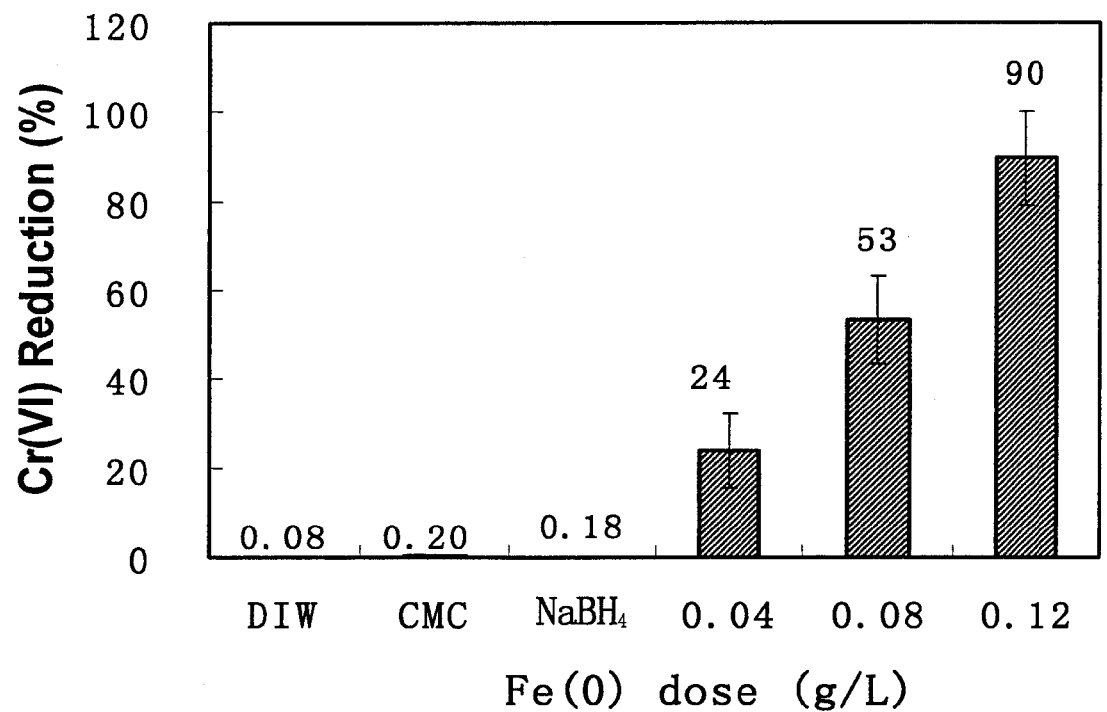
FIG. 2 is a graph illustrating Cr(VI) reduction as a function of dosage in the presence of CMC, borohydride, and various concentration of CMC-stabilized Fe nanoparticles.

To further test the effect of nanoparticle dose on the extent of Cr(VI) reduction, parallel batch experiments were carried out at an Fe concentration of 0.04 g/L, 0.08 g/L, and 0.12 g/L, respectively, and under otherwise identical conditions. Control tests in the presence of CMC or sodium borohydride were also carried out. As shown in FIG. 2, after 48 hours reaction, sodium borohydride did not show any reduction of Cr(VI). In contrast, as the Fe dosage was increased from 0.04 g/L to 0.12 g/L, the percentage removal of Cr(VI) increased from 24% to 90%. Evidently, at an Fe dosage of about 3.4 times the stoichiometric amount, the stabilized nanoparticles can reduce over 90% Cr(VI) under ambient conditions, i.e. one gram of the stabilized ZVI nanoparticles can reduce 252 mg Cr(VI) in water. This number is 20 times greater than that observed by Ponder et al. (2000) who reported that one gram of resin-supported ZVI nanoparticles reduced only 12.6 mg Cr(VI) at an Fe dosage of >8 times the stoichiometric amount for 8 days. Cao and Zhang (2006) reported that one gram of non-stabilized Fe nanoparticles was able to reduce 84.4-109 mg Cr(VI) in the groundwater. Evidently, the CMC-stabilized Fe nanoparticles are much more powerful in reducing Cr(VI). The control tests did not show any reduction, indicating borohydride or hydrogen in water could not reduce Cr(VI), or the reduction was due to the ZVI nanoparticles.

2.2 Reduction of Cr(VI) Sorbed in Soil

Figure 3:
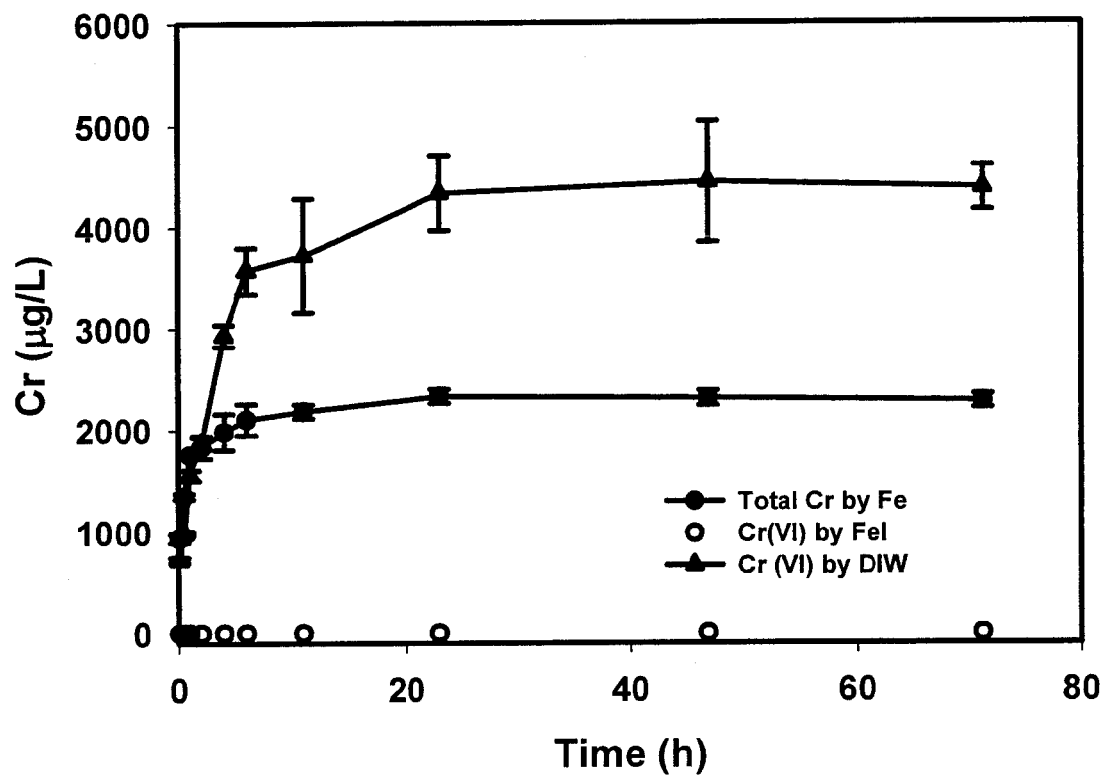
FIG. 3 is a graph illustrating leaching of Cr(III) or Cr(VI) from a contaminated loamy sand soil over time in nanoparticle suspension (Fe=0.08 g/L) or DI water. (Solution volume=15 ml; Soil=1.5 g; Initial Cr in soil=83 mg/kg).

The effectiveness of the stabilized Fe nanoparticles for reduction of soil-sorbed Cr(VI) was tested in a series of batch experiments. FIG. 3 shows the transient release of total Cr or Cr(VI) when 1.5 g of a Cr(VI)-laden soil sample was mixed with 15 mL of the nanoparticle suspension containing 0.08 g/L Fe and at an initial pH of 9.0. For comparison, Cr(VI) desorption kinetic data in DI water at pH 9.0 are also superimposed in the FIG. 3. At equilibrium, which was reached in about 21 hours for all cases, about 36% of preloaded Cr(VI) was desorbed from the soil when the nanoparticles were absent. In contrast, when 0.08 g/L Fe nanoparticles were present, about 18% of the pre-loaded Cr(VI) was released, however, no Cr(VI) was detected in the aqueous phase. This observation indicates that a small dose of the stabilized nanoparticles was able to not only reduce the Cr(VI) leachability, but also completely transform all Cr(VI) to Cr(III), which is much less toxic.

Figure 4:
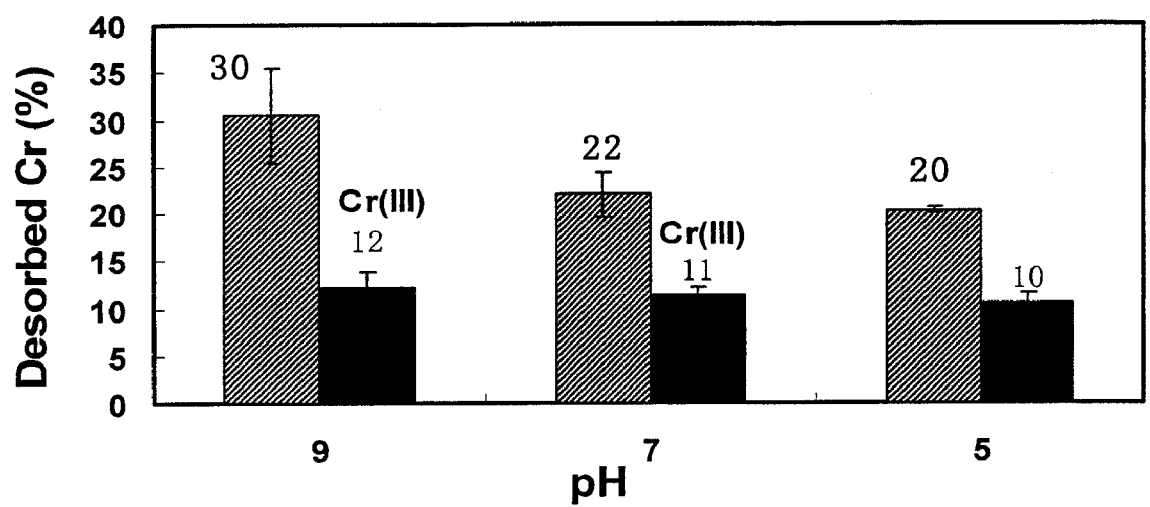
FIG. 4 is a graph illustrating Cr(VI) leached from a contaminated loamy sand soil as a function of pH in nanoparticle suspension (Fe=0.08 g/L) or DI water at pH 9.0, 7.0 and 5.0. (Soil=1.5 g; Solution=15 ml: Initial Cr in soil=83 mg/kg).

To assess the effect of solution pH on Cr(VI) reduction and immobilization in contaminated soil, soil samples were amended with the nanoparticle suspension at initial pH 9.0, 7.0, and 5.0, respectively. FIG. 4 shows that the percentage of Cr released from the soil at equilibrium at the three initial pH levels and in the presence or absence the Fe nanoparticles. As the solution pH was decreased from 9.0 to 5.0, the DI-water desorbed Cr(VI) was reduced from 30% to 20%. This observation is not surprising given that at higher pH, soil sorption sites become more negative and OH$^-$ ions compete more fiercely with CrO$_4^{2-}$ for the binding sites. However, when Fe nanoparticles are present, the total leachable Cr was reduced to <12% (i.e. a reduction of >50%) over the pH range of 5.0 to about 9.0, and all desorbed Cr was detected as Cr(III). In addition, desorption of Cr from the treated soil was much less pH dependent, and the total Cr release was only changed by less than 2% when pH was shifted from 9.0 to 5.0. The reduced pH dependence is attributed to the added sorption capacity from Fe addition and the stabilizing effect of CMC, which prevents the resultant Cr$^{3+}$ from being precipitated until CMC molecules are broken down. Earlier, Cao and Zhang (2006) claimed that the soil-sorbed ZVI may also facilitate long-term immobilization of Cr.

2.3 Reductive Immobilization of Cr(VI) in Soil: Column Tests

Figure 5A:
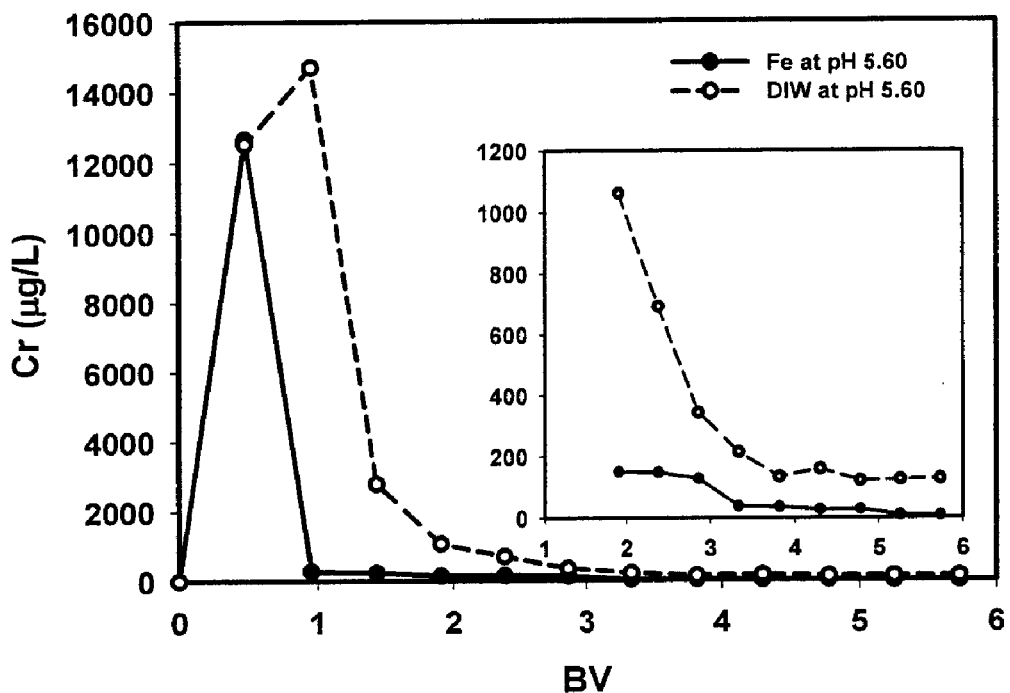
FIGS. 5($a$) and 5($b$) are graphs illustrating Cr elution histories during two separate column runs using nanoparticle suspension (Fe=0.06 g/L) or DI water at an influent pH 5.6.
Figure 5B:
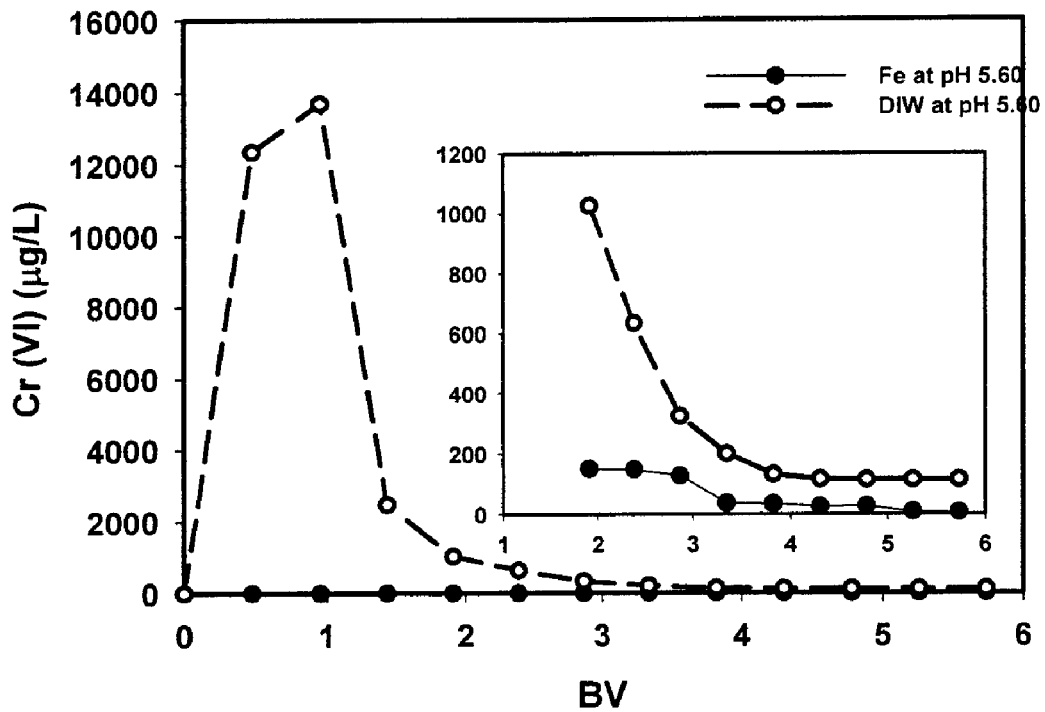

To facilitate the in situ application of the Fe nanoparticles, some key technical criteria must be satisfied, including 1) the Fe nanoparticles must be mobile or deliverable in soils, and 2) the application of the CMC-stabilized Fe nanoparticles must not cause any more mobilization/dissolution of Cr than groundwater as in the natural subsurface environment. To address these issues, the Fe nanoparticles are also applied for treating the Cr-laden soil in a set of fixed-bed column experiments. FIG. 5 shows the chromium elution histories during two separate column runs when 0.06 g/L Fe nanoparticle suspension at pH 5.60 or DI-water was pumped through the Cr-loaded soil bed under otherwise identical conditions. As shown in FIG. 5(a), the elution of total Cr with DI water displayed a much higher and broader peak as well as a longer tailing than with the Fe nanoparticle suspension. Mass balance calculation revealed that DI water eluted a total of about 12% of the pre-sorbed Cr(VI), while the Fe suspension leached only about 4.9%, a 59% reduction. When plotted as Cr(VI), FIG. 5(b) shows that the Fe nanoparticle suspension essentially eluted no chromate, i.e. the Fe nanoparticles converted all of the 4.9% Cr(VI) eluted from the soil bed to Cr(III) during the treatment.

The influent pH for both DI water and the nanoparticle suspension was kept at 5.6 (FIG. 5). In both cases, the effluent pH was in the range of 5.2 to 5.7. In this pH range and when CMC were present, $CrOH^{2+}$ and Cr-CMC complexes would be the predominant species of $Cr^{3+}$ (Rai and Zachara, 1986) and the maximum soluble Cr(III) would be about 8.2 mg/L based on the $K_{sp}$ value for Cr(OH)3. The fact in FIG. 5 that the peak Cr concentration exceeded the solubility limit indicated that the presence of CMC also increased Cr(III) solubility. However, in the presence of CMC-stabilized Fe nanoparticles, the peak dropped abruptly within one BV to <0.28 mg/L and to <0.007 mg/L after 5 BV's of the nanoparticle suspension was passed. This observation indicates that the transformed Cr(III) is not only much less toxic but also much less mobile than Cr(VI) even in the presence of CMC. From a practical application standpoint, the food-grade CMC is highly biodegradable and vulnerable to hydrolysis. It is expected that CMC molecules will be broken down in weeks to months, which is long enough for their desired function. The mobility of Cr(III) is expected to be further diminished as CMC molecules are degraded.

Figure 6:
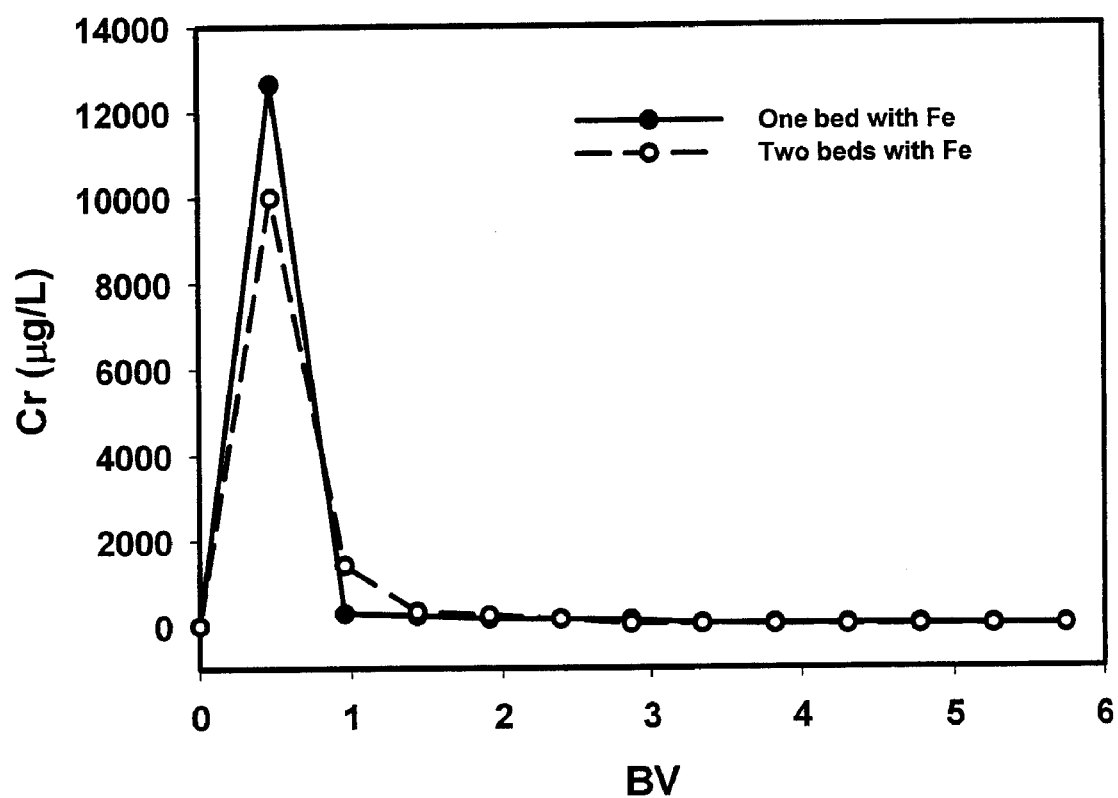
FIG. 6 is a graph illustrating Cr elution histories during two separate column runs with one or two beds during treatment with nanoparticle suspension (Fe=0.06 g/L; pH=5.6).

In addition, it is expected that the transformed Cr(III), either in the form of fine precipitates or associated with the oxidized Fe nanoparticles, is subject to natural filtration effect as it travels through the neighboring soil. This effect is clearly evident from the results shown in FIG. 6, which indicates that when the treatment soil bed in FIG. 5 was followed by an equal-volume clean soil bed, the peak concentration was suppressed by >21%. Apparently, in the presence of the nanoparticles, Cr(III) can be retained by the soil by either filtration effect or other processes such as surface sorption.

To compare the physico-chemical availability of Cr in the soil before and after the nanoparticle treatment, Cr leachability tests were performed following the standard TCLP approach (EPA method 1311) and WET (California HML Method 910). The equilibrium Cr concentration in the TCLP extractant was 0.4 mg/L for the untreated soil. In contrast, when the same soil was treated with about 5.7 BVs of the Fe nanoparticle suspension at pH 5.60 (FIG. 5), the TCLP-leached Cr concentration was reduced to 0.04 mg/L, i.e. the brief treatment was able to reduce the soil's TCLP leachability by 90%. In addition, all TCLP leached Cr for the treated soil was present in the less toxic form of Cr(III). Compared to the TCLP fluid, the WET employs a much more aggressive extracting agent (citric acid for WET vs. acetic acid for TCLP). As a result, the leached Cr in the WET extractant was 1.2 mg/L for the same untreated soil (3 times greater than in the TCLP fluid). Upon the brief nanoparticle treatment, the WET-leached Cr concentration was reduced to 0.28 mg/L, a reduction of about 76%.

The extracted Cr in both TCLP and WET tests was far below the regulated TCLP or WET limit (5 mg/L), which is commonly applied to classifying hazardous wastes in the U.S. Apparently, the stabilized nanoparticles may also be applied to treat Cr(VI)-laden solid wastes, which may greatly minimize Cr(VI) leachability and cut down the handling and disposal cost of hazardous materials.

Figure 7:
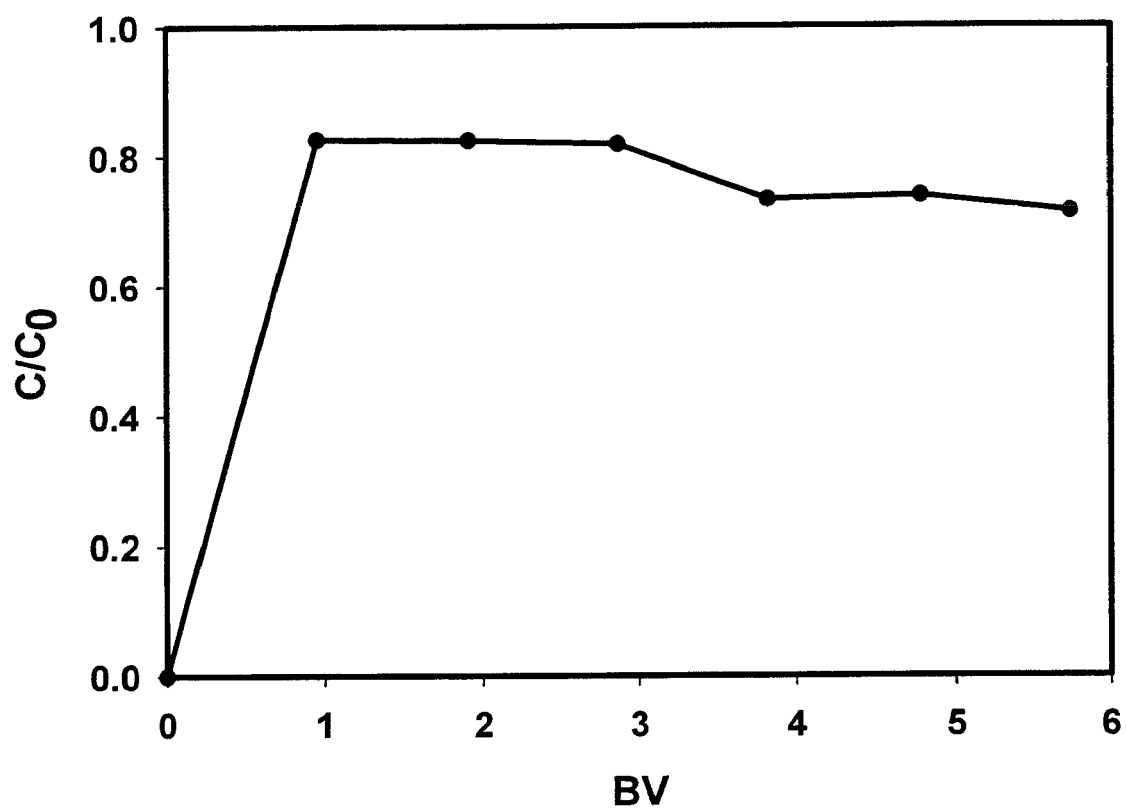
FIG. 7 is a graph illustrating Fe breakthrough curve as 0.06 g/L ZVI nanoparticles was passed through a sandy loam soil bed.

For in situ remediation uses, the nanoparticles are expected to be highly mobile in soil to ensure delivery of the nanoparticles to the targeted locations. To test the soil transportability of the CMC-stabilized nanoparticles, Fe breakthrough curve was measured as the nanoparticle suspension (Fe=0.06 g/L) was passed through a packed soil bed. FIG. 7 shows that more than 81% of Fe introduced broke through rapidly in less than one BV, indicating that the stabilized ZVI nanoparticles were highly mobile through the soil bed FIG. 7 also showed that about 19% of Fe introduced was stuck in the soil bed. A number of processes can be held responsible for retaining Fe in the soil bed. For example, some Fe larger particles may be intercepted by the soil via the classical filtration mechanisms; in addition, because of the high reactivity, a fraction of zerovalent Fe is oxidized to iron oxides or hydroxides, which can precipitate or be sorbed in the soil pores. After 3 BV's, the effluent Fe concentration dropped gradually, indicating more Fe was retained in the soil. Results in FIG. 7 may also serve as a basis for assessing the long-term environmental fate of the nanoparticles when applied in the subsurface. Under the subsurface environmental conditions, the stabilized Fe nanoparticles will be completely converted to iron minerals in a month or so. These innocuous minerals are likely much less mobile in soils, especially when CMC molecules are degraded, and eventually incorporated in the ambient geomedia. From environmental remediation aspect, the retained Fe minerals can offer added sorption capacity for a number of toxic chemicals including, chromate.

3. Summary and Conclusions

Contamination of soil and groundwater by hexavalent chromium has been one of the most challenging environmental issues. This study investigated the feasibility of using CMC-stabilized ZVI nanoparticles to reduce Cr(VI) in both aqueous and soil phases through a series of batch and column experiments. The primary findings and conclusion are summarized as follows:

(1) Stabilized ZVI nanoparticles can highly effectively reduce Cr(VI) to Cr(III) in both water and soil. Compared to non-stabilized ZVI particles, the CMC-stabilized nanoparticles displayed much greater reactivity and reaction kinetics for chromate reduction.

(2) When the Fe dose was increased from 0.04 g/L to 0.12 g/L (the Fe:Cr molar ratio was increased from 1.1 to 3.3), the reduction of Cr(VI) in was increased from 24% to 90%.

(3) When applied to treating soil-sorbed chromate, the stabilized nanoparticles not only reduced the overall leachability by more than 50%, but also converted all leachable Cr(VI) to its much less toxic form Cr(III). Batch experiments showed that the highly effective reduction of chromate was consistently observed over a broad pH range of 5.0-9.0.

(4) Column breakthrough tests confirmed that great transportability of the CMC-stabilized ZVI nanoparticles through a loamy sand soil bed. When the Cr(VI)-loaded soil was treated with <6 BV's of the nanoparticle suspension (Fe=0.06 mg/L), the leachable of Cr was reduced by 59% compared to Cr leached by water only, and leached Cr was in the less toxic form of Cr(III).

(5) Both TCLP-and WET-based availabilities of Cr in the soil were substantially reduced when the soil was amended with the nanoparticles at an Fe:Cr molar ratio of 2.4 (or 5.7 BVs of the ZVI suspension). Compared to the untreated soil, the TCLP-based leachability was reduced by 90%, whereas WET-leachable Cr was lowered by 76%.

This research provides evidence that the stabilized ZVI nanoparticles may be used for in situ reductive immobilization of Cr(VI)-contaminated soils or other Cr(VI)-laden solid wastes, which may lead to an innovative remediation technology that is likely more cost-effective and less environmentally disruptive.

EXAMPLE 2

This present experiment aims to test the feasibility of using the CMC-or starch-stabilized ZVI nanoparticles for perchlorate destruction in fresh water or in typical spent IX regenerant brine or contaminated saline water. The specific objectives are to: 1) determine the rate and extent of perchlorate reduction by stabilized ZVI nanoparticles; and 2) characterize the influences of temperature, salinity, and pH on the reaction rate.

1. Materials and Methods 1.1. Chemicals

The following chemicals were used as received: 4-(2-Hydroxyethyl)-1-piperazineethane ethanesulfonic acid (HEPES, $C_8H_{18}N_2O_4S$) (Fisher, Fair Lawn, N.J., USA); aluminum chloride ($AlCl_3.6H_2O$) (Fisher); cobalt chloride ($CoCl_2.6H_2O$) (Fisher); cupric chloride ($CuCl_2.2H_2O$) (Fisher); ferrous sulfate ($FeSO_4.7H_2O$) (Acros Organics, Morris Plains, N.J., USA); methyltrioxorhenium (VII) ($MeReO_3$, 98%) (Strem Chemicals, Newburyport, Mass., USA); nickel chloride ($NiCl_2.6H_2O$) (Fisher); potassium hexachloropalladate ($K_2PdCl_6$, 99%) (Acros Organics); sodium borohydride ($NaBH_4$) (MP Biomedicals, Aurora, Ohio., USA); sodium carboxymethyl cellulose(M.W.=90,000, D.S.=0.7) (Acros Organics); sodium chloride (NaCl) (Fisher); sodium chlorate ($NaClO_3$, lab grad) (Fisher); sodium chlorite ($NaClO_2$, 80%) (Fisher); sodium perchlorate ($NaClO_4$, >98%), (Aldrich, St. Louis, Mo., USA); and a water soluble starch (Alfa Aesar, Ward Hill, Mass., USA).

1.2 Preparation of Stabilized ZVI Nanoparticles

Stabilized ZVI nanoparticles were prepared following a procedure reported previously (He and Zhao, 2005; He et al. 2007). In brief, the preparation was carried out in a 500 mL flask attached to a vacuum line. A solution containing 1% (w/w) starch or 1% CMC was prepared by dissolving a waster soluble starch or CMC with deionized (DI) water and then the solutions were purged with purified $N_2$ for half an hour to remove dissolved oxygen (DO). Stock solutions of 0.1-0.2 M $FeSO_4.7H_2O$ were also prepared with degassed DI water. In a typical preparation, a $FeSO_4.7H_2O$ stock solution was added to the starch or CMC solution through a burette to yield a desired concentration of iron and the stabilizer. The mixture was purged with $N_2$ for half an hour to remove DO and to mix the solution. Fe(II) ions were then reduced to Fe(0) nanoparticles by adding a stoichiometric amount of sodium borohydride to the mixture. To ensure efficient use of the reducing agent, the reactor system was operated under inert conditions through continuously vacuuming. The flask was hand-shaken intermittently during the preparation. When gas (hydrogen) evolution ceased (after 15 min), the ZVI nanoparticles were ready for use. To test the effect of metal catalyst, a second metal (Al, Cu, Co, Ni, Pd) was added at 0.3% (w/w) of Fe to the ZVI nanoparticles to yield a class of stabilized bimetallic nanoparticles. For comparison, non-stabilized ZVI nanoparticles were also prepared following the same procedure but without the addition of a stabilizer.

1.3. TEM and DLS Characterization

Transmission electron micrograph (TEM) images were obtained using a Zeiss EM10 transmission electron microscope (Zeiss, Thornwood, N.J.) operated at 25 and 40 kV. The TEM image was analyzed using a specialty image processing software (ImageJ, give sources) to obtain the particle size. Detailed procedures on sample preparation were reported elsewhere (He and Zhao, 2005).

Dynamic light scattering (DLS) tests were performed with a Nicomp 380 Submicron Particle Sizer (PSS, Santa Barbara, Calif.) at a measurement angle of 90° (Internal He—Ne laser, wavelength 633 nm). DLS measures the dynamic particle size and size distribution of the nanoparticles in situ (aqueous solution). The particle size was measured as number weighting; and the minimum particle diameter was set at=1 nm. Solution viscosity was measured with a Gilmont falling ball viscometer and then used to correct the influence of viscosity on particle mobility. Before the measurements, freshly prepared nanoparticle suspensions were first diluted to 0.1 $g \cdot L^{-1}$ with nitrogen-purged 0.2% CMC solution. Samples were placed in the machine for 5 minutes prior to start of the measurements. Each sample was measured three times (10 minutes each). The DLS data were then processed with a software package (CW380) to yield the number-weighted size distributions.

1.4. Degradation of Perchlorate

Batch experiments of perchlorate degradation by the nanoparticles were carried out using 25 mL glass vials. The degradation was initiated by mixing 2.5 mL a perchlorate stock solution (0.1-1.0 mM) and 22.5 mL of a certain type of ZVI nanoparticle suspension (1-2 $g \cdot L^{-1}$ Fe). The vials were then sealed with Teflon-lined caps, and placed in an oven (Thelco model 28, Gca/Precision Scientific), which was set at a desired temperature without stirring. We observed that stirring at 40 rpm on a rotator (Glas-Col, Terre Haute, Ind., USA) at 80° C. showed no significant effect on perchlorate reduction kinetics. At predetermined times, duplicate sample vials were taken out from the oven and sacrificed for analyzing perchlorate remaining. Typically, about 0.5 mL sample was diluted with acidified deionized water (pH=3) by 50-100 times to convert the remaining ZVI nanoparticles to soluble Fe(II), and then analyzed for perchlorate and reduction byproducts such as chlorate, chlorite, and chloride. Control experiments were carried out without the addition of nanoparticles but under otherwise identical conditions.

1.5. Chemical Analyses

Anions ($ClO_4^-$, $ClO_3^-$, $ClO_2^-$, $Cl^-$) were analyzed using a Dionex Ion Chromatography (DX-120) equipped with a suppressed conductivity detector. $ClO_4^-$ was analyzed using an AS16 column, an AG16 guard column, and a 1000 µL sample loop. A degassed 50 mM sodium hydroxide solution was used as the eluent. The detection limit for perchlorate was 4 $µg \cdot L^{-1}$. $ClO_3^-$, $ClO_2^-$, $ClO^-$, and $Cl^-$ were analyzed using an AS 14 column, an AG 14 guard column, and a 1000 µL sample loop. A 3.5 mM sodium carbonate and 1.0 mM sodium bicarbonate solution was used as the eluent. The eluent flow rate was set at 1.0 ml/min.

2. Results and Discussion 2.1. Characterization of Nanoparticles

Figure 8:
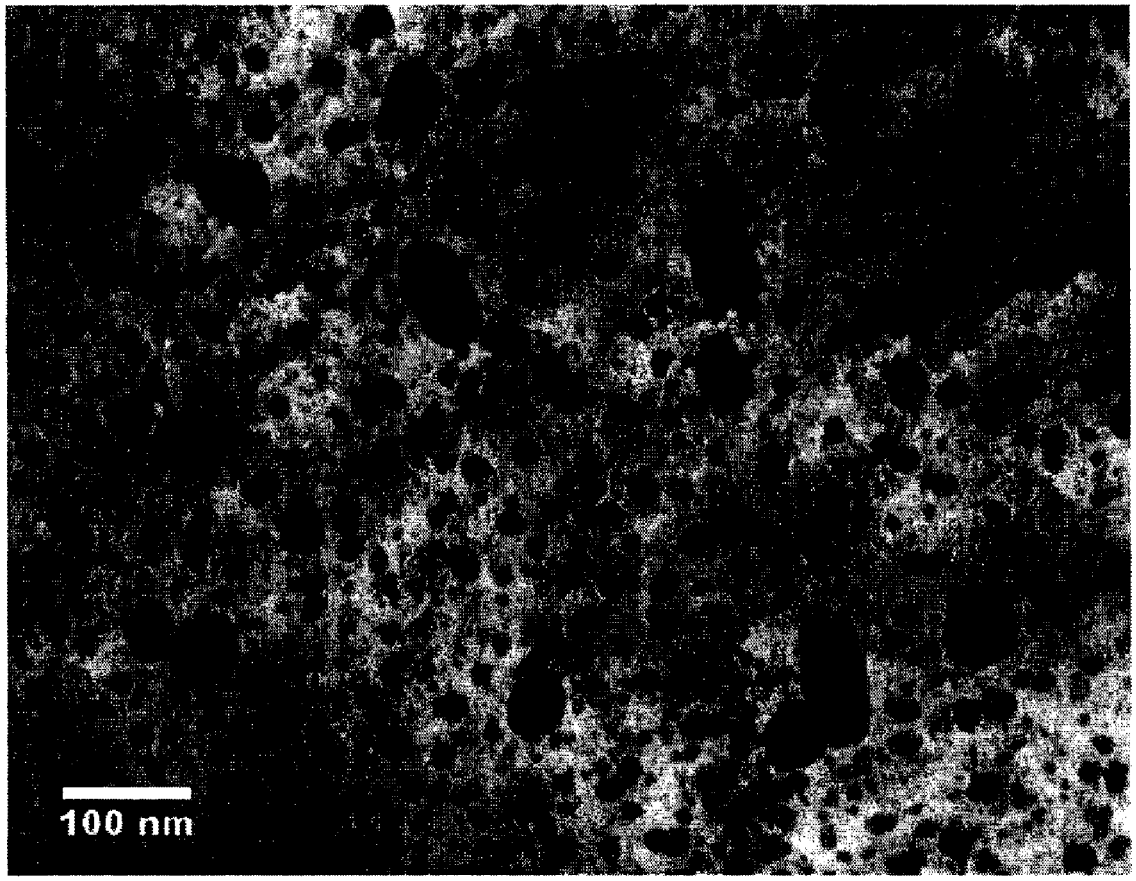
FIG. 8 is a TEM image of fresh 2 g $L^{-1}$ Fe(0) nanoparticles stabilized with 0.9% (w/w) NaCMC wherein the dark spherical dots are Fe(0) nanoparticles.

FIG. 8 shows the transmission electron microscope image of the ZVI nanoparticles prepared at 2 $g \cdot L^{-1}$ Fe and stabilized with 0.9% CMC. The stabilized ZVI nanoparticles appeared as discrete nanoparticles and remained dispersed in water for more than one week.

Five TEM images were analyzed for estimating the particle size. The mean size of the freshly prepared CMC-stabilized nanoparticles was 11.2 nm with a standard deviation of 7.9 nm. Meanwhile, DLS tests were also carried out to obtain the dynamic 'wet' particle size distribution. The DLS results gave a particle diameter of 13.7 nm with a standard deviation of 2.3 nm, which appears to agree with TEM-based 'dry' particle size. Based on a mean diameter of 13.7 nm, the surface area was calculated to be 55.6 $m^2 \cdot g^{-1}$ following the method by He and Zhao (2005). DLS tests were also carried out for the starch-stabilized ZVI nanoparticles. A mean particle diameter of 22.6 nm with a standard deviation of 2.8 nm, which translated into a surface area of 33.7 $m^2 \cdot g^{-1}$.

2.2. Kinetics and Activation Energy of Perchlorate Reduction

Figure 9:
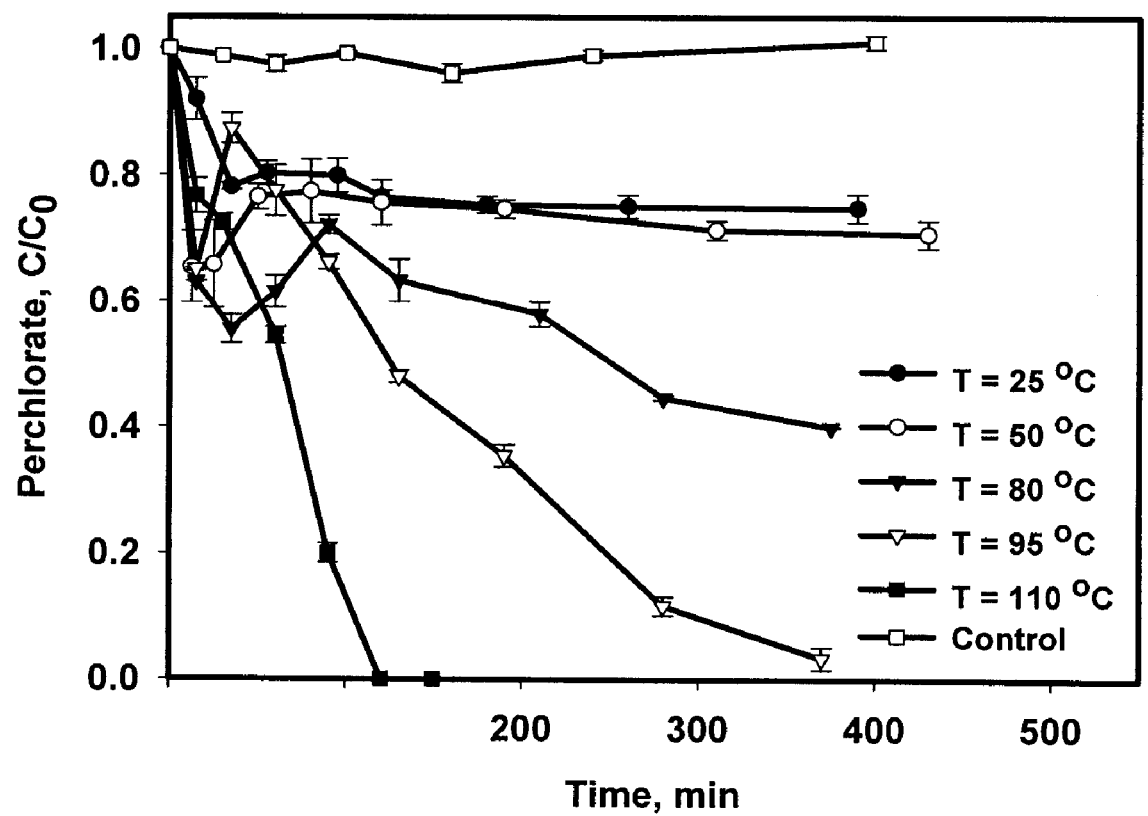
FIG. 9 is a graph illustrating perchlorate reduction by NaCMC-stabilized Fe(0) nanoparticles at various temperatures without pH control. Initial $[ClO_4^-]$=10 mg $L^{-1}$, Fe(0) dose=1.8 g $L^{-1}$, NaCMC=0.9% (w/w).

FIG. 9 shows the perchlorate reduction kinetics using 1.8 g·L$^{-1}$ ZVI nanoparticles stabilized with 0.9% NaCMC (w/w) at temperatures ranging from 25° C. to 110° C. The initial pH was about 6.5 and the final ph was increased to 7.5-7.8 after 6 hours. At 25° C., the degradation proceeded slowly with only 23% of perchlorate reduced in 6 hours. When the temperature was raised to 50° C., 80° C., 95° C., and 110° C., respectively, the reaction was accelerated progressively. At 95° C., 97% perchlorate was eliminated in 6 hours, and at 110° C., complete perchlorate degradation was achieved within only 2 hours. It is noteworthy that the perchlorate reduction curves (except at 110° C.) displayed a rapid initial drop, but then bounced back up briefly before perchlorate was further degraded. Similar kinetic profile was also observed by Moore et al. (2003; 2005) who tested the effectiveness of commercial iron filings for perchlorate degradation. In the perchlorate laden solution, ZVI nanoparticles undergo the following competitive reactions:

$$Fe^0 + 2H_2O = Fe^{2+} + H_2 + 2OH^- \quad (11)$$

$$Fe^0 + 2ClO_4^- \rightarrow Fe^{2+} + Cl_2 + 4O_2 \quad (12)$$

In the course of the reactions, the surface of the ZVI nanoparticles is progressively oxidized to iron oxides. In the experimental pH range (6.5-7.8), the resultant iron oxides can rapidly adsorb $ClO_4^-$ from water, resulting in the observed rapid drop of perchlorate concentration in the solution phase. However, due to the concurrent rapid perchlorate reduction, the perchlorate chemical potential in the solution is rapidly lowered such that the concentration gradient between the particle surface and the solution phase is reversed, and the sorbed perchlorate starts releasing back into the solution. The perchlorate desorption is even further promoted as the concentration of chloride ions resulting from the reduction of perchlorate builds up. At elevated temperatures (e.g. 110° C.), the perchlorate sorption becomes inhibited whereas the perchlorate reduction was over overwhelmingly enhanced. As a result, the "dipping" effect was less significant at higher temperatures. As to be discussed later in the chlorine mass balance study, the sorption/desorption process is rather rapid and becomes negligible after 100 minutes of the reaction.

A pseudo-first-order rate model, Eq. (13), (He and Zhao, 2005; Johnson et al., 1996) was used to interpret the degradation kinetic data:

$$\frac{d[ClO_4^-]}{dt} = -k_{SA}\alpha_s\rho_m[ClO_4^-] = -k_{obs}[ClO_4^-] \quad (13)$$

where [ClO$_4^-$] is the perchlorate concentration (mg·L$^{-1}$) in water at time t (min), $k_{SA}$ is the specific reaction rate constant based on surface area of the nanoparticles (L·min$^{-1}$·m$^2$), $\alpha_s$ is the specific surface area of the nanoparticles (m$^2$·g$^{-1}$), $\rho_m$ is the mass concentration of the nanoparticles (g·L$^{-1}$), and $k_{obs}$ is the observed pseudo-first-order rate constant (min$^{-1}$). Because the model describes only reactive degradation of perchlorate, it is only used for the degradation data after perchlorate concentration was recovered from the sorption/desorption perturbation step.

Figure 10:
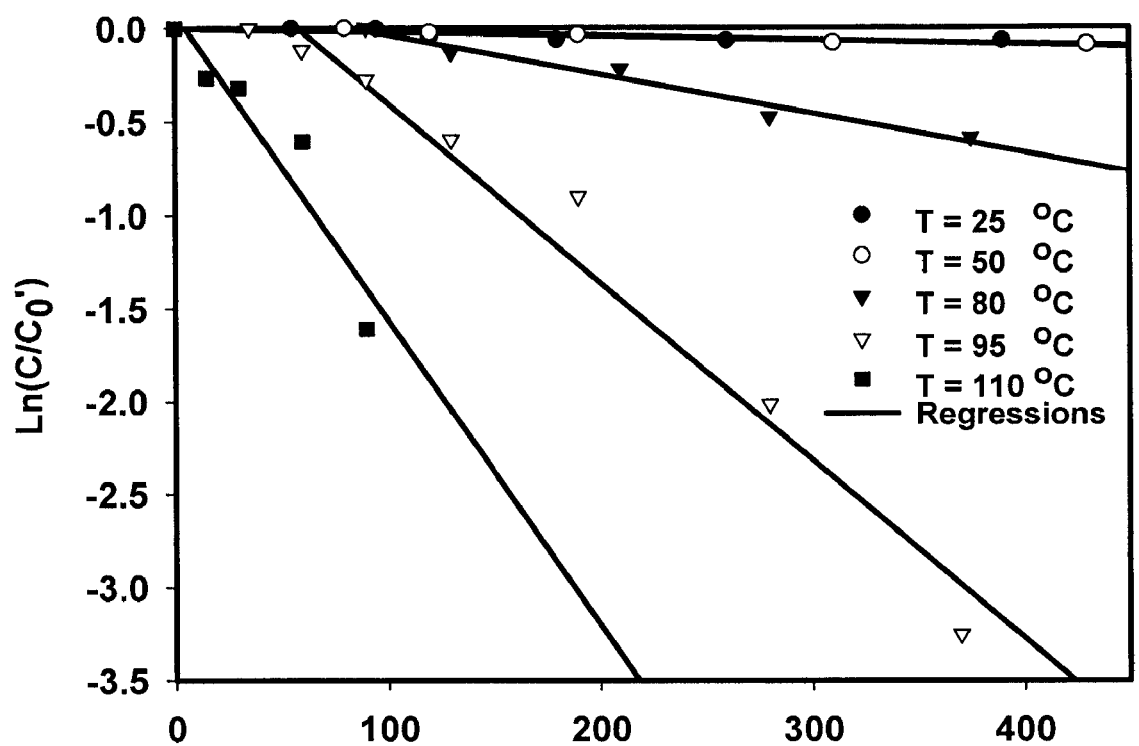
FIG. 10 is a graph illustrating the pseudo-first-order model fitted perchlorate reduction by Fe(0) nanoparticles at various temperatures. Initial $[ClO_4^-]$=10 mg $L^{-1}$, Fe(0) dose=1.8 g $L^{-1}$, NaCMC=0.9% (w/w).

FIG. 10 shows the linearized plots (ln(C/C$_0'$) vs time) of the experimental and model-simulated kinetic data, where C$_0'$ denotes the perchlorate concentration at the first point when perchlorate concentration started to drop after recovering from the sorption/desorption dip. Table 1 gives the fitted model parameters. The observed pseudo-first-order rate constant (k$_{obs}$) was improved by 82 times when the temperature was increased from 25° C. to 110° C.

The degradation enhancement at elevated temperatures can be easily revealed by the linearized Arrhenius equation:

$$\ln k = \ln A - \frac{E_a}{RT} \quad (14)$$

where k is the reaction rate coefficient (min$^{-1}$), A is a constant, $E_a$ is the activation energy (kJ·mol$^{-1}$), R is the universal gas constant (8.314 J·K$^{-1}$·mol$^{-1}$), and T is the absolute temperature (K).

Figure 11:
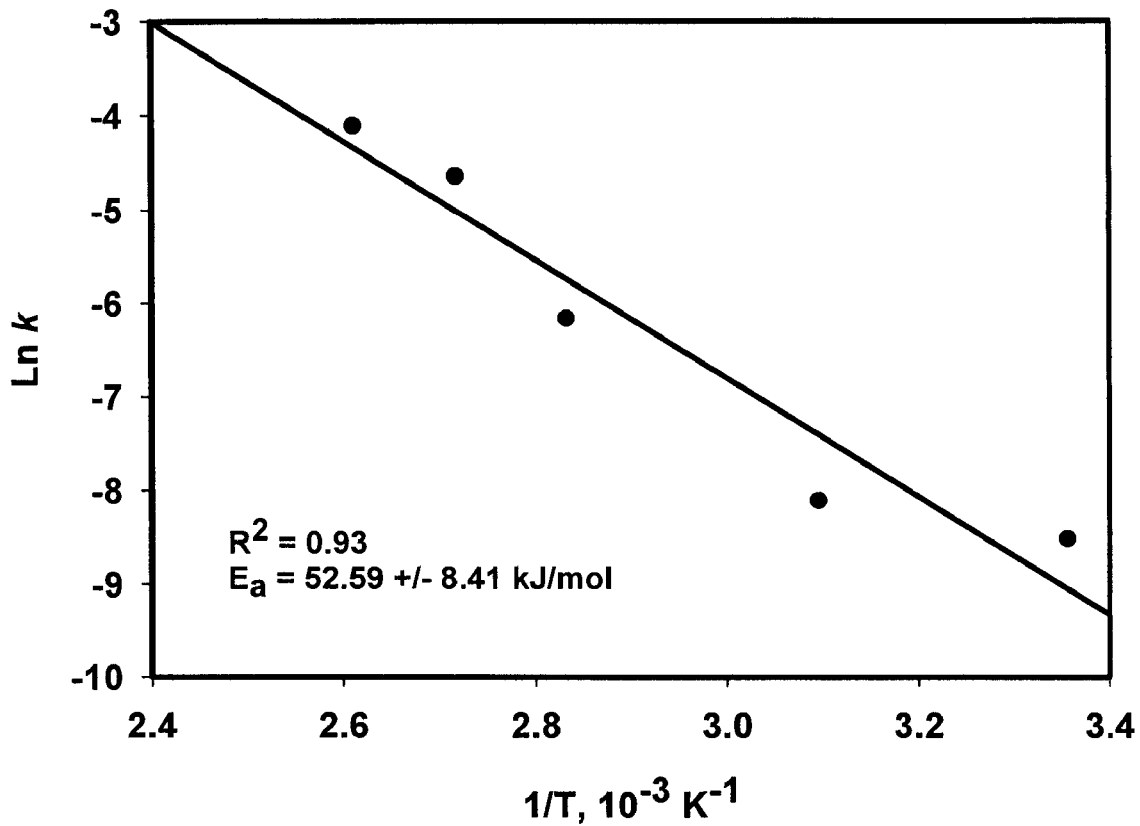
FIG. 11 is a graph illustrating an arrhenius plot of the natural logarithm of the estimated first-order rate constant (k) against 1/T for perchlorate reduction by NaCMC-stabilized Fe(0) nanoparticles. Initial $[ClO_4^-]$=10 mg $L^{-1}$, Fe(0) dose=1.8 g $L^{-1}$, NaCMC=0.9% (w/w).

FIG. 11 shows the Arrhenius plot of the first-order rate constant (k$_{obs}$) against (1/T) in accord with Eq. (13), which results in an activation energy (E$_a$) of 52.59±8.41 kJ·mol$^{-1}$ and an A value of 194,075. This relatively high level of activation energy is associated with the unique chemistry of perchlorate. Although the chlorine in perchlorate is at its highest oxidation state (+7), and thus, reduction of perchlorate is thermodynamically favorable, perchlorate is quite inert toward most of reducing agents due to the high kinetic barrier (Urbansky, 1998). However, the activation energy (E$_a$) determined in this study is much lower than those reported by other researchers. For example, Gu et al. (2003) reported an activation energy of 120±5 kJ·mol$^{-1}$ when ferrous iron was used to reduce a perchlorate waste residual containing ferric chloride and hydrochloric acid at elevated temperatures (up to 200° C. and/or pressure (about 20 atm). Cao et al. (2005) reported an activation energy of 79.02±7.75 kJ·mol$^{-1}$ for perchlorate reduction by non-stabilized ZVI nanoparticles.

2.3. Chlorine Mass Balance and Reaction Completeness

Perchlorate reduction follows the sequential reactions below:

$$ClO_4^- \rightarrow ClO_3^- \rightarrow ClO_2^- \rightarrow Cl^- \quad (15)$$

Figure 12:
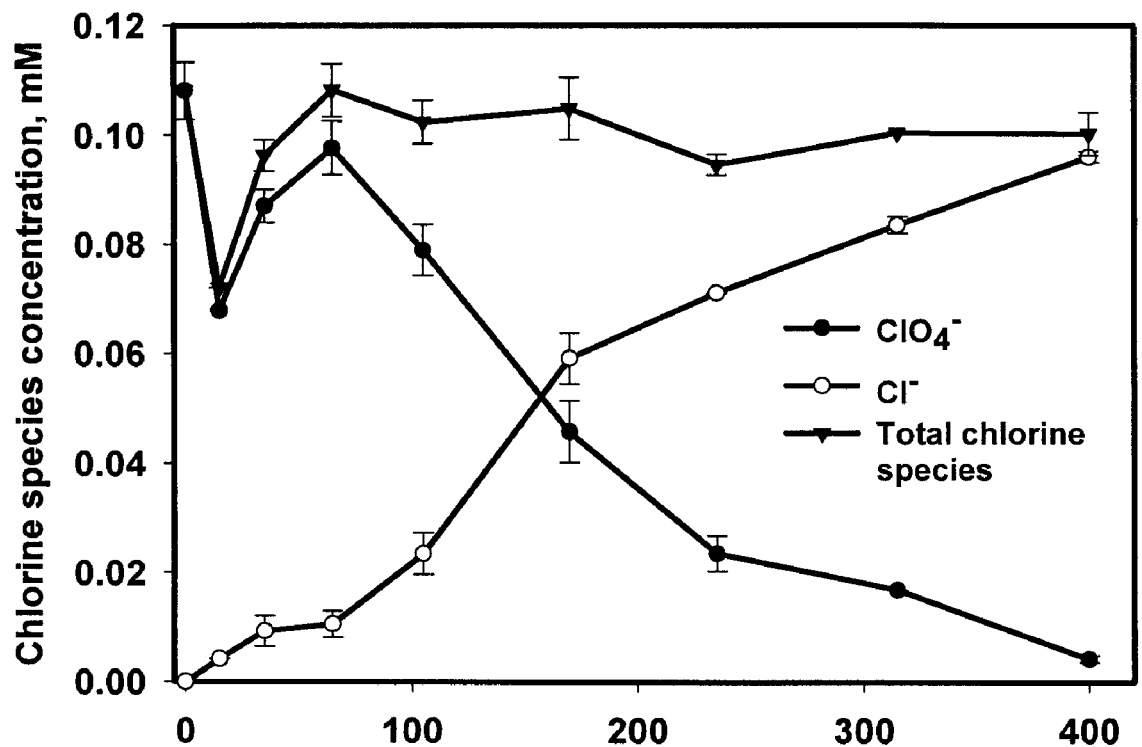
FIG. 12 is a graph illustrating the chlorine mass balance of perchlorate reduction by NaCMC-stabilized Fe(0) nanoparticles. Initial $[ClO_4^-]$=10 mg $L^{-1}$, Fe(0) dose=1.8 g $L^{-1}$, NaCMC=0.9% (w/w).

Thus, the completeness of perchlorate reduction can be revealed by following the production of chlorate, chlorite, and/or chloride in the system. The concentrations of chlorine-containing species (ClO$_4^-$, ClO$_3^-$, ClO$_2^-$, and Cl$^-$) were measured during a set of batch kinetic experiments. FIG. 12 shows the concentrations of ClO$_4^-$ and Cl$^-$ as well as the total chlorine-containing species against reaction time. Because ClO$_3^-$ and ClO$_2^-$ were not detected during the tests, the total chlorine-containing species was actually the sum of ClO$_4^-$ and Cl$^-$.

While chloride production increased steadily with time, perchlorate displayed an initial concentration dip due to the initial sorption/desorption effect. As a result, the total chlorine species account for 72% of the total ClO$_4^-$ initially added in the system, which suggest that part of the perchlorate added was adsorbed to the nanoparticles. After about 60 min, when the effect of sorption/desorption became less significant, the sum of ClO$_4^-$ and Cl$^-$ accounted for 93%-101% of total ClO$_4^-$ initially added in the system. The nearly perfect mass balance indicates that: 1) the initially strong sorption and desorption of perchlorate became negligible after ~60 min; and 2) perchlorate was nearly completely reduced to chloride without production of significant amounts of intermediate products such as ClO$_3^-$ and ClO$_2^-$.

2.4 Perchlorate Reduction by Various Iron Nanoparticles

In a prior study, He and Zhao (2005) and He et al. (2007) reported that both water-soluble starch and CMC can stabilize ZVI nanoparticles. In addition, they reported that addition of a metal catalyst such as Pd on the ZVI nanoparticles can greatly catalyze the dechlorination. To test the effect of the stabilizer type and metal catalysts (i.e. Al, Cu, Co, Ni, Pd, Re) on the perchlorate degradation, parallel kinetic tests were carried out using non-stabilized ZVI particles, starch-or CMC-stabilized ZVI nanoparticles, and stabilized bimetallic nanoparticles.

Figure 13:
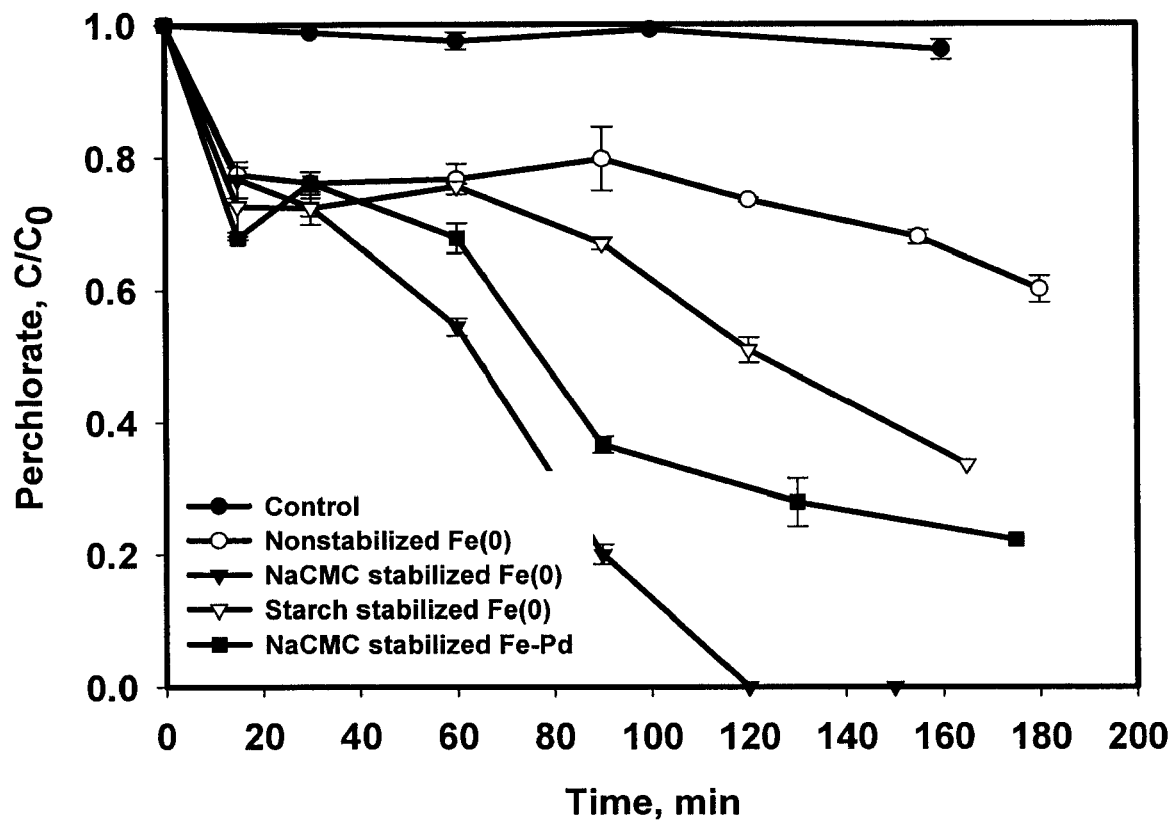
FIG. 13 is a graph illustrating the perchlorate reduction by various Fe(0)-based particles. For all cases: Fe(0) dose=1.8 g $L^{-1}$, initial $[ClO_4^-]$=10 mg $L^{-1}$, and temperature=110° C.; for stabilized Fe(0), starch or NaCMC=0.9% (w/w/); and for Fe—Pd bimetallic nanoparticles; Pd=0.3% of Fe (w/w).

FIG. 13 compares the perchlorate degradation rates for various particles at 110° C. under otherwise identical conditions. Again, Eq. (13) is used to interpret the experimental data, and Table 2 gives the fitted model parameters. Based on the $k_{obs}$ values, starch-and CMC-stabilized ZVI nanoparticles degraded perchlorate 1.8 and 5.5 times, respectively, faster than non-stabilized ZVI particles. Based on the surface-area normalized rate constant $k_{SA}$, starch-and CMC-stabilized ZVI nanoparticles degraded perchlorate 1.8 and 3.3 times, respectively, faster than non-stabilized ZVI particles. This improved $k_{SA}$ values suggest that stabilizers not only increased the surface area of the nanoparticles (because of the much smaller particle size), but also resulted in much more reactive particle surface. The $k_{SA}$ value for CMC-stabilized ZVI nanoparticles is more than 2 orders of magnitude greater than that for a cast iron reported by Oh et al. (2006a).

The $k_{obs}$ and $k_{SA}$ for CMC-stabilized nanoparticles are 3.0 and 1.8 times, respectively, higher than for starch-stabilized nanoparticles. This observation indicate that CMC is a more efficient stabilizer than starch, i.e. CMC gives not only smaller but also more reactive ZVI nanoparticles. The particle stabilization power of CMC is attributed to its carboxymethyl groups that interact with Fe(II) as well as the nanoparticles more strongly than the hydroxyl groups of starch.

Interestingly, the presence of a second metal (e.g. Pd added at 0.3% of Fe) reduced the $k_{obs}$ and $k_{SA}$ by 44.5%, suggesting that coating Pd on the surface of ZVI nanoparticles was actually inhibiting the surface reactivity for perchlorate degradation. Similar inhibitive effects were also observed when other metals such as Al, Co, Cu, and Ni were used (data not shown). A second metal is loaded on the Fe(0) nanoparticles via the following redox reaction,

$$nFe^0 + 2Me^{n+} = nFe^{2+} + 2Me^0 \quad (16)$$

The perchlorate reduction rate drop for Fe—Pd nanoparticles can be attributed to 1) physical shielding of the Fe(0) surface by the coated metal, 2) loss of Fe(0) via reaction of Eq. (16), and more importantly 3) the metal catalysts were catalyzing the corrosion reaction of ZVI (Eq. 10), rendering significant loss in perchlorate reducing power of the ZVI nanoparticles. Cao et al. (2005) reported that addition of Pd or Ag to non-stabilized ZVI particles showed no performance enhancement.

Rhenium has been well recognized to be able to catalyze perchlorate reduction through an oxygen transfer reaction (Cai and Espenson, 2005; Abu-Omar et al., 2000; 2006). A recent study reported that perchlorate was reduced completely to chloride within 24 hours by hydrogen (40 psig) in the presence of methyltrioxorhenium ($MeReO_3$, 0.5 mM) and palladium (0.5 mM) as catalysts (Hurley and Shapley, 2006). However, in this study, when $MeReO_3$ (0.5 mM) and Pd (0.5 mM) were also added to the CMC-stabilized ZVI nanoparticles, no improvement in perchlorate degradation was observed.

2.5. Effect of Background Chloride or Salinity

As discussed early, chloride is one of the key products in perchlorate degradation, and will accumulate as the reaction proceeds. Moore and Young (2003) reported the presence of 28.2 mM (1.0 g·L$^{-1}$ Cl$^-$) of chloride nearly ceased perchlorate degradation by iron. On the other hand, it is practically very desirable to destroy perchlorate in saline water or spent ion exchange brine, where high concentrations of perchlorate are co-present with high concentrations of chloride and/or other salts (Gingras and Batista, 2002; Xiong et al., 2006).

Figure 14:
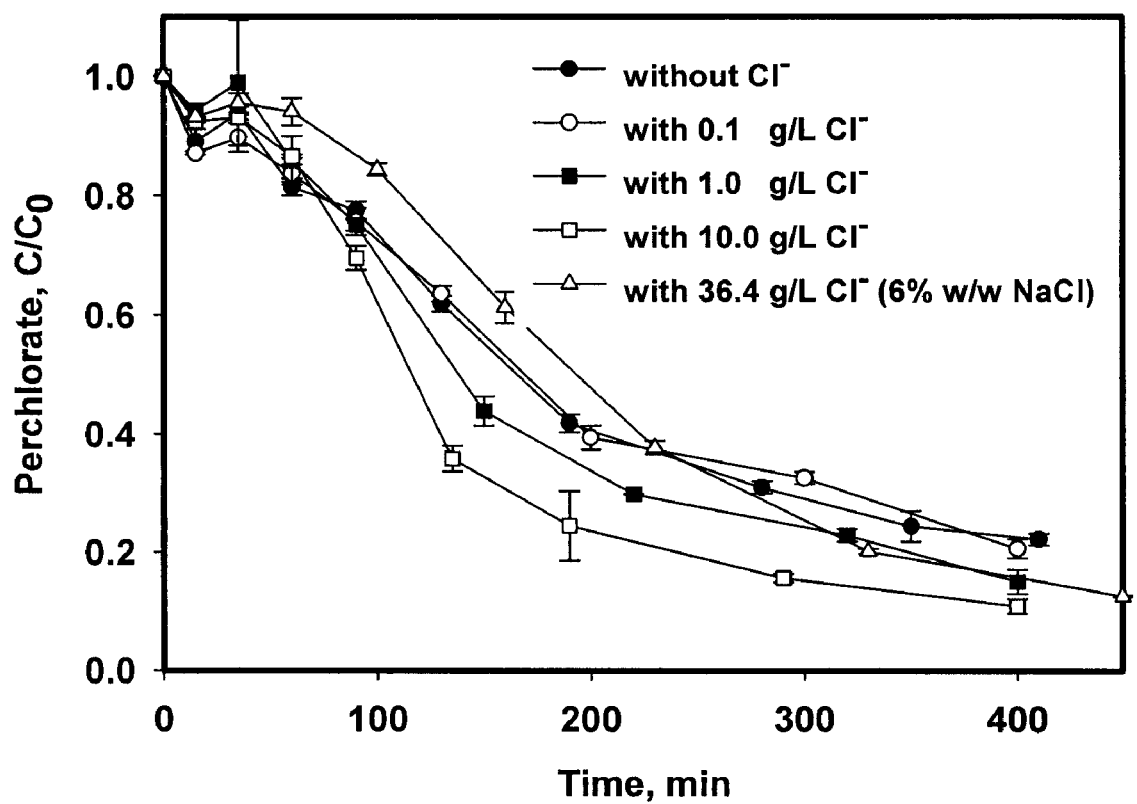
FIG. 14 is a graph illustrating the perchlorate reduction by NaCMC-stabilized Fe(0) nanoparticles in the presence of various background chloride concentration at 95° C. Initial $[ClO_4^-]$=10 mg $L^{-1}$, Fe(0) dose=1.8 g $L^{-1}$, NaCMC=0.9% (w/w).

FIG. 14 shows the degradation kinetics of perchlorate in the presence of chloride (added as NaCl) from 0.1 g·L$^{-1}$ to 36.4 g·L$^{-1}$. The degradation profile with 0.1 g·L$^{-1}$ Cl$^-$ in the solution nearly coincided with that when no chloride was added (with the same $k_{obs}$ of 0.0018 min$^{-1}$). However, in contrast to the observation by Moore and Young (2003), perchlorate reduction was actually enhanced when chloride concentration was increased to higher levels (1.0 g·L$^{-1}$ and 10 g·L$^{-1}$). For example, the $k_{obs}$ value was 0.022 min$^{-1}$ and 0.0027 min$^{-1}$ at Cl$^-$=1.0 g·L$^{-1}$ and 10 g·L$^{-1}$, respectively, a 22% and 50% increase compared with that when Cl$^-$ was absent.

This reaction enhancement by chloride can be attributed to three factors. First, the passive oxide layers formed on the iron surface can be broken apart in the presence of chloride. It has been reported that hard Lewis bases (such as Cl$^-$, Br$^-$, I$^-$) are especially aggressive toward passivating oxide layers because they diffuse readily into the passivation film and form strong complex with iron centers (Gotpagar et al., 1999; Johnson et al., 1998). When the passivation oxide layers are broken by these diffusing anions, more Fe(0) surface are available for perchlorate reduction, which resulted in a improved perchlorate degradation rate. Second, Prinz and Strehblow (1998) reported that perchlorate can cause localized corrosion on iron with irregular pit shapes and indicated that pits on iron surface are reactive sites for perchlorate reduction. On the other hand, it is widely accepted in the literature that pitting is normally initiated by the aggressive anions such as halide ions (Gotpagar et al., 1999). In the Fe(0)/ClO$_4^-$/NaCl system, a large amount of pits are formed in the presence of chloride, especially at elevated temperature when the movement of anions and the pitting reaction are speeded up. As a result, more reactive pits are available for perchlorate reduction with increased NaCl concentration.

However, when the chloride concentration was increased up to an extremely high level (e.g. 36.4 g·L$^{-1}$ Cl$^-$), $k_{obs}$ was increased only by 27% to 0.0023 min$^{-1}$ compared with that when no NaCl was added. This observation indicates that chloride ions are competing with perchlorate for the adsorption sites on iron surface, thereby inhibiting the perchlorate degradation, and this inhibitive effect may overweigh the beneficial effects of salinity when extremely high levels of chloride are present. Nonetheless, FIG. 14 shows that in the presence of 6% NaCl 87.4% of 100 mg·L$^{-1}$ ClO$_4^-$ was reduced by 1.8 g·L$^{-1}$ the CMC-stabilized ZVI nanoparticles at 95° C. in 450 minutes, indicating that the stabilized nanoparticles can highly effectively destroy perchlorate in ion-exchange brine.

2.6. Effect of pH on Perchlorate Reduction

As revealed by Eqns. (11) and (12), hydrogen activity (pH) can affect corrosion of iron as well as degradation of perchlorate.

Figure 15:
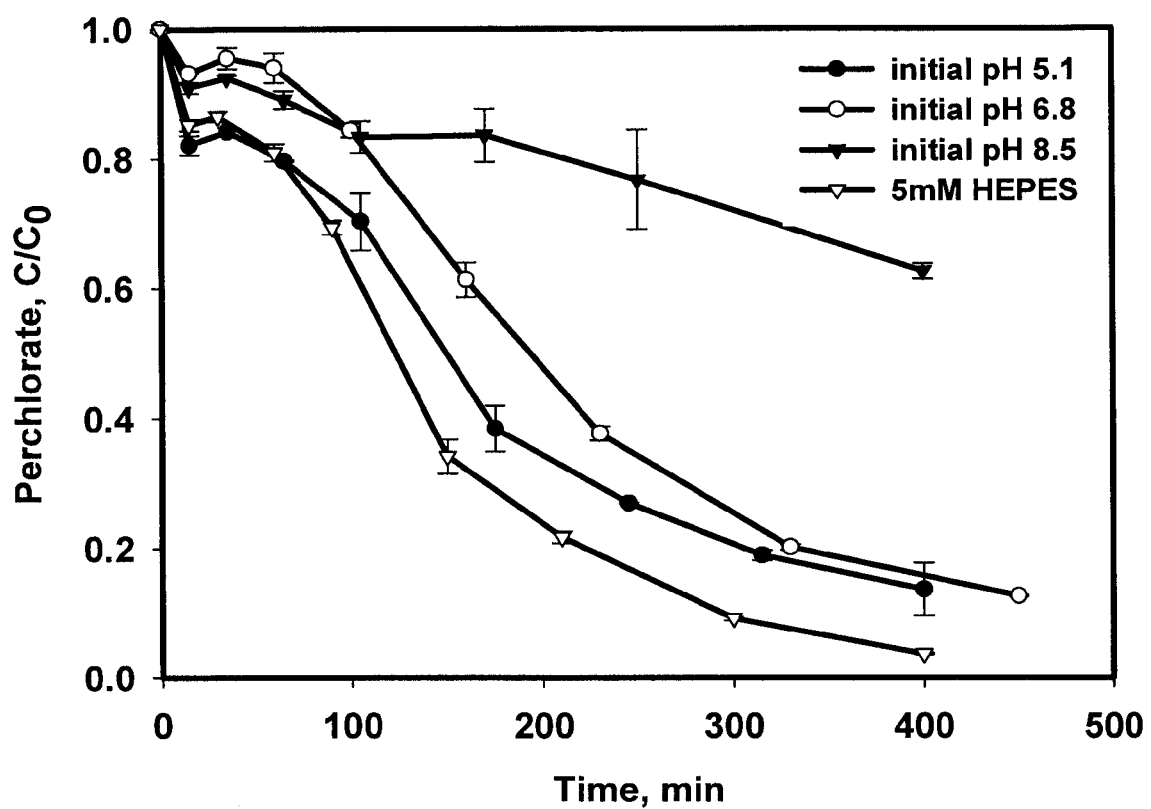
FIG. 15 is a graph illustrating the effect of pH on perchlorate reduction by NaCMC-stabilized Fe(0) nanoparticles in the presence of 6% NaCl (w/w) at 95° C. Initial $[ClO_4^-]$=100 mg $L^{-1}$, Fe(0) dose=1.8 g $L^{-1}$, NaCMC=0.9% (w/w).

FIG. 15 shows the perchlorate reduction using 1.8 g·L$^{-1}$ CMC-stabilized ZVI nanoparticles in the presence of 6% (w/w) NaCl at 95° C. and at various solution pH. When the initial pH was 8.5, only 27.4% perchlorate was removed after 400 minutes and $k_{obs}$ was 0.0010 mind which is 56.5% lower than that with an initial pH 6.8 ($k_{obs}$=0.0023 min$^{-1}$). Also red precipitate was observed in the filter when the reacted Fe(0) solution was filtered through 0.22 Am membrane filter. This reaction rate decrease and formation of precipitate can be explained by the formation of ferrous hydroxide and/or ferric hydroxide at high pH. Iron hydroxides precipitated on the Fe(0) nanoparticles surface to form a passivation film and to block the contact between Fe(0) nanoparticles surface and perchlorate, which slowed down perchlorate reduction. However, faster perchlorate reduction kinetics ($k_{obs}$=0.0054 min$^{-1}$) was observed when the initial pH was 5.1. This kinetic improvement was expected because there are more protons available to participate in reaction (12) under lower initial pH. However, caution should be exercised when low pH was involved in perchlorate reduction by Fe(0) nanoparticles because Fe(0) with be reacted through Eq. (18):

$$Fe^0+2H^+=Fe^{2+}+H_2 \qquad (18)$$

When a buffer solution (5 mM HEPES) was added, the solution pH was controlled in a range of 7.0-7.4 within 400 minutes and $k_{obs}$ (0.0092 min$^{-1}$), as expected, was found to be 4 times higher than that without pH control.

3. Conclusions

Perchlorate is a widespread contaminant in groundwater and surface water. Although it is in the highest oxidation level (+7) of chlorine, perchlorate is hard to be reduced due to the high activation energy barrier. Stabilized Fe(0) nanoparticles were used in this study to reduce perchlorate in both fresh water and simulated ion-exchange regenerant brine. The main conclusions from this study include:

1). Perchlorate in water can be removed efficiently by stabilized Fe(0) nanoparticles. Temperature was found to be critical for this reaction. The observed pseudo-first-order rate constant ($k_{obs}$) increased 82 times when the temperature increased from 25° C. to 110° C. with an initial perchlorate concentration of 10 mg·L$^{-1}$.

2). Perchlorate in spent ion-exchange regenerant brine can be removed effectively by stabilized Fe(0) nanoparticles. 87.4% of 100 mg·L$^{-1}$ $ClO_4^-$ can be removed by 1.8 g·L$^{-1}$ NaCMC-stabilized Fe(0) at 95° C. in the presence of 6% (w/w) NaCl.

3). The final product of perchlorate reduction by stabilized Fe(0) nanoparticles was chloride. No intermediate product was detected during perchlorate reduction. And the reaction from perchlorate to chlorate was found to be the rate-limiting step for perchlorate reduction.

4). background chloride under certain range (0.1-10 g·L$^{-1}$ Cl$^-$) improved perchlorate reduction through the diffusion of chloride through passivation layer on iron surface and the formation of reactive pits on iron surface. And pH played an important role in perchlorate reduction by Fe(0) nanoparticles.

TABLE 1

The pseudo-first-order model parameters of perchlorate reduction by NaCMC-stabilized iron nanoparticles at various temperatures.

| Temperature (° C.) | $k_{obs}$ (min$^{-1}$) | $R^2$ |
|---|---|---|
| 25 | 0.0002 | 0.66 |
| 50 | 0.0003 | 0.94 |
| 80 | 0.0021 | 0.97 |
| 95 | 0.0096 | 0.97 |
| 110 | 0.0164 | 0.90 |

$R^2$ is the linear regression coefficient for plots of ln(C/C$_0'$) against reaction time (min) as shown in FIG. 3.

TABLE 2

The estimated perchlorate reduction rate constants for various iron nanoparticles at 110° C.

| Iron Type | $\alpha_s$ (m$^2$·g$^{-1}$) | $\rho_m$ (g·L$^{-1}$) | $k_{obs}$ (min$^{-1}$) | $k_{SA}$ (10$^{-5}$·L·min$^{-1}$·m$^{-2}$) |
|---|---|---|---|---|
| Nonstabilized Fe | 33.5* | 1.8 | 0.0030 | 5.0 |
| Starch-stabilized Fe | 33.7 | 1.8 | 0.0055 | 9.1 |
| NaCMC-stabilized Fe | 55.6 | 1.8 | 0.0164 | 16.4 |
| NaCMC-stabilized Pd/Fe | 55.6** | 1.8 | 0.0091 | 9.1 |

*The surface area for nonstabilized iron was from reference of Wang et al., (1997).
**The surface area of NaCMC-stabilized Pd/Fe was used as the same of NaCMC-stabilized Fe.

EXAMPLE 3

The overall goal of this experiment is to test the effectiveness of using the CMC-stabilized Fe$^0$ nanoparticles for rapid degradation of nitrate in water. The specific objectives are to: 1) prepare CMC-stabilized Fe$^0$ nanoparticles following the approach by He and Zhao (2005); 2) determine the rate and extent of nitrate reduction by the stabilized Fe$^0$ nanoparticles; 3) characterize the influences of pH, salinity and a metal catalyst on the nitrate reaction rate; and 4) test the effectiveness of using stabilized Fe$^0$ for degradation of nitrate in saline water.

1. Materials and Methods 1.1. Chemicals.

The following chemicals (analytical grade) were used as received: 4-(2-Hydroxyethyl)-1-Piperazineethaneethanesulfonic acid (HEPES, $C_8H_{18}N_2O_4S$, Fisher, Fair Lawn, N.J.); 4-Morpholinoethanesulfonic acid (MES, $C_6H_{13}NO_4S·xH_2O$, Fisher, Fair Lawn, N.J.); Ammonium nitrate ($NH_4NO_3$, Fisher, Fair Lawn, N.J.); Iron (II) sulfate (FeSO$_4$·7H$_2$O, Acros Organics, Morris Plains, N.J.); Nessler reagent ($K_2Hg^{II}I_4$, HACH, Loveland, Colo.); Potassium hexachloropalladate ($K_2PdCl_6$, 99%, Acros Organics, Morris Plains, N.J.); Potassium nitrate ($KNO_3$, Acros Organics, Morris Plains, N.J.); Sodium borohydride (NaBH$_4$, ICN Biomedicals, Aurora, Ohio.); Sodium carboxymethyl cellulose (NaCMC, Acros Organics, Morris Plains, N.J.); Sodium chloride (NaCl, Fisher, Fair Lawn, N.J.); Sodium nitrate (NaNO$_3$, Fisher, Fair Lawn, N.J.); Sodium nitrite (NaNO$_2$, Fisher, Fair Lawn, N.J.).

1.2. Preparation of Nanoparticles

Stabilized Fe$^0$ nanoparticles were prepared in a 250 mL flask attached to a vacuum line. Before use, deionized (DI) water and NaCMC solution were purged with purified N$_2$ for 30 minutes to remove dissolved oxygen (DO). FeSO$_4$·7H$_2$O stock solution (0.1M) was prepared freshly before use with degassed DI water. In a typical preparation, FeSO$_4$·7H$_2$O stock solution was added to the NaCMC solution to yield a desired concentration of Fe (1 g/L) and NaCMC (0.9%, w/w) (give concentrations of Fe and NaCMC you used, how about starch? Strach has not been tried in this study). The mixture was purged with N$_2$ for another 30 minutes to remove DO and to complete the formation of Fe-CMC complexes.

Fe2+ ions were then reduced to Fe0 by adding a stoichiometric amount of sodium borohydride into the mixture under shaking. Ferrous iron was reduced following the reaction stoichiometry:

$$Fe(H_2O)_6^{2+} + 2BH_4^- \rightarrow Fe^0 + 7H_2 + 2B(OH)_3 \quad (19)$$

When gas (hydrogen) evolution ceased (after ~15 min), the $Fe^0$ nanoparticles were ready for use. For comparison, non-stabilized $Fe^0$ were also prepared following the same procedure but without addition of a stabilizer. To test the catalytic effect of palladium, which has been observed to catalyze reductive dechlorination of chlorinated hydrocarbons, stabilized $Fe^0$ nanoparticles in select cases were loaded with a Pd by adding $Pd^{2+}$ at 0.3% of Fe (w/w) in the nanoparticle suspension (He and Zhao, 2005).

1.3. TEM and DLS Characterization

Transmission electron micrograph images were obtained using a Zeiss EM 10 transmission electron microscope (TEM) (Zeiss, Thornwood, N.J.) operated at 25 and 40 kV. The TEM image was analyzed using a specialty image processing software named ImageJ to analyse the particle size. The details of sample preparation and software operation have been reported (He and Zhao, 2005). Dynamic light scattering (DLS) tests were performed with a Nicomp 380 Submicron Particle Sizer (PSS, Santa Barbara, Calif.) at a measurement angle of 90° (Internal He—Ne laser, wavelength 633 nm). The freshly prepared 1 g/L $Fe^0$ was diluted to 0.1 g/L with nitrogen-purged 0.2% NaCMC solution before DLS measurement. Solution viscosities (2.74 cp for 0.2% NaCMC solution) were measured by a Gilmont falling ball viscometer, then used to correct for the influence of viscosity on particle mobility. All samples were placed in the machine for 5 minutes prior to start of measurements to eliminate temperature differences between the sample and the machine. Three cycles of 20 minutes of data collection time each were run. The instrument parameters were set as follows: automatic choice of channel width; number weighting; and minimum diameter of 1 nm. The DLS data were processed with a software package CW380 to yield the number-weighted size distributions.

1.4. Degradation of Nitrate

Batch experiments were conducted in 25 mL amber glass vials capped with Teflon Mininert valves. Nitrate degradation was initiated by adding a nitrate stock solution (2000 mg/L) to the freshly prepared $Fe^0$ nanoparticles solution, which yielded an initial nitrate concentration of 150-310 mg/L and $Fe^0$ concentration of about 0.7 g/L. HCL (1 M) and NaOH (1M) were used to adjust the pH, and HEPES buffer solution (0.25 M) was employed in select cases to maintain a constant pH. The vials were filled without any headspace. The vials were then mixed on a rotary shaker (40 rpm). At selected time intervals, 0.5-1 mL of water samples were taken from duplicate vials, diluted with DI water. About 100 times of DI water was used to dilute resulting $Fe^{3+}$ to protect IC column and the remaining $Fe^0$ was oxidized (solution color changed from black to light yellow). And then samples were analyzed for nitrate, nitrite and ammonium. Control experiments (without the addition of $Fe^0$ nanoparticles) were carried out in parallel. All experimental points were duplicated.

1.5. Chemical Analysis

Nitrate and nitrite were analyzed using a Dionex Ion Chromatography (DX-120) equipped with an AS14 column, an AG14 guard column, and a 100 μL sample loop. A solution containing 3.5 mM sodium carbonate and 1.0 mM sodium bicarbonate was used as the eluent. The detection limits for nitrate and nitrite are 0.01 mg/L and 0.008 mg/L, respectively. Ammonium was measured by adding Nessler reagent to the samples. After allowing 10 minutes for yellow color development, the UV-Vis adsorption was measured by an HP 8453 UV-Visible spectrophotometer at a wavelength of 425 nm. The detection limit for ammonium is 0.4 mg/L.

Figure 16:
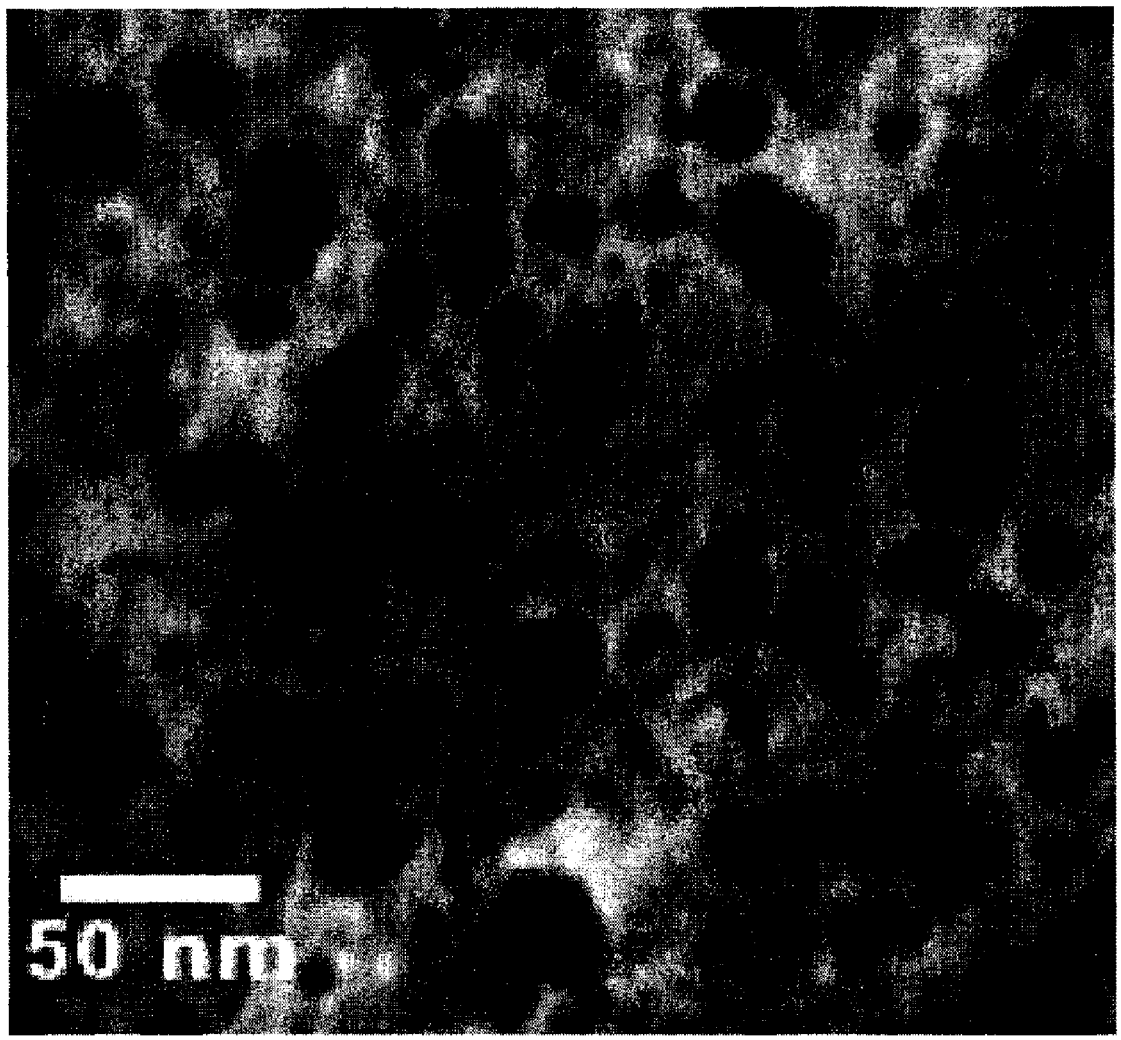
FIG. 16 is a TEM image of 0.9% NaCMC-stabilized $Fe^0$ nanoparticles (1 g/L).

2.0 Results and Discussion 2.1. TEM and DLS Characterization of $Fe^0$ Nanoparticles FIG. 16 shows a representative transmission electron microscope (TEM) image of freshly-prepared NaCMC-stabilized $Fe^0$ nanoparticles. Unlike non-stabilized $Fe^0$ particles, the stabilize nanoparticles appear as well dispersed, nanoscale particles. Dynamic Light Scattering (DLS) tests were also carried out to determine the particle size distribution. The mean size of the freshly prepared 0.9% NaCMC stabilized $Fe^0$ nanoparticles was measured to be 7.4 nm with a standard deviation of 1.2 nm. A surface area of about 103.02 $m^2/g$ was calculated by following the method described by He and Zhao (2005) and based on a diameter of 7.4 nm.

2.2. Nitrate Reduction with Various $Fe^0$ Particles

Figure 17:
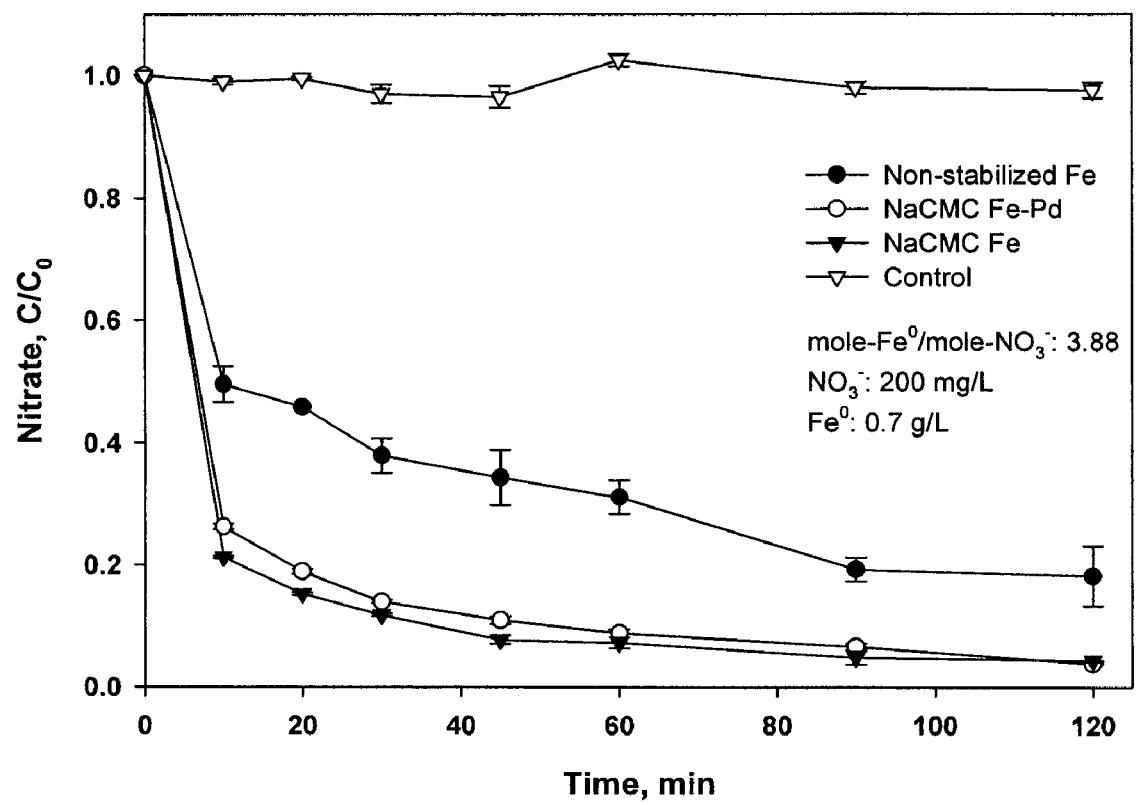
FIG. 17 is a graph illustrating degradation of nitrate in fresh water by various ZVI particles. Initial nitrate concentration was 200 mg/L and $Fe^0$ concentration was 0.7 g/L (mole-$Fe^0$/mole-$NO_3^-$=3.88). $Fe^0$ was prepared with 0.9% NaCMC. Solution pH was controlled at 7.0 to about 7.5 by adding 0.05 M HEPES buffer.

FIG. 17 compares nitrate degradation rates for non-stabilized $Fe^0$, CMC-stabilized $Fe^0$, and CMC-stabilized Fe—Pd nanoparticles under otherwise identical conditions. In all cases, solution pH was controlled at 7.0~7.5 during the reaction with 0.05 M of an HEPES buffer. At a dosage of 0.7 g/L Fe, both stabilized Fe and Fe—Pd nanoparticles displayed much improved kinetics and reactivity. Within 120 minutes of reaction, the stabilized nanoparticles degraded 96.2% of nitrate, whereas non-stabilized particles degraded only 77.1%. It was reported that about 60% nitrate was removed in 20 hours with a initial conditions of 100 mg/L nitrate-N+0.05 M HEPES+0.5 g $Fe^0$ grains (size: 0.5 mm; surface area: 0.04 $m^2/g$).

To quantify the reaction rate, a pseudo-first order reaction model, eqn (20), was used to fit the observed kinetic data, $$\frac{dC}{dt} = -k_{obs}C \quad (20)$$

where C is the nitrate concentration (mg/L) at time t; t is the time (minute); $k_{obs}$ is the pseudo-first order rate constant ($min^{-1}$). Because of the labile nature of the nanoparticles and the complexity of the system, only early stage (<60 minutes) data were fitted. Thus, the resultant $k_{obs}$ only reflects an operationally defined initial rate constant, which has been commonly used to facilitate reaction rate comparison.

Table 3 gives the best-fitted values of $k_{obs}$. Based on the observed $k_{obs}$ values, stabilized $Fe^0$ nanoparticles offered a 5.2 times greater reaction kinetics over the non-stabilized counterparts. The observed rate constant can be converted to the surface-area-based reaction rate constant ($k_{SA}$) via eqn (21), $$k_{obs} = k_{SA}\alpha_s\rho_m \quad (21)$$

where $k_{obs}$ is the pseudo-first order rate constant ($min^{-1}$); $k_{SA}$ is the specific reaction rate constant based on surface area of the nanoparticles ($L/min \cdot m^2$); $\alpha_s$ is the specific surface area of the nanoparticles ($m^2/g$); $\rho_m$ is the mass concentration of the nanoparticles (g/L).

Based on a specific surface area of 103 $m^2/g$ for CMC-stabilized $Fe^0$ nanoparticles and 33.5 $m^2/g$ for non-stabilized $Fe^0$ nanoparticles, the $k_{SA}$ is calculated to be $1.73 \times 10^{-3}$ $L/min \cdot m^2$ for CMC-stabilized Fe and $1.04 \times 10^{-3}$ $L/min \cdot m^2$ for non-stabilized Fe. Evidently, the marked enhancement in nitrate degradation rate for stabilized Fe nanoparticles is attributed to the increased $Fe^0$ surface area and surface activity.

It has been reported that coating $Fe^0$ nanoparticles with a small fraction (e.g. 0.1% of Fe) of a second catalytic metal (e.g. Pd) can substantially accelerate the reaction rate when used for dechlorination of chlorinated hydrocarbons (He and Zhao, 2005). However, results from FIG. 17 indicate that the presence of Pd at 0.3% (w/w) of Fe did not catalyze nitrate degradation, but actually reduced the rate constant ($k_{obs}$) by about 20% (Table 3). Palladium is loaded to $Fe^0$ nanoparticles via the redox reaction indicated by eqn (22), $$Fe^0 + Pd^{2+} \rightarrow Fe^{2+} + Pd^0 \quad (22)$$

Because of the small fraction of Pd relative to the amount of Fe, eqn (22) should not consume any significant reactivity of the $Fe^0$ nanoparticles. However, Liou et al. (EST, 2005, 9643-9648) observed significant iron surface coverage when 0.25% of copper (based on Fe weight) was coated to iron particles. Since Pd is coated on the iron surface, a portion of the $Fe^0$ surface may be shielded by the Pd patches, resulting in some inhibition of the reaction. Chemically, the presence of Pd may catalyze oxidation of $Fe^0$ by water and/or protons (Huang et al., 1998), $$Fe^0 + 2H_2O \rightarrow Fe^{2+} + H_2 + 2OH^- \quad (23)$$

$$2H_3O^+ + Fe^0 \leftrightarrow H_{2(g)} + Fe^{2+} + 2H_2O \quad (24)$$

Although the resultant $H_2$ may react with nitrate, the favorable effect of Pd on this side reaction diminishes the direct reduction of nitrate by $Fe^0$ nanoparticles.

2.3. Nitrate Reduction at Various $Fe:NO_3^-$ Ratios

In the batch degradation systems, $Fe^0$ nanoparticles can react with nitrate and $H^+$ ions. Based on the nitrate reduction stoichiometry given in eqns (5) and (6), it takes a minimum $Fe/NO_3^-$ of 2.5 to reduce nitrate to $N_2$ and a $Fe/NO_3^-$ of 4 to reach ammonium.

Figure 18:
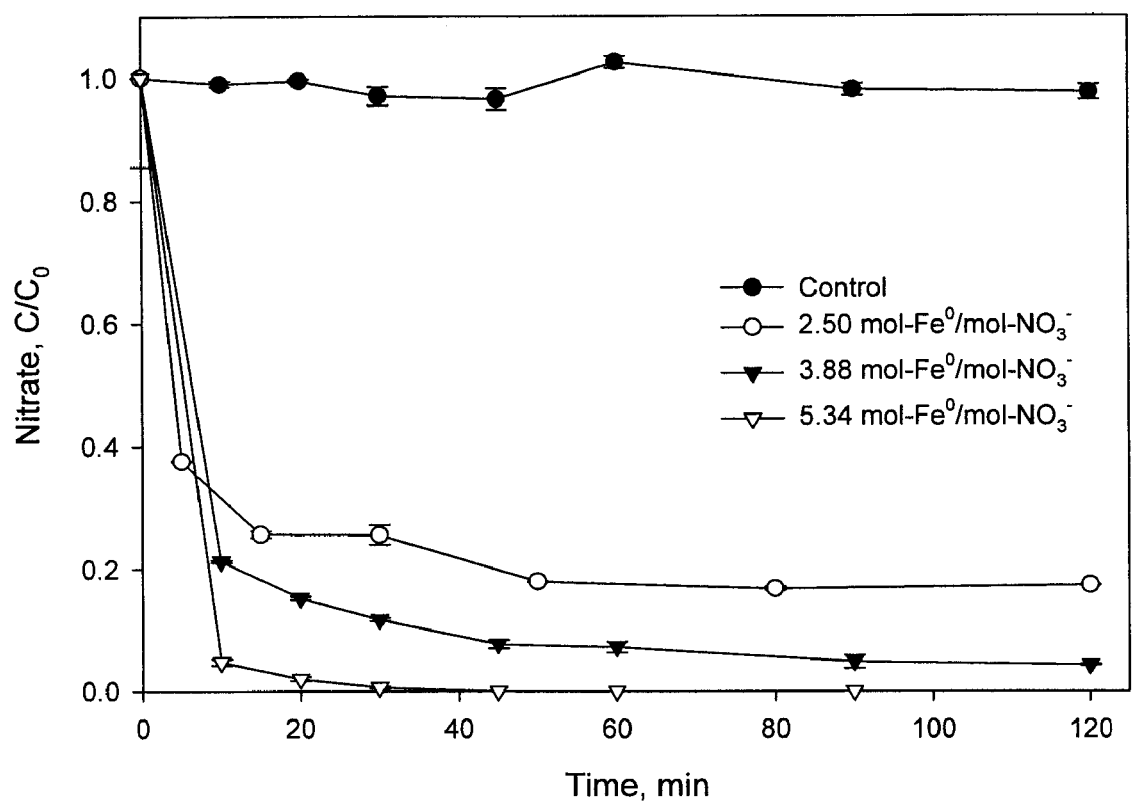
FIG. 18 is a graph illustrating the effect of Fe/Nitrate molar ratio on nitrate removal. $Fe^0$ was prepared with 0.9% NaCMC. Solution pH was controlled at 7.0 to about 7.5 by adding 0.05 M HEPES buffer.

FIG. 18 compares the nitrate reduction kinetics at an $Fe/NO_3^-$ molar ratio of 2.5, 3.9 and 5.3, respectively. Note that the $Fe/NO_3^-$ of 2.5 corresponds to the reaction stoichiometry of eq (6), whereas the ratio of 3.9 conforms to the mechanism of eq (5). The pH of the solution was controlled at neutral by adding 0.05 M HEPES buffer. At an $Fe/NO_3^-$ of 5.3 (i.e. 33% above the highest possible stoichiometry), 100% of 150 mg/L nitrate was rapidly degraded within 50 minutes. When the Error! Not a valid link. was reduced to 3.9 (the stoichiometric quantity of eq (5)), about 95.5 of 200 mg/L nitrate was destroyed within 120 minutes. Interestingly, when the Error! Not a valid link. was reduced to 2.5 (the stoichiometric quantity of eq (6)), a steady state conversion of 83% of 310 mg/L nitrate was observed within 50 minutes. These results indicate that the nitrate reduction stoichiometry is dependent upon the $Fe:NO_3^-$ molar ratio, i.e. eq (5) will be the predominant reaction pathway at an $Fe:NO_3^-$ of near 4.0, whereas eq (6) will be major reaction at an $Fe:NO_3^-$ of around 2.5. Nitrite was detected within 80 minutes, but it only accounted for <0.5% of total nitrogenous species. This result suggests that nitrite was rapidly eliminated through eqn (4), which was also observed by Alowitz and Scherer (2002).

The observed first order rate constants ($k_{obs}$) increased from 0.1012 to 0.1254 $min^{-1}$ when the $Fe/NO_3^-$ molar ratio was increased from 2.5 to 3.9 $min^{-1}$ (Table 3). However, when the Error! Not a valid link. was raised from 3.9 to 5.3, the rate constant increased by a factor of 2.4. The latter remarkable increase in nitrate degradation rate is attributed to the presence of hydrogen atom or gas resulting from the reduction of water and/or protons in the presence of 'excessive' amounts of $Fe^0$, i.e. greater than the maximum stoichiometric quantity of eqn. (6) as indicated by eqs (23) and (24). Thus, pretreating iron particles with $H_2$ resulted in substantial increase in nitrate degradation at pH 7.

2.4 Effect of Stabilizer: Fe Molar Ratio on Reactivity of Nanoparticles.

As shown above, the use of NaCMC prevented $Fe^0$ from agglomerating and substantially enhanced the reactivity of the nanoparticles when used for nitrate reduction. Apparently, both particle stability and chemical reactivity will be a function of the concentration of stabilizer applied for a given Fe concentration, i.e. the stabilizer/Fe molar ratio. To determine the effect of the ratio on the nitrate removal, batch nitrate degradation was followed at a fixed $Fe^0$ concentration of 0.724 g/L but at a range of NaCMC concentration from 0 to 0.9% (w/w).

Figure 19:
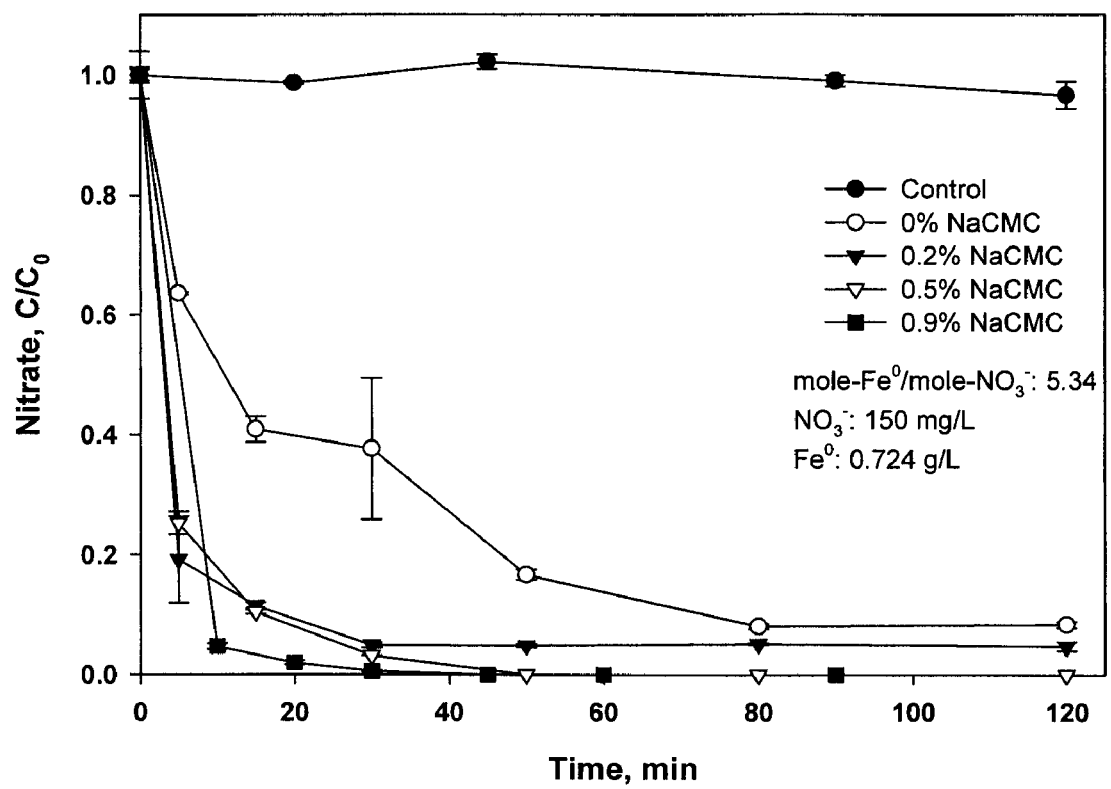
FIG. 19 is a graph illustrating nitrate reduction by different kind of $Fe^0$ nanoparticles. Initial nitrate concentration was 150 mg/L and $Fe^0$ concentration was 0.724 g/L (mole-$Fe^0$/mole-$NO_3^-$=5.34). $Fe^0$ was prepared with 0.9% NaCMC. Solution pH was controlled at 7.1 to about 7.6 by adding 0.05 M HEPES buffer.

FIG. 19 shows the nitrate removal by $Fe^0$ nanoparticles which were stabilized with varying NaCMC concentrations. During the preparation of $Fe^0$ nanoparticles, 0%, 0.2%, 0.5%, 0.9% NaCMC were used to stabilize 1 or 0.724 g/L $Fe^0$ (iron was prepared as 1 g/L, but it was diluted to 0.724 g/L after adding nitrate and pH buffer). The kinetics of nitrate reduction with 0.9% NaCMC stabilized $Fe^0$ was so fast that all nitrate was removed within 60 minutes while nitrate was reduced relatively slowly when 0.2% NaCMC stabilized $Fe^0$ or non-stabilized $Fe^0$ was used. The reaction rate constants ($k_{obs}$) were calculated to be 0.3018 $min^{-1}$ (#9 in Table 3), 0.2597 $min^{-1}$ (#14 in Table 3), 0.1981 $min^{-1}$ (#13 in Table 3), 0.0391 $min^{-1}$ (#12 in Table 3) for 0.9% NaCMC stabilized $Fe^0$, 0.5% NaCMC stabilized $Fe^0$, 0.2% NaCMC stabilized $Fe^0$, non-stabilized $Fe^0$, respectively. The results suggest that higher concentration of stabilizer can result in faster nitrate reduction kinetics. The reason for this result is that higher dose of stabilizer provide better stabilized $Fe^0$ nanoparticles which have more surface area for nitrate reduction. It is reported (He and Zhao, 2006) that as Fe clusters are formed, the NaCMC molecules are anchored on the iron particle surface through the interactions between the nanoparticles and the terminal functional groups of CMC, such as C—$O^-$, C—O—C, C=O, and O—H. As a result, the nanoparticles are encapsulated with a thin layer of negatively charged CMC. This protective layer prevents the nanoparticles from agglomerating with other nanoparticles due to the electrostatic repulsion between the negatively charged functional groups of CMC molecules. In order to achieve effective stabilization of the resultant nanoparticles, a sufficient dose of CMC was required.

2.5. pH Effect on Nitrate Reduction by $Fe^0$ Nanoparticles

As indicated in eqn (3) to (5), the nitrate reduction consumes acidity because $H^+$ participates in these reactions. On the other hand, corrosion of $Fe^0$ also requires acidity as implied in eqn (24). Consequently, pH has a significant effect on nitrate reduction by $Fe^0$ nanoparticles.

Figure 20:
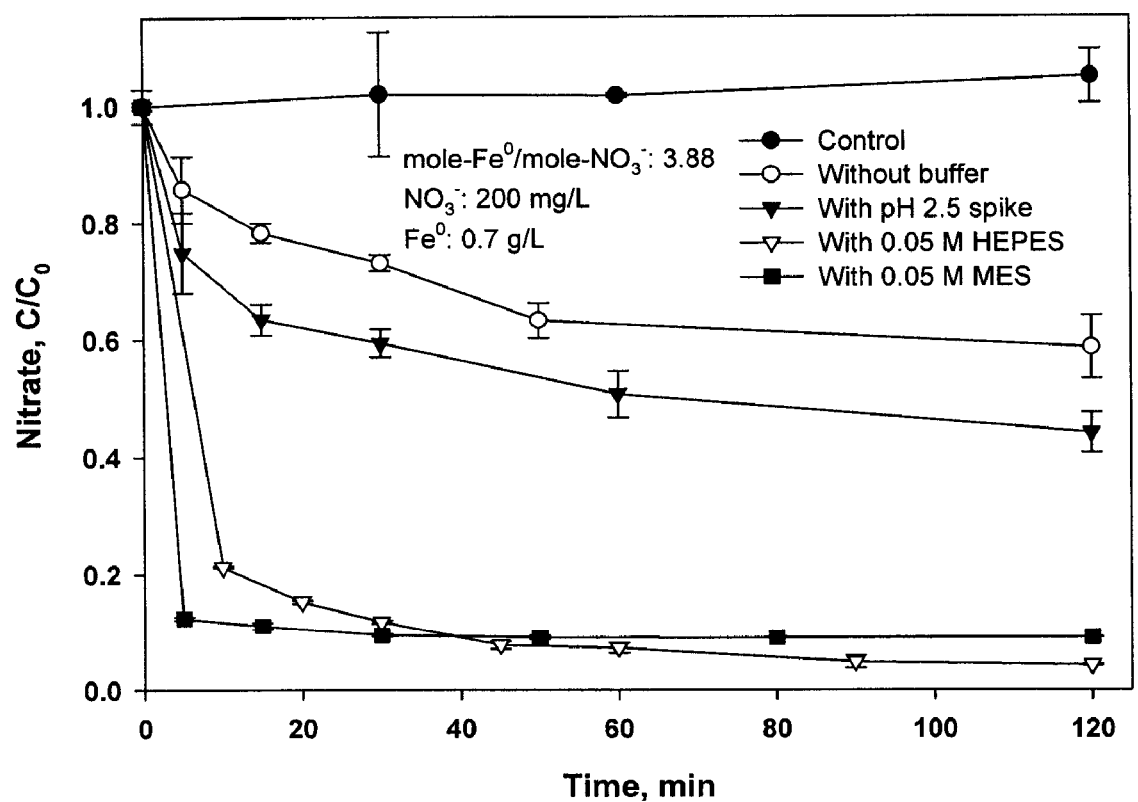
FIG. 20 is a graph illustrating the effect of solution pH on nitrate removal. Initial nitrate concentration was 200 mg/L and $Fe^0$ concentration was 0.7 g/L (mole-$Fe^0$/mole-$NO_3^-$=3.88). $Fe^0$ was prepared with 0.9% NaCMC.
Figure 21:
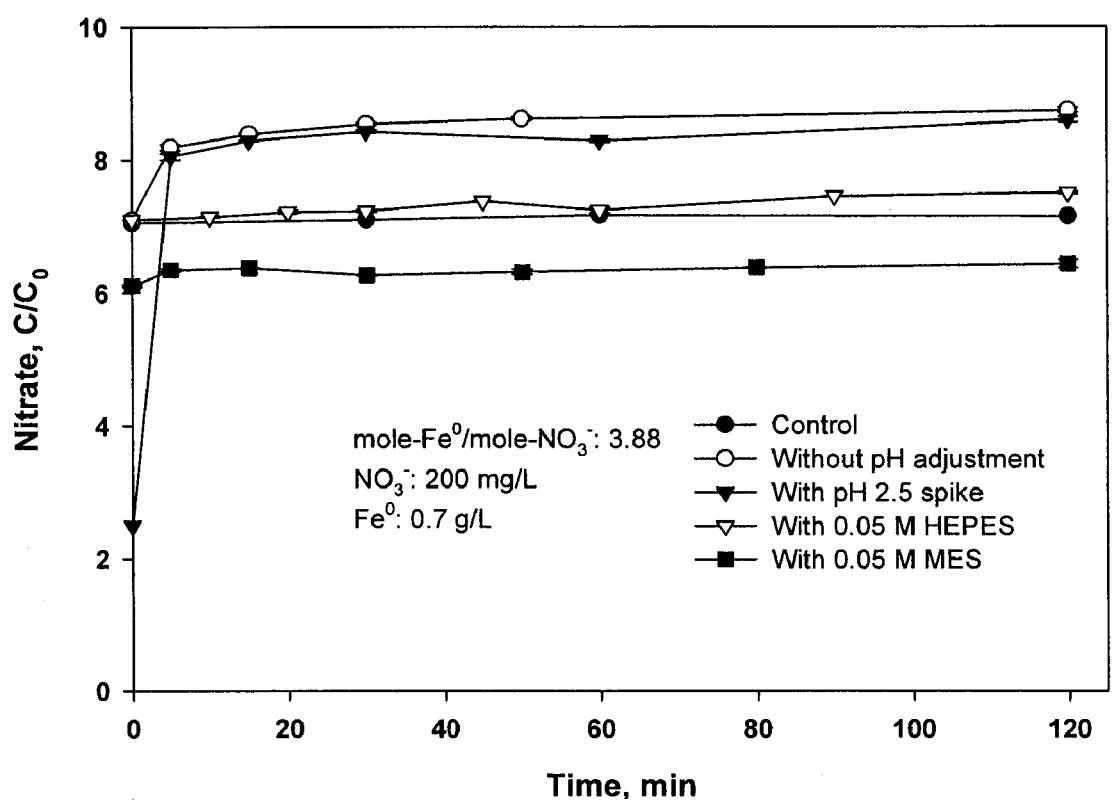
FIG. 21 is a graph illustrating the pH change during nitrate removal in varying pH conditions. Initial nitrate concentration was 200 mg/L and $Fe^0$ concentration was 0.7 g/L (mole-$Fe^0$/mole-$NO_3^-$=3.88). $Fe^0$ was prepared with 0.9% NaCMC.

FIG. 20 and FIG. 21 show the nitrate reduction at different pH conditions and the pH evolution during the reaction, respectively. All the tests were carried out with a $Fe^0/NO_3^-$ molar ratio of 3.88 (0.7 g/L $Fe^0$ and 200 mg/L $NO_3^-$) and the $Fe^0$ nanoparticles were stabilized with 0.9% NaCMC. Without pH adjustment, nitrate was reduced slowly with a $k_{obs}$=0.0085 $min^{-1}$ (#6 in Table 3) and the pH experienced a quick increase from 7.11 to 8.19 in 5 minutes and then a slow increase from 8.19 to 8.74 in 120 minutes. Another test without pH adjustment was carried out on non-stabilized $Fe^0$ (data is not shown in FIG. 5). A much slower reaction rate $k_{obs}$=0.0015 min$^{-1}$ (#7 in Table 3) was calculated and the pH increased from 6.80 to 8.51 in 5 minutes and moved up slowly to 8.58 in 120 minutes. This difference in reaction rates between stabilized and non-stabilized Fe$^0$ without pH adjustment is consistent with early discussion that stabilized Fe$^0$ provides more surface area for nitrate reduction. A lower initial pH was used to speed up this reaction by spiking the pH to 2.50 with 1 M HCl. This increased acidity improved moderately the nitrate reduction kinetics. A reaction rate $k_{obs}$=0.0113 min$^{-1}$ (#5 in Table 3) was calculated and the pH jumped to 8.05 in 5 minutes and increased slowly to 8.60 in 120 minutes. This result suggests that the acidity was used up instantly after Fe$^0$ nanoparticles were added and a pH buffer is needed to provide constant acidity to support nitrate reduction. Then, a neutral pH buffer (HEPES) was used to control the pH. The $pK_a$ of HEPES is 7.45 at 20° C. and a pH=7.10 can be calculated if 0.05 M HEPES was added. In this test, 0.05 M HEPES was used and a reaction rate $k_{obs}$=0.1254 min$^{-1}$ (#3 in Table 3) was obtained, which is about 28 times of that without pH adjustment. And the pH was controlled from 7.10 to 7.51 within 120 minutes. A control test with 0.05 M HEPES but without addition of Fe$^0$ was included in this test to see the effect of HEPES on nitrate removal. Nitrate concentration kept constant during the reaction with small variation. These results suggest that HEPES can be used as an effective buffer in this reaction. Another pH buffer, 0.05 M MES, was also used to test the nitrate reduction by Fe$^0$ nanoparticles in acidic conditions. The $pK_a$ of MES is 6.10 at 25° C. The pH was controlled within 6.11 to about 6.43 during the reaction when 0.05 M MES was added, as indicated in FIG. 21. 87.6% of nitrate was removed in 5 minutes and, after that, nitrate concentration remained relatively stable in 120 minutes when 90.7% nitrate was removed, as shown in FIG. 20. A reaction rate $k_{obs}$=0.4089 min$^{-1}$ (#8 in Table 3) was calculated. Compared to the continuous nitrate degradation after initial 10-minute drop when 0.05 M HEPES was used, nitrate reduction was slow after initial 5-minute drop when 0.05 M MES was used. The possible reason for this difference is that part of Fe$^0$ nanoparticles were consumed in acidic condition.

2.6. The Effect of Salinity on Nitrate Reduction

Ion exchange is a widely used process for nitrate removal. There were fifteen ion exchange plants operating for drinking water treatment in the United States in 1992 (Clifford and Liu, 1993a). Some nitrate-selective resins have been developed and used. However, nitrate is concentrated in the regeneration residue after the exhausted resins are regenerated with an eluent, such as 4% to about 12% (w/w) NaCl. Disposal of used regenerant containing high level of nitrate and sodium chloride is an important issue in the application of ion exchange process for nitrate removal.

Figure 22:
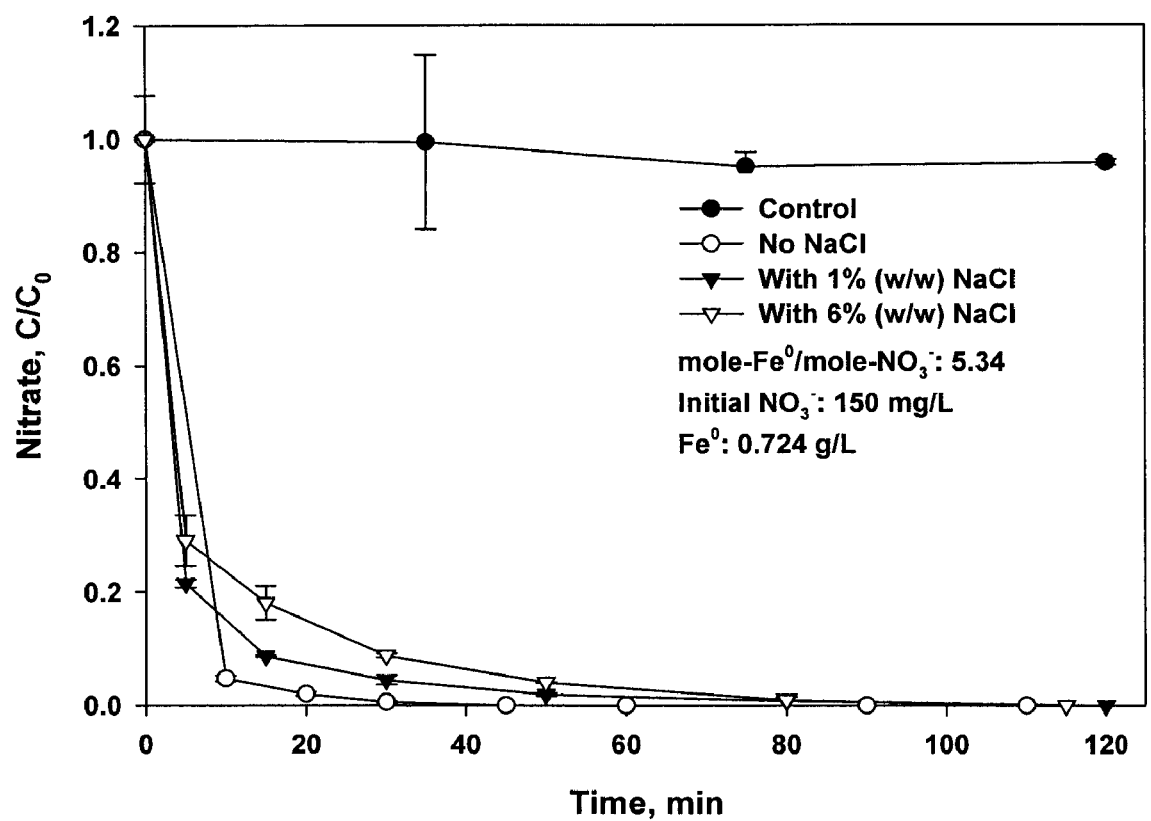
FIG. 22 is a graph illustrating nitrate removal by stabilized $Fe^0$ in the presence of different concentration of NaCl. Initial nitrate concentration was 150 mg/L and $Fe^0$ concentration was 0.724 g/L (mole-$Fe^0$/mole-$NO_3^-$=5.34). $Fe^0$ was prepared with 0.9% NaCMC. Solution pH was controlled at 7.1 to about 7.5 by adding 0.05 M HEPES buffer.

FIG. 22 shows the nitrate removal by stabilized Fe$^0$ nanoparticles in the presence of varying concentration of NaCl. Tests were conducted with 0.72 g/L Fe$^0$ and 150 mg/L NO$_3^-$ to yield a Fe$^0$/NO$_3^-$ molar ratio of 5.34. The solution pH was control at 7.1 to about 7.5 by adding 0.05M HEPES buffer. 1% or 6% (w/w) NaCl were added to the solution. As shown in FIG. 19, nitrate reduction by Fe$^0$ nanoparticles was inhibited by chloride. With increasing NaCl concentration, the nitrate reduction rate ($k_{obs}$) was reduced. When there was no chloride in the system, the $k_{obs}$ was 0.3018 min$^{-1}$ (#9 in Table 3), while the $k_{obs}$ was decreased to 0.2967 min$^{-1}$ (#10 in Table 3) and 0.2105 min$^{-1}$ (#11 in Table 3) when 1% and 6% NaCl presented in the solution. The possible reason for this inhibition is that chloride will compete with nitrate for Fe$^0$ surface where the nitrate reduction happens. However, 100% of nitrate was removed within 2 hours although the nitrate reduction rate ($k_{obs}$) was reduced by 30.12% when 6% NaCl was present in the system. This result suggests that Fe$^0$ nanoparticles can be used as an efficient technology to dispose used nitrate regenerant from ion exchange.

2.7. Mass Balance of Nitrate Reduction.

Figure 23:
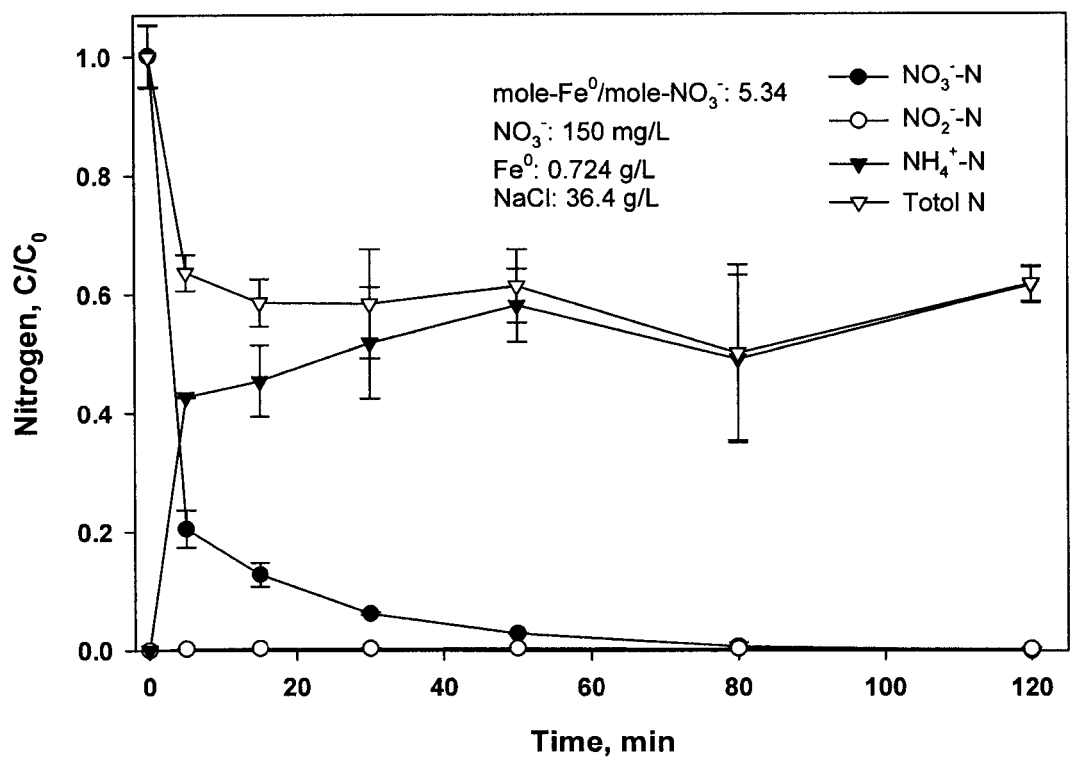
FIG. 23 is a graph illustrating mass balance of nitrate reduction by stabilized $Fe^0$ nanoparticles at neutral pH with initial $NO_3^-$–N=2.42 mM. Initial nitrate concentration was 150 mg/L and $Fe^0$ concentration was 0.724 g/L (mole-$Fe^0$/mole-$NO_3^-$=5.34) in the presence of 6% NaCl. $Fe^0$ was prepared with 0.9% NaCMC. Solution pH was controlled at 7.1 to about 7.5 by adding 0.05 M HEPES buffer.

FIG. 23 shows the mass balance of nitrogenous species during the denitrification by stabilized Fe$^0$ nanoparticles. 5.34 mol-Fe$^0$/mol-NO$_3^-$ (0.724 g/L Fe$^0$ and 150 mg/L NO$_3^-$) was used in this test and 6% NaCl was present in the system. Nitrite was detected before 80 minutes and it disappeared at 120 minutes. The nitrite concentration was very low and it accounted for 0.25% to about 0.39% of total nitrogenous species during the reaction. This indicates that nitrite is one of the intermediate products from nitrate reduction by stabilized Fe$^0$ nanoparticles, but it was further reduced quickly to other nitrogen form. And the reaction step from nitrate to nitrite may be the rate-limiting step. Ammonium was the main product in this reaction. Its concentration increased as the reaction progressed. However, the total percentage of ammonium +nitrite +remaining nitrate was 50.19% to about 63.69% during the reaction. There are dips of NH$_4^+$—N and total N concentration at 80 minutes in FIG. 23, which can be attributed to experimental errors and their standard errors are with reasonable ranges. This result suggests that other nitrogenous species, such as N$_2$(g) might be produced. N$_2$ gas is the most probable species. Choe et al. (2000) reported N$_2$ is the end product of nitrate reduction by nanoscale ZVI (size: 1-100 nm; surface area: 31.4 m$^2$/g) without pH control. Yang and Lee (2005) reported that ammonium accounted for about 90% of reaction products and suggested that N$_2$ should account for the balance using nanosized ZVI (size: 50-80 nm; BET surface area: 37.83 m$^2$/g) under acidic pH. Chen et al. (2005) observed different final denitrification products by microscale and nanoscale ZVI metals. Microscale zero-valent iron (size: 45 µm; surface area: 0.183 m$^2$/g) converted nitrate to ammonia completely, but nanoscale ZVI (size: 1-20 nm; surface area: 25.4 m$^2$/g) converted nitrate to ammonia partially from 36.2% to 45.3% dependent on pH.

Based on the findings obtained in this work, eqn (3) and eqn (5) are the main reaction pathways for nitrate reduction by stabilized Fe$^0$ nanoparticles. Nitrate can be reduced to ammonium either directly through eqn (3) or indirectly through a pathway consisting eqn (4) and the following eqn (23), which is evidenced by the detection of nitrite.

3.0. Conclusions

A stabilized Fe$^0$ nanoparticles was prepared with a "green" and low-cost cellulose (sodium carboxymethyl cellulose) for nitrate removal. The particle size of the stabilized Fe$^0$ nanoparticles was about 7.4 nm with a standard deviation of 1.2 nm and the specific surface area was 103.02 m$^2$/g. Batch tests proved that Fe$^0$ nanoparticles are efficient for nitrate reduction. With a Fe$^0$/NO$_3^-$ molar ratio of 5.34 and with 0.05 M HEPES buffer, nitrate was completely removed within 60 minutes. And the first order reaction model was used to fit the reaction. A first-order reaction rate constant ($k_{obs}$=0.3018 min$^{-1}$) was calculated. The solution pH was found to play an important role in this system. The nitrate reduction was limited when there is no pH adjustment ($k_{obs}$=0.0085 min$^{-1}$) or with initial pH=2.50 spike ($k_{obs}$=0.0113 min$^{-1}$), while 0.05 M HEPES improved significantly the kinetics of this reaction ($k_{obs}$=0.1254 min$^{-1}$) under otherwise the same conditions. A pH buffer to provide constant acidity is necessary to support nitrate removal in this reaction. Increasing the molar ratio (mol-Fe$^0$/mol-NO$_3^-$) resulted a higher reaction rate. $k_{obs}$ was enhanced from 0.1254 min$^{-1}$ with 3.88 mol-Fe$^0$/mol-NO$_3^-$ to 0.3018 min$^{-1}$ with 5.34 mol-Fe⁰/mol-NO₃⁻. Different background chloride was included to the system to elucidate the effect of salinity on denitrification by stabilized Fe⁰ nanoparticles. The results showed that chloride inhibited the denitrification due to competition for reactive Fe⁰ surface between Cl⁻ and NO₃⁻, but 100% nitrate removal was achieved within 2 hours in the presence of 6% (w/w) NaCl, suggesting that stabilized Fe⁰ nanoparticles can effectively dispose exhausted nitrate regenerant from ion exchange. Mass balance of nitrogenous species showed that about 60% nitrate was transformed to ammonium and nitrogen gas was another most possible final product.

As-based pesticides. In addition, a relatively clean red soil was collected near a small police fire range in east-central, Alabama, USA. Both soils were first fractionated using standard sieves, and soil fractions of <250 μm were used in all experiments.

The WAOS soil has an iron content of nearly 5.24% and a soil pH of 6.75. The range soil has a higher iron content (12.2%) and a soil pH of 4.83. For subsequent arsenic immobilization tests, the range soil was first spiked with arsenic following the procedures by Yang et al. (2002), resulting in an arsenic concentration of 89 mg/kg.

TABLE 3

First order reaction fitting results

| # | mol-Fe/mol-NO₃⁻ | pH control | NaCMC, % | NaCl, % | $k_{obs}$, min⁻¹ | $R^2$ | Pd$^a$ |
|---|---|---|---|---|---|---|---|
| 1 | 250 | 0.05 M HEPES | 0.9 | — | 0.1012 | 0.74 | — |
| 2 | 3.88 | 0.05 M HEPES | — | — | 0.0245 | 0.74 | — |
| 3 | 3.88 | 0.05 M HEPES | 0.9 | — | 0.1254 | 0.95 | — |
| 4 | 3.88 | 0.05 M HEPES | 0.9 | — | 0.1002 | 0.94 | 0.3% of Fe |
| 5 | 3.88 | pH 2.5 spike | 0.9 | — | 0.0113 | 0.74 | — |
| 6 | 3.88 | No pH control | 0.9 | — | 0.0085 | 0.90 | — |
| 7 | 3.88 | No pH control | — | — | 0.0015 | 0.92 | — |
| 8 | 3.88 | 0.05 M MES | 0.9 | — | 0.4089 | 0.96 | — |
| 9 | 5.34 | 0.05 M HEPES | 0.9 | — | 0.3018 | 0.99 | — |
| 10 | 5.34 | 0.05 M HEPES | 0.9 | 1 | 0.2967 | 0.99 | — |
| 11 | 5.34 | 0.05 M HEPES | 0.9 | 6 | 0.2105 | 0.95 | — |
| 12 | 5.34 | 0.05 M HEPES | — | — | 0.0391 | 0.90 | — |
| 13 | 5.34 | 0.05 M HEPES | 0.2 | — | 0.1981 | 0.98 | — |
| 14 | 5.34 | 0.05 M HEPES | 0.5 | — | 0.2597 | 0.99 | — |

Pd$^a$ stands for the weight of Pd used in the tests.

EXAMPLE 4

The objective of this experiment was to test the effectiveness of stabilized nanoparticles for reducing the bioaccessibility and TCLP leachability of arsenic in soils. Three types (ZVI, FeS, and Fe₃O₄) of stabilized nanoparticles were prepared using a water-soluble starch as a stabilizer, and then used for treating two representative soils in batch experiments. Effects of the Fe-to-As molar ratio and treatment time on the treatment effectiveness were examined.

1.0. Materials and Method 1.1. Materials

All chemicals used in this study were of analytical grade or above, and were obtained from Fisher Scientific (Pittsburgh, Pa.). All solutions were prepared with deionized water (18 MΩ·cm).

An As-contaminated sandy soil (As concentration: 315 mg/kg and denoted as WAOS) was collected from Washington Orchard, an orchard contaminated from application of 1.2. Preparation of Nanoparticles The method developed by He and Zhao (2005) was adopted for preparing ZVI nanoparticles. In brief, a water-soluble starch (Alfa Aesar, Wall Hill, Mass.) was used as a stabilizer in the preparation. The preparation was carried out in a 250 mL flask. Before use, deionized (DI) water and starch solution were purged with N₂ for 2 h to remove dissolved oxygen (DO). FeCl₃ stock solution was added to a starch solution (2.4%) through a buret, to give a final Fe concentration of 2.35 g/L and a starch concentration of 1.2%. The final pH was 8.1. Then, Fe³⁺ was reduced to Fe⁰ using stoichiometric amounts of sodium borohydride (equation 25). To ensure efficient use of the reducing agent BH₄⁻, the reactor system was operated in the absence of DO, The flask was shaken via hands during the reaction.

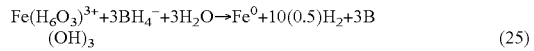

$$Fe(H_6O_3)^{3+} + 3BH_4^- + 3H_2O \rightarrow Fe^0 + 10(0.5)H_2 + 3B(OH)_3 \quad (25)$$

A method used by Si et al. (2004) was modified for synthesizing magnetite (Fe₃O₄) nanoparticles. First, 50 mL of an aqueous solution of FeCl₂·4H₂O (5.0 g/L as Fe) was added dropwise to a 50 mL aqueous solution of 2.55% (w/v) starch solution under continuous shaking. The mixture was shaken for 30 minutes to allow for formation Fe²⁺-starch complex.

Then, the pH of the solution was then increased slowly to 11 by adding 0.5 M NaOH solution. The reaction mixture was subsequently aged for 1 h with constant shaking, give a final Fe concentration of 2.35 g/L and a starch concentration of 1.2%. (equation 26).

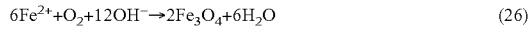

$$6Fe^{2+}+O_2+12OH^-\rightarrow 2Fe_3O_4+6H_2O \quad (26)$$

The method by Xu and Akins (2004) for preparing CdS nanoparticles was modified for preparing our starch-stabilized FeS nanoparticles. First, deionized water and starch solution (3.6%) were purged with nitrogen to remove dissolved oxygen. The, $FeCl_2$ solution was prepared and added into starch solution to form Fe-starch complex (Fe: 3.525 g/L, Starch: 1.8% (w/w)). $Na_2S$ solution (4.03 g/L as S) was added dropwise to Fe-starch solution to form the FeS nano-particles, with a final Fe concentration of 2.35 g/L, a starch concentration 1.2% (w/w) and a final pH of 6.8. Equation 27 gives the reaction stoichiometry.

$$FeCl_2+Na_2S\rightarrow FeS+2NaCl \quad (27)$$

1.3. Treatment of As-Contaminated Soils

A series of soil treatment tests were performed in 15 mL centrifuge tubes (Fisher, polypropylene tube), where 2 g of an As-laden soil sample was mixed with a nanoscale particle ($Fe_3O_4$, FeS, or NVI) suspension. To test the effect of iron dosage on arsenic immobilization effectiveness, the range of Fe:As molar ratio (5:1, 10:1, 25:1, 50:1, 75:1, 100:1) was tested. In all cases, the soil-to-solution ration was either 1 g:2 mL (for Fe:As molar ratio of 5:1, 10:1, or 25:1) or 1 g:5 mL (for Fe:As molar ratio of 50:1, 75: 1, 100:1). In addition, control tests were carried out in parallel with 2 g of a soil with 4 mL and 10 mL, respectively, of 1.2% starch solution. After the mixtures were shaken thoroughly for 5 minutes, the tubes were placed on a rotator for 3 days or 7 days. After the treatments, all samples were centrifuged with 6000 g force (Fisher, Accuspri 400 centrifuger). Arsenic and iron concentrations in the supernatants were monitored after centrifuging. Upon removal of the supernatant, each soil sample was oven-dried at 70° C. for one day. The, 0.1 g of treated soils was sampled and used for PBET, 0.5 g for TCLP tests, and 1.0 g for soil pH measurements. To ensure data quality, all tests were performed in duplicates.

1.4. TCLP and PBET Extraction Tests

The bioaccessibility of lead was monitored by a modified PBET method (Yang et al. 2002; Yang et al. 2005). PBET extraction solution was made using a 0.4 M glycine solution adjusted to a pH of 1.5 using HCl solution. In each PBET test, 0.1 gram of a soil sample is mixed with 10 mL of the extraction solution, i.e. a solid-to-solution ratio of 1:100. During the 1-h extraction, water temperature was maintained at body temperature (37±2° C.) with a water bath. After the extraction, the samples were centrifuged at 1000 g force. The supernatant was then filtered using 0.45 μm filter (Fisher, DISPNR 25 mm 0.45 μm filter), and then analyzed for arsenic extracted. To ensure QA/QC, NIST soil samples were also subjected to the same procedure.

TCLP tests were performed to evaluate the leaching potential of arsenic in the untreated and treated As-contaminated soils following the US. EPA protocol (Method SW-846). In brief, 0.5 g of an air-dried soil sample was mixed with the TCLP extraction solution at a solid-to-liquid ratio of 1:20. The mixtures were placed on a rotating shaker operated at 30 rpm. After 18 hours of extraction, the samples were centrifuged at 1000 g force, and the supernatants were separated by 0.45 μm filter. The soluble arsenic concentration in the filtrate was analyzed with AAS.

1.5. Analytical Methods

Aqueous samples were diluted as necessary and analyzed for aqueous As and Fe concentrations. A graphite-furnace atomic absorption spectrometer (GFAA) was used to analyze As concentration. Aqueous Fe concentrations in samples were analyzed using a flame atomic adsorption spectrometer (FLAA). Solution pH was measured with a pH meter (Thermo Orion, pH meter 410).

2.0. Results and Discussion

2.1. Treatment Effects on Water and Soil Chemistry

As mentioned earlier, treated soil samples were first centrifuged. To ensure mass balances for both the nanoparticles and arsenic in the systems, total Fe and As in the supernatants were also analyzed. For the range soil samples treated with the three nanoparticles, iron concentration was less than 1% of total Fe amount added, and arsenic concentration was less than 0.5% total arsenic initially in the soils. These observations indicated that upon the high speed centrifuging, virtually all of the nanoparticles were removed from the aqueous phase. For the WAOS soil samples, 0.1-1.1% of total iron and 1.1-2.4% of arsenic stayed in the supernatant when treated with $Fe_3O_4$ nanoparticles, whereas 1.5-2.6% of total iron and 0.9-2.7% of arsenic remained in the supernatants with nanoscale NVI particles; and 1.3-3.9% of total iron and 0.3-2.7% arsenic were in the supernatants with FeS nanoparticles. These results again indicated that most of iron treatments were removed from the solution.

The soil pH was also measured after the treatments. All results were shown in Table 4. For two type's soils, pHs of control samples were similar with the initial soil pH, and after NVI and FeS Nanoparticles treatments, the soil pHs didn't change. However, because $Fe_3O_4$ nanoparticles solution has a high pH (about 11), the pH of soil samples increase a little after nanoscale $Fe_3O_4$ particles treatment.

2.2. Reduction of PBET-Bioaccessibility

Figure 24:
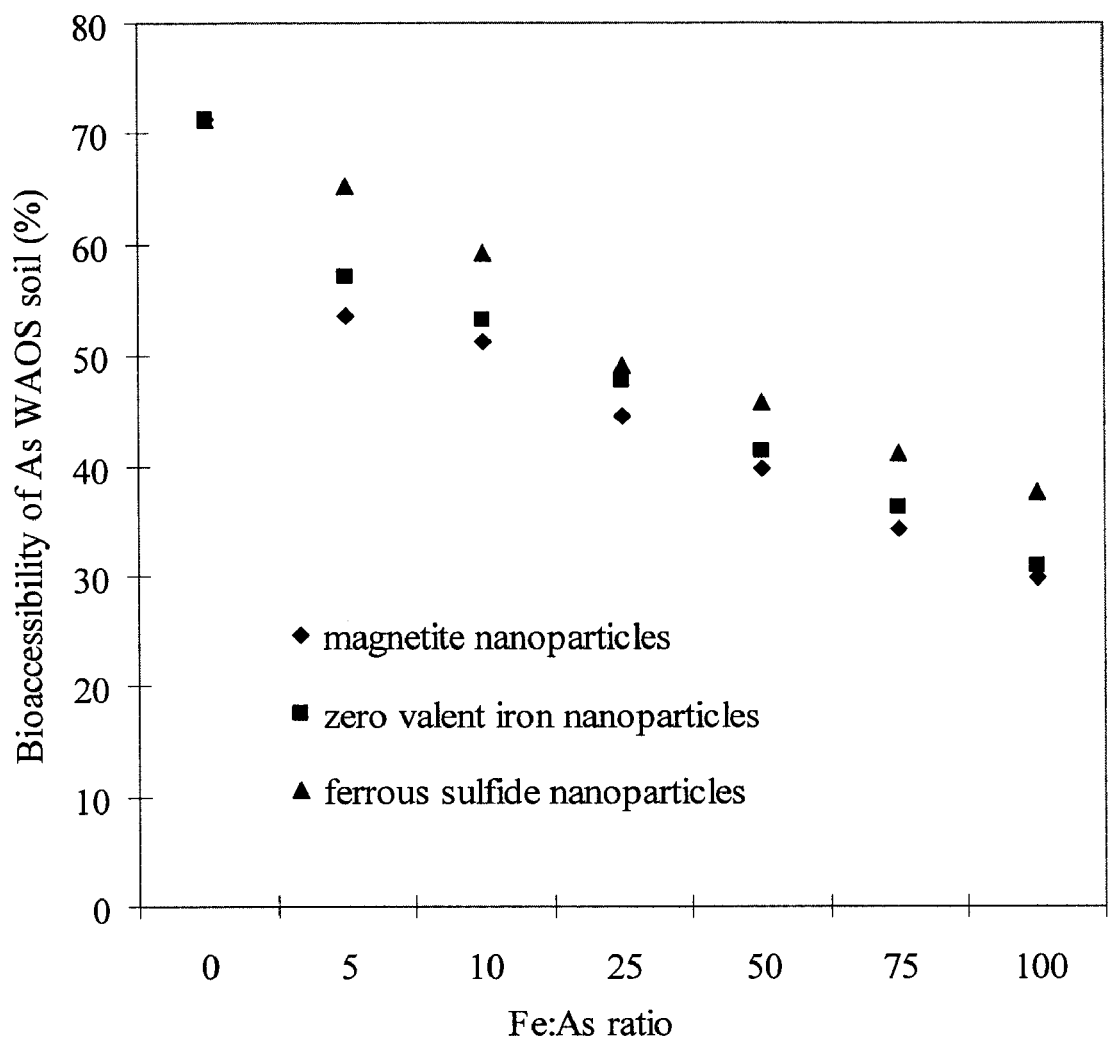
FIG. 24 is a graph illustrating a comparison of arsenic (As) bioaccessibility (PBET) of WAOS soil sample by different Fe/As ratio iron based nanoparticles treatment.

The PBET-based bioaccessibility of arsenic for WAOS soil samples were measured after the treatments, and is given in FIG. 24. FIG. 24 shows that with the increasing Fe/As molar ratio, the bioaccessibility decreased progressively. After three days of the treatments, the bioaccessibility of As decreased from an initial 71.3±3.1% to 29.8±3.1%, 30.9±3.2%, 37.6±1.2% for Fe/As ratio 100:1 $Fe_3O_4$, NVI, FeS nanoparticles, respectively. Earlier, Subacz (2004) studied the reduction of bioaccessibility of the same soil with Fe/As ratio 100:1 $FeCl_3$ amendment, and the bioaccessibility decreased to 33% after treatment. Compare to Subacz's result, magnetite nanoparticles treatment appears a little better (29.8% vs. 33%) than normal iron amendments.

Figure 25:
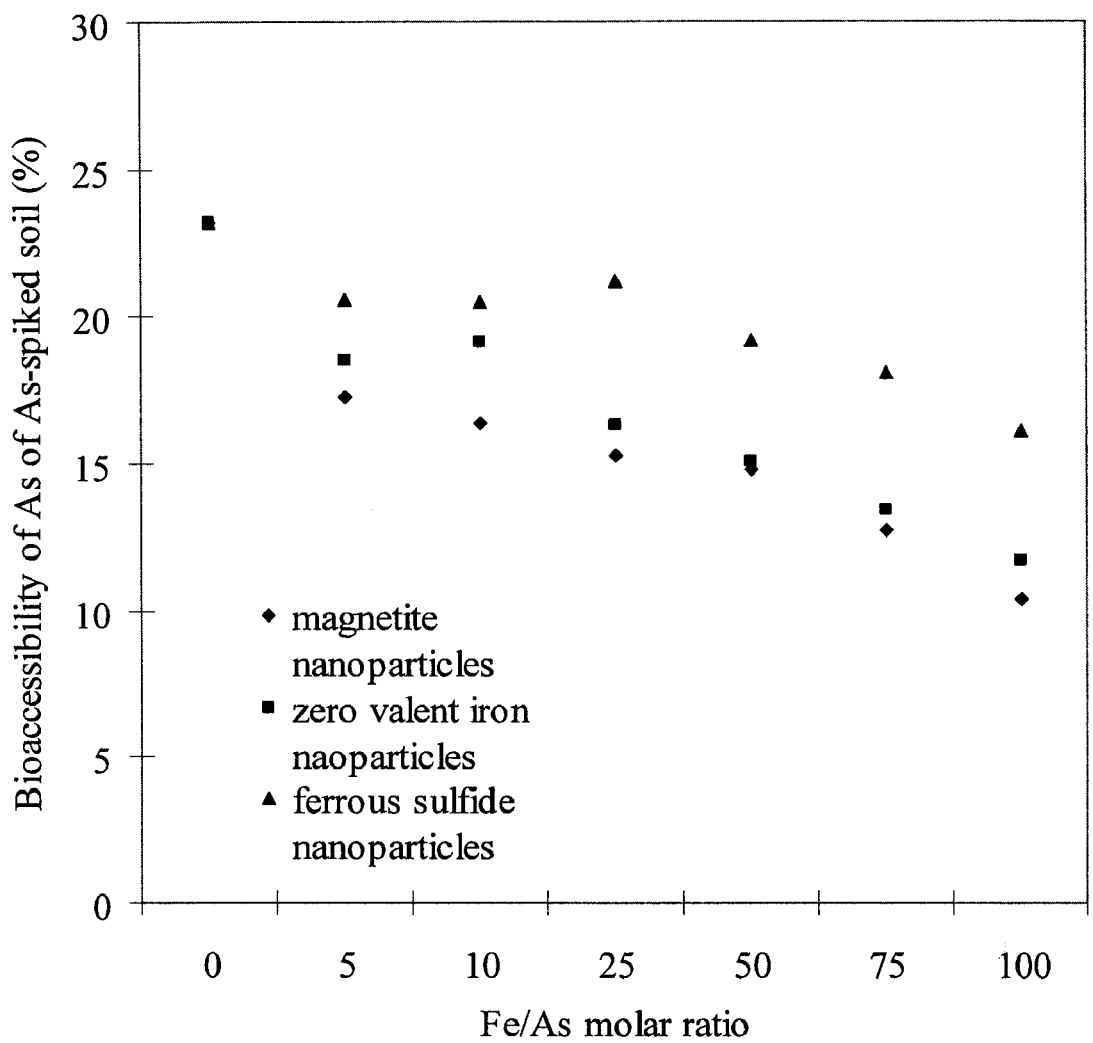
FIG. 25 is a graph illustrating a comparison of As bioaccessibility (PBET) of As-spiking soil sample by different Fe/As ratio iron based nanoparticles treatment.

For the As-spiked soil, similar results were observed (FIG. 25). After three days of the treatments, the bioaccessibility of As decreased from an initial 23.2±2.8% to 10.4±1.5%, 11.7±1.4%, 16.1±0.8% for Fe/As ratio 100:1 $Fe_3O_4$, NVI, FeS nanoparticles, respectively. For the two soils, $Fe_3O_4$ nanoparticles appear to be most effective for As immobilization. The better performance of $Fe_3O_4$ nanoparticles treatment is at least partially due to the elevated soil pH upon the treatment. Earlier, Yang et al. (Yang et al. 2002) reported that bioaccessibility decreases with increasing soil pH. The treatment was more effective for the range soil, which has a >2 times greater iron content. Yang et al. (2002) concluded that bioaccessibility of soil arsenic decrease with increasing iron content. Akhter et al. (2000) also studied relationship between TCLP leachability of As-contaminated soils and iron content, and he correlated the leachability of As in soils and with iron content.

2.3 Reduction TCLP-Leachability

Figure 26:
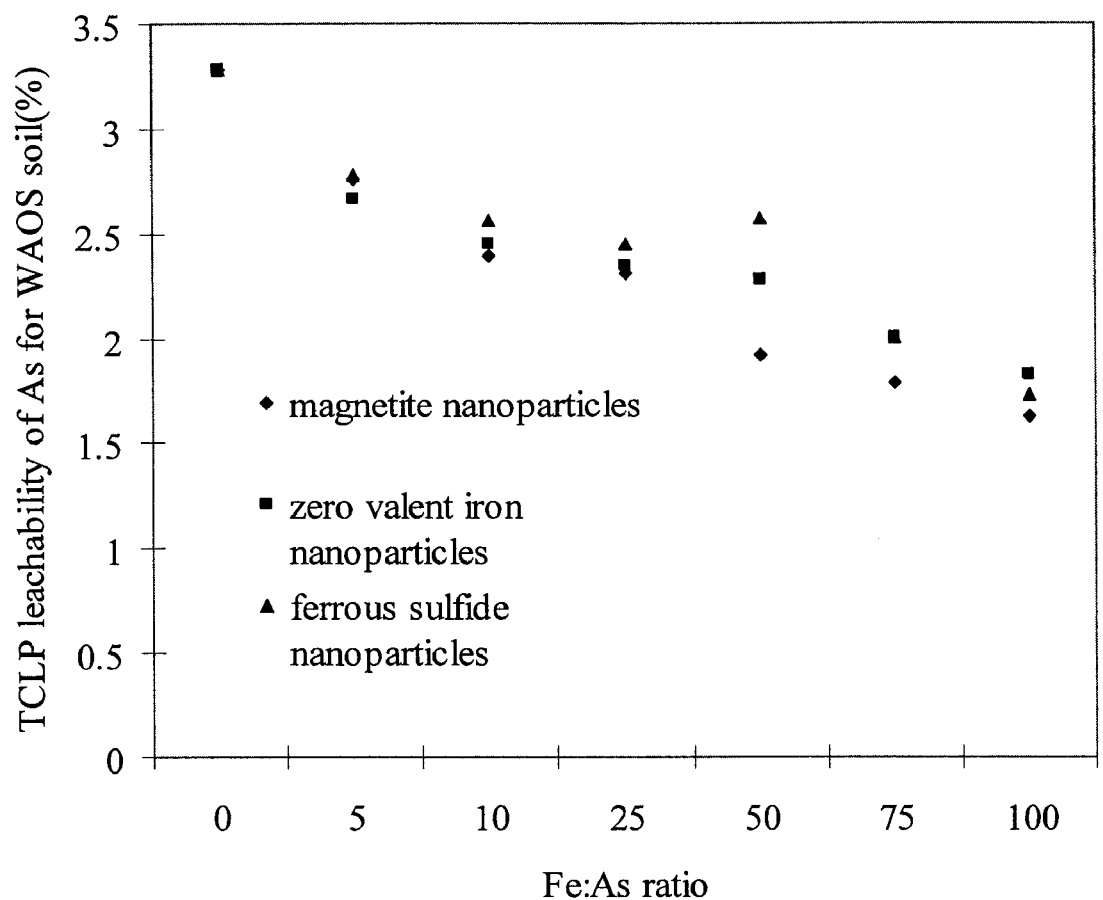
FIG. 26 is a graph illustration a comparison of As TCLP leachability of WAOS soil samples by series Fe/As ratio iron based nanoparticles treatment.
Figure 27:
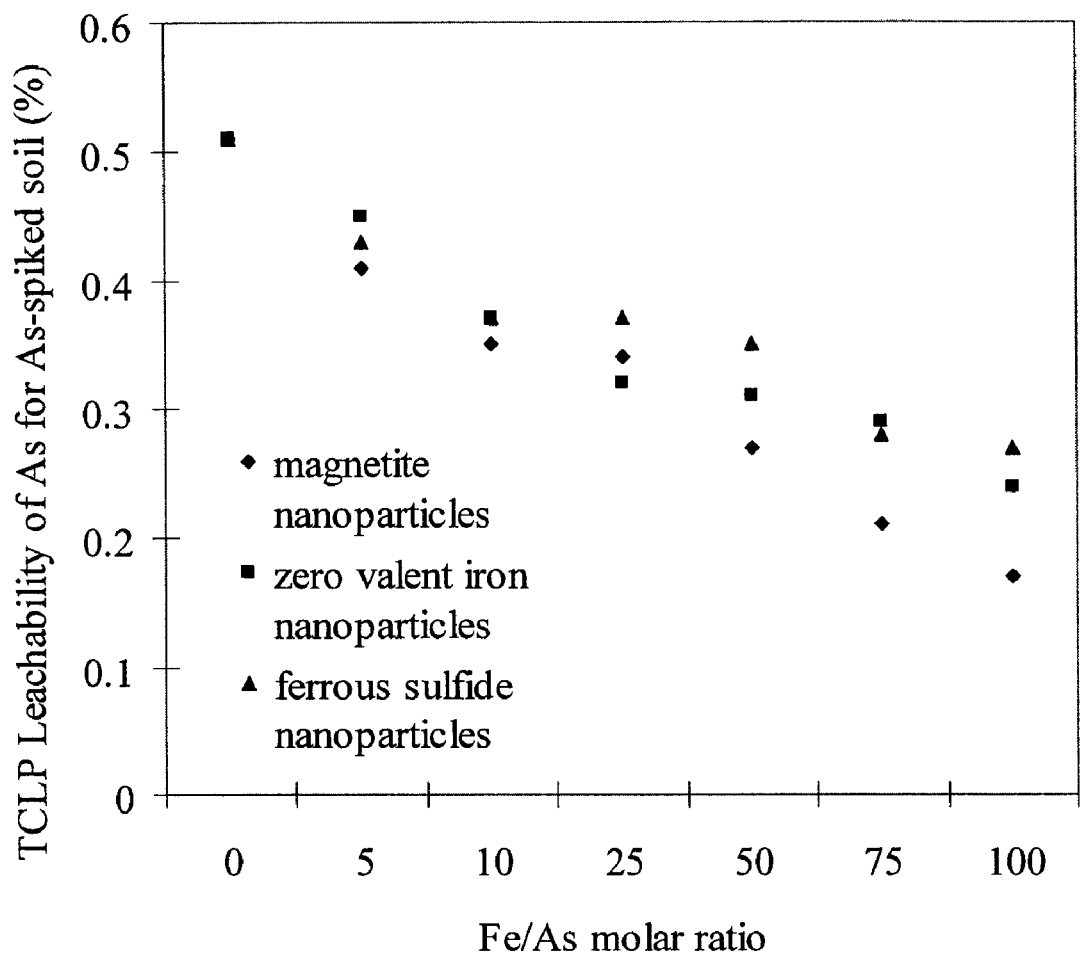
FIG. 27 is a graph illustrating a comparison of As TCLP leachability of As-spiking soil samples by series Fe/As ratio iron based nanoparticles treatment.
Figure 28:
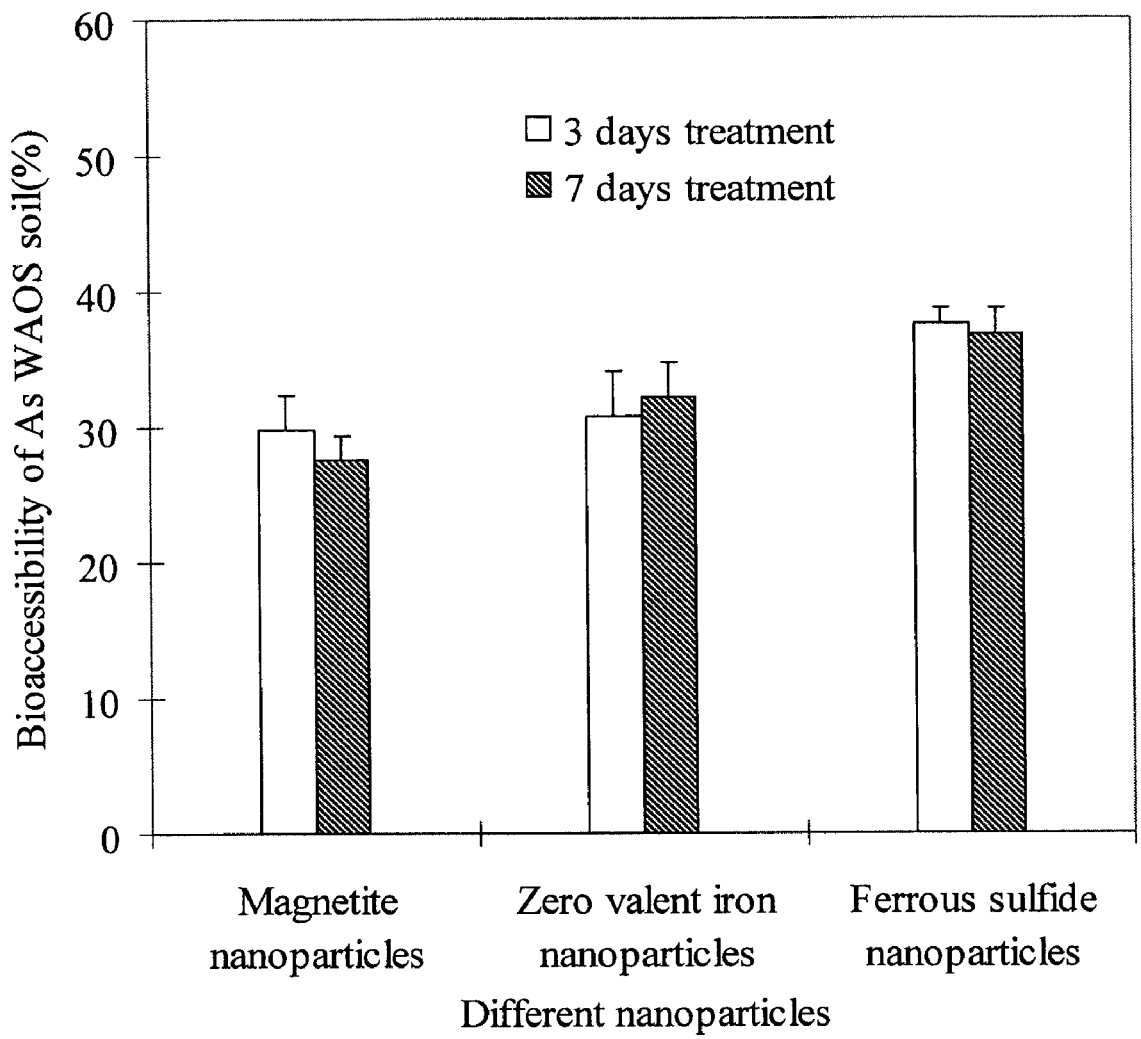
FIG. 28 is a graph illustrating a comparison of As bioaccessibility of WAOS soil samples for 3 and 7 days treatment by different iron based nanoparticles.
Figure 29:
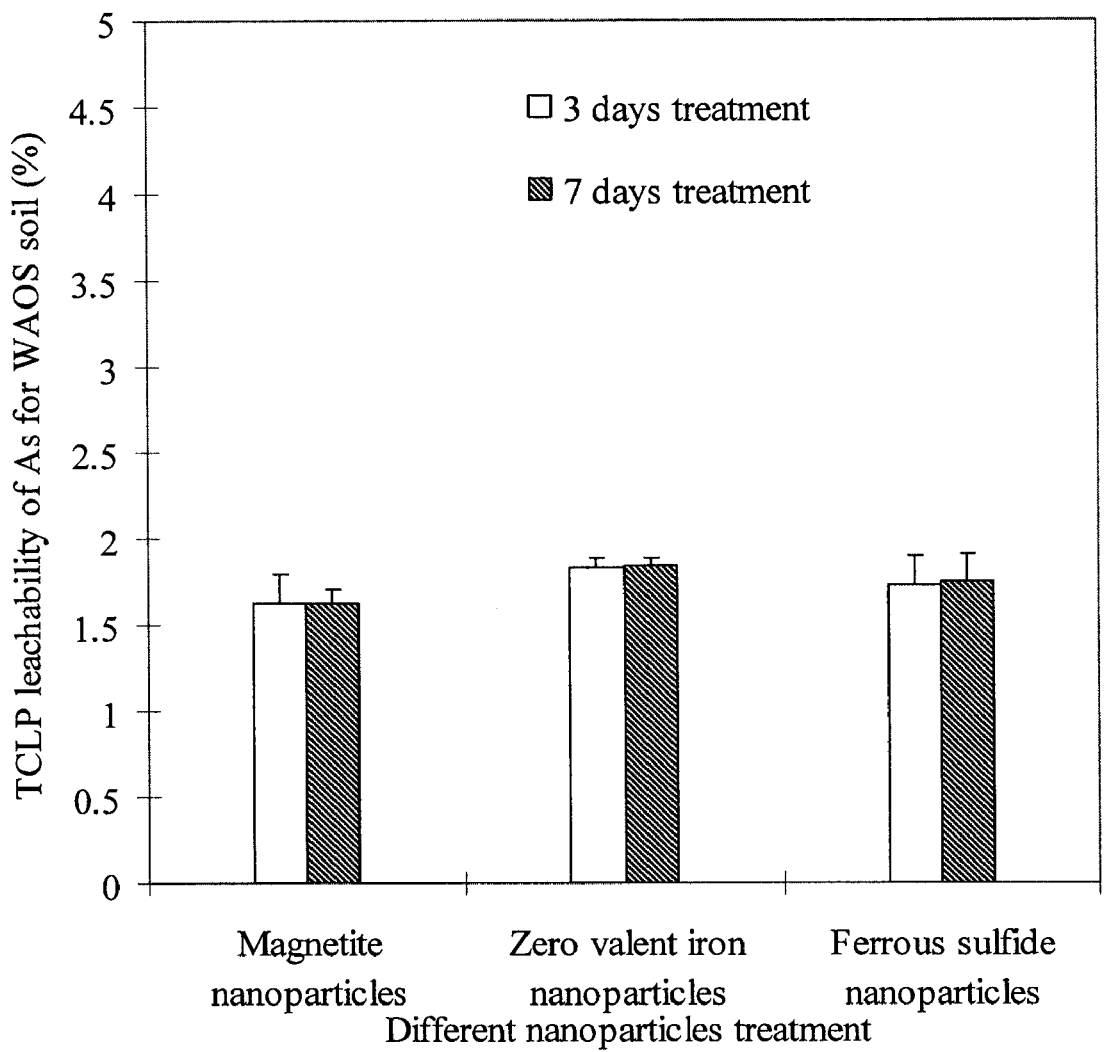
FIG. 29 is a graph illustrating a comparison of As leachability of WAOS soil samples for 3 and 7 days treatment by different iron based nanoparticles.
Figure 30:
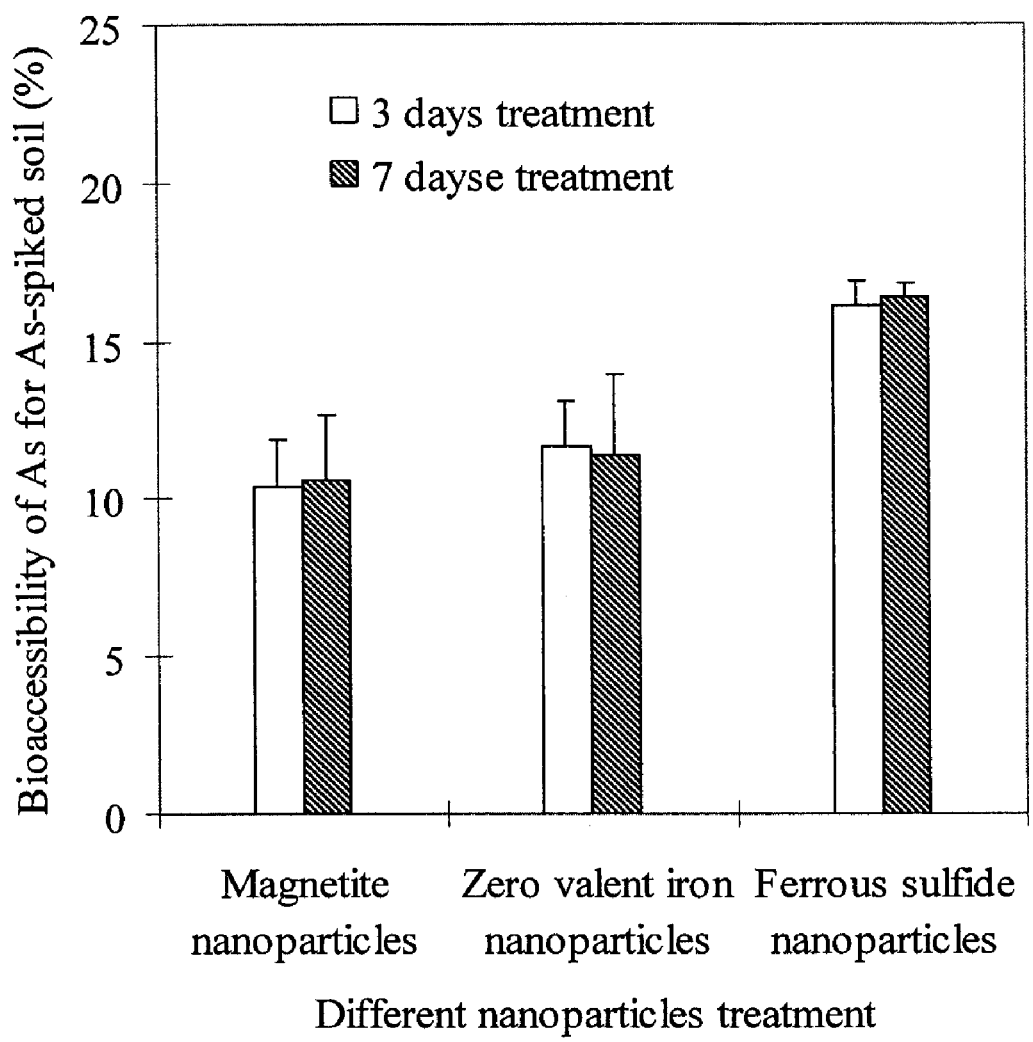
FIG. 30 is a graph illustrating a comparison of As bioaccessibility of As-spiking soil samples for 3 and 7 days treatment by different iron based nanoparticles.
Figure 31:
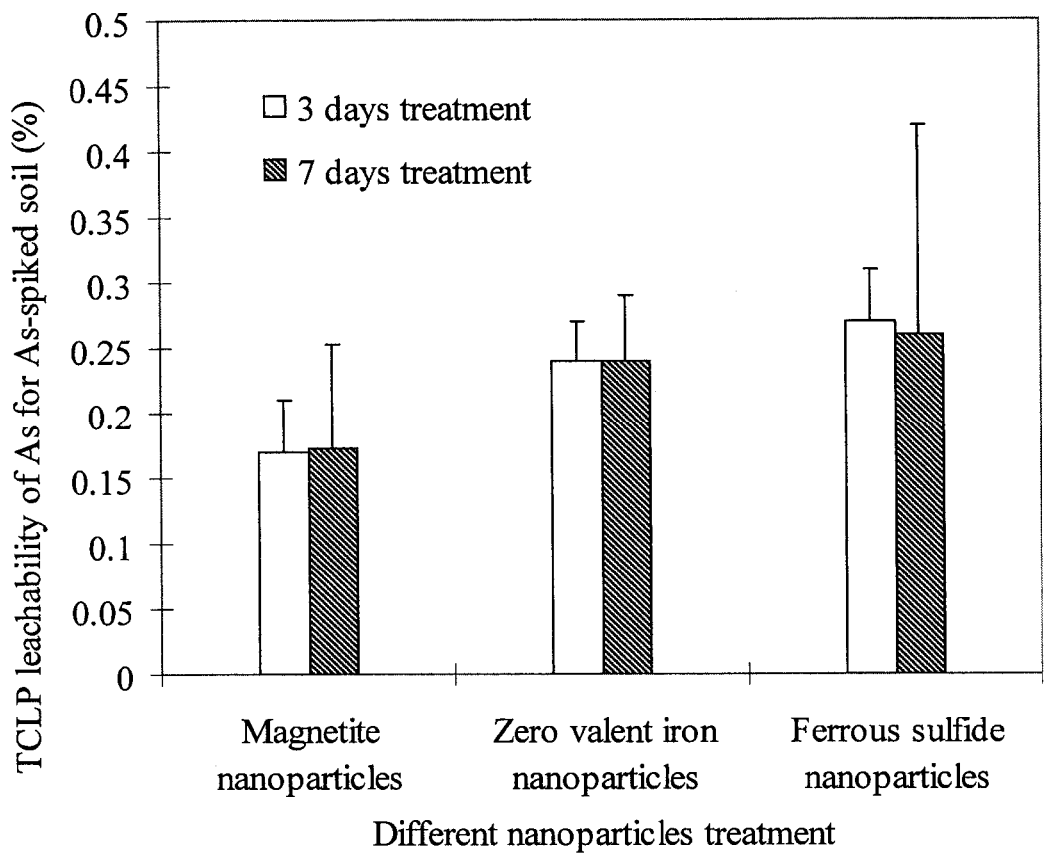
FIG. 31 is a graph illustrating a comparison of As leachability of As-spiking soil samples for 3 and 7 days treatment by different iron based nanoparticles.

The initial TCLP leachability for both of the soils was quite low. The results were showed by FIG. 26 and 27. TCLP leachability is the As percent in the leachate vs. the total As content. The initial TCLP leachability for the untreated range soil was 0.51% and 3.28% for the untreated WAOS soil. This result was in accord with those reported by Akhter et al. (2000), they studied As-contaminated soil from industrial sites. No TCLP leachates showed arsenic concentrations as high as 5 mg/L, which is the EPA benchmark value for a hazardous waste. When treated at the 100 Fe/As ratio, the leachability of arsenic in the WAOS soils decreased from the initial 3.28±0.78% to 1.63±0.16%, 1.83±0.06%, 1.73±0.17% by $Fe_3O_4$, NVI, FeS nanoparticles, respectively; whereas the leachability for the range soil decreased from the initial 0.51±0.11% to 0.17±0.04%, 0.24±0.03%, 0.27±0.04% by $Fe_3O_4$, NVI, FeS nanoparticles, respectively. For both soils, the As leachability was the lowest when $Fe_3O_4$ nanoparticles were applied. Miller et al. (2000) also observed that As in TCLP liquid was reduced for an As-contaminated soil from 1.42 to 0.26 mg/L by adding iron treatments (added $FeSO_4$) (Miller et al. 2000).

2.4. Effects of Treatment Time

FIGS. 28-31 compare the TCLP and PBET results when the soils were treated for 3 days and 7 days. From these figures, the bioaccessibility and leachability of As for 100:1 Fe/As molar ratio by 3 or 7 days treatment are comparable. A student t-test revealed no significant difference between the results from the two treatment times. Earlier, Subacz (2004) observed that the bioaccessibility of contaminated soils when amended with $FeCl_3$ for 3 days and 7 days differed significantly. These results suggest that the stabilized nanoparticles offer rather fast mass transfer and reaction kinetics. Most of adsorption of arsenate occurred in one hour for nano zero valent iron groundwater treatments (Kanel et al. 2006). And the As adsorption reaction on nanoscale NVI were more quick than on micron ZVI.

2.5. Mechanisms of Arsence Immobilization by Iron-Based Nanoparticles

The mechanisms for arsenic sorption by iron oxides have been studied extensively. Waychunas et al. (2005) described the adsorption mechanism of nanoscale iron oxides in soils and sediments, they concluded that nanoscale iron oxides have bigger surface area than microscale iron oxides to occur surface complexation reaction. Gao and Mucci stated that surface complexation is the main reaction mechanism for arsenic uptake by iron oxides (equations 28-32).

$$\mathrm{>FeOH + H^+ \rightarrow >FeOH_2^+} \quad (28)$$

$$\mathrm{>FeOH \rightarrow >FeO^- + H^+} \quad (29)$$

$$\mathrm{>FeOH + H_2AsO_4^- \rightarrow >FeAsO_4^{2-} + H^+ + H_2O} \quad (30)$$

$$\mathrm{>FeOH + H_2AsO_4^- \rightarrow >FeAsO_4H^- + H_2O} \quad (31)$$

$$\mathrm{>FeOH + H_2AsO_4^- + H^+ \rightarrow >FeAsO_4^{2-}H_2 + H_2O} \quad (32)$$

Previous work reported that zero-valent iron nanoparticles react with both contaminants and dissolved oxygen as well as water (Ponder et al. 2001). After the oxidation of zero-valent iron, an iron oxides layer forms at the surface of zero-valent iron particles, whereas some $Fe^{2+}$ or $Fe^{3+}$ ions can release into the aqueous phase. Cornell and Schwertmann (1996) proposed that iron oxides form a passivation of the surface if the surface sites become saturated with iron oxides (equation 33-36). Arsenic, both arsenite and arsenate can be adsorbed on the surface of iron oxide. Jegadeesan et al. (2005) also proposed adsorption of arsenic on the corroded iron surface is the main mechanism of arsenite removal by nanoscale NVI from groundwater. Nanoscale zero-valent iron has a structure which 19% were in zero valent state with a coat of 81% iron oxides (Kanel et al. 2006). Kanel et al. also confirmed that nanoscale zero-valent iron and arsenate forms an inner-sphere surface complexation, 99% arsenate was adsorbed by nanoscale zero-valent iron in one hour. Bang et al. (2005) claimed that arsenic can also be removed by $Fe^0$ through reducing arsenite and arsenate to zerovalent arsenic, which is insoluble in water.

$$\mathrm{Fe^0 + 2H_2O \rightarrow Fe^{2+} + H_2(g) + 2OH^-} \quad (33)$$

$$\mathrm{4Fe^{2+} + 4H_2O + O_2 \rightarrow 4Fe^{3+} + 8OH^-} \quad (34)$$

$$\mathrm{Fe^{2+} - e \rightarrow Fe^{3+}} \quad (35)$$

$$\mathrm{Fe^{3+} + 2H_2O \rightarrow FeOOH + 3H^+} \quad (36)$$

Arsenic concentrations typically decrease under anoxic conditions by sulfide minerals (Bostick et al. 2004). Arsenic sorption on FeS was studied by (Bostick and Fendorf 2003) with X-ray absorption spectroscopy. They proposed eqn (37) as the main reaction for arsenite removal by FeS, which was supported by their XRD results. Nanoscale FeS particles have greater surface area, the sorption of arsenic on FeS nanoparticles can explain the immobilization of arsenic.

$$\mathrm{3FeS + H_3AsO_3 \rightarrow FeS_2 + FeAsS + Fe(OH)_3} \quad (37)$$

3.0. Conclusions

The results of this investigation suggest that iron-based nanoparticles can be added to soils to decrease As bioaccessibility, leachability and the potential of bioavailability. The starch-stabilized nanoparticles were found effective to reduce both TCLP-leachability and PBET-bioaccessibility of As in As-contaminated soils. The bioaccessibility and leachability decrease with increasing Fe/As molar ratio. After three days treatments, the bioaccessibility of As decreased from an initial 71.3±3.1% to 29.8±3.1%, 30.9±3.2%, 37.6±1.2% for Fe/As ratio 100:1 $Fe_3O_4$, NVI, FeS nanoparticles, respectively, and for the 100 Fe/As ratio, the leachability of arsenic of in a range soil decreased from an initial 0.51±0.11% to 0.17±0.04%, 0.24±0.03%, 0.27±0.04% by $Fe_3O_4$, NVI, FeS Nanoparticles, respectively. $Fe_3O_4$ nanoparticles worked better than the other two nanoparticles in reducing the bioaccessibility and leachability. No significant difference in the effectiveness was evident between 3 days and 7 days treatments. Compare to two soils, the treatment was more effective for the range soil which has much lower iron content. These results suggest that stabilized nanoparticles may serve as alternative media for in situ immobilization of arsenic in soils, especially soils with high As concentration and low Fe content.

TABLE 4 pH change for different molar ration treatments

| Fe/As molar ratio | Initial pH | Control samples* (0) | 5 | 10 | 25 | 50 | 75 | 100 |
|---|---|---|---|---|---|---|---|---|
| WAOS-NVI* | | 6.73-6.89 | 6.74 | 6.71 | 6.73 | 6.82 | 6.79 | 6.89 |
| WAOS-$Fe_3O_4$ | 6.75 | 6.73-6.89 | 7.03 | 7.15 | 7.17 | 7.19 | 7.26 | 7.37 |
| WAOS-FeS | | | 6.64 | 6.71 | 6.67 | 6.78 | 6.86 | 6.95 |

TABLE 4-continued pH change for different molar ration treatments

| Fe/As molar ratio | Initial pH | Control samples* (0) | 5 | 10 | 25 | 50 | 75 | 100 |
|---|---|---|---|---|---|---|---|---|
| As-spiked-NVI | | | 4.78 | 4.86 | 4.82 | 4.91 | 4.89 | 5.02 |
| As-spiked-Fe$_3$O$_4$ | 4.83 | 4.83-4.93 | 4.96 | 5.03 | 5.04 | 5.12 | 5.17 | 5.35 |
| As-spiked-FeS | | | 4.81 | 4.91 | 4.89 | 4.87 | 4.94 | 5.03 |

*Control samples: for different soil/solution ratio and starch solution.
*WAOS-NVI: It is WAOS soil and NVI treatment.

We claim:

1. A method of remediating an inorganic chemical toxin from a contaminated site, comprising the steps of:
   (a) providing a composition comprising an aqueous carrier, stabilized zero valent iron nanoparticles dispersed in the aqueous carrier and a stabilizer comprising carboxymethyl cellulose to control the dispersibility of the zero valent iron nanoparticles in the aqueous carrier; and
   (b) delivering an effective amount of said composition to a contaminated site so that said zero valent iron nanoparticles remediate one or more inorganic chemical toxin in said site.

2. The method of claim 1 wherein the step of delivering said composition comprises mixing said composition with said contaminated site.

3. The method of claim 1 wherein the step of delivering said composition comprises injecting said composition into said contaminated site.

4. The method of claim 1 wherein the step of delivering said composition comprises spraying said composition onto said contaminated site.

5. The method of claim 1 wherein said contaminated site comprises soil.

6. The method of claim 1 wherein said contaminated site comprises sediment.

7. The method of claim 1 wherein said contaminated site comprises solid and hazardous wastes.

8. The method of claim 1 wherein said contaminated site comprises ground water.

9. The method of claim 1 wherein said contaminated site comprises brine.

10. The method of claim 1 wherein said contaminated site comprises surface water.

11. The method of claim 1 wherein said one or more inorganic chemical toxin is selected from the group consisting of an arsenate, a nitrate, a chromate, a perchlorate, and mixtures thereof.

12. The method of claim 1 wherein said one or more toxic inorganic chemical toxin is an arsenate selected from the group consisting of lithium arsenate, sodium arsenate, potassium arsenate, magnesium arsenate, calcium arsenate, ammonium arsenate, lead arsenate, and mixtures thereof.

13. The method of claim 1 wherein said one or more inorganic chemical toxin is a nitrate selected from the group consisting of lithium nitrate, sodium nitrate, potassium nitrate, magnesium nitrate, calcium nitrate, ammonium nitrate, lead nitrate, and mixtures thereof.

14. The method of claim 1 wherein said inorganic chemical toxin is a chromate selected from the group consisting of lithium chromate, sodium chromate, potassium chromate, magnesium chromate, calcium chromate, ammonium chromate, lead chromate, and mixtures thereof.

15. The method of claim 1 wherein said inorganic chemical toxin is a perchlorate selected from the group consisting of lithium perchlorate, sodium perchlorate, potassium perchlorate, magnesium perchlorate, calcium perchlorate, ammonium perchlorate, lead perchlorate, and mixtures thereof.

16. The method of claim 1 wherein said zero valent iron nanoparticles have a particle size ranging from about 1 nm to about 200 nm.

17. The method of claim 1 wherein said composition comprises 0.05 to 1 g/L of the stabilized zero valent iron nanoparticles.

18. The method of claim 1 wherein the stabilizer comprises carboxymethyl cellulose.

19. The method of claim 1 wherein said zero valent iron nanoparticles are prepared in the aqueous carrier by a method comprising reducing Fe(II) or Fe(III) to Fe(0).

20. The method of claim 1 further comprising after step (b) treating said composition with a reducing agent.

21. A method of remediating an inorganic chemical toxin from a contaminated site, comprising the steps of:
   (a) providing a composition comprising an aqueous carrier, stabilized zero valent iron nanoparticles having a particle size ranging from 1 nm to 100 nm dispersed in the aqueous carrier and a stabilizer comprising carboxymethyl cellulose to control the dispersibility of the zero valent iron nanoparticles in the aqueous carrier; and
   (b) delivering an effective amount of said composition to a contaminated site so that said zero valent iron nanoparticles remediate one or more inorganic chemical toxin in said site.

22. A method of remediating an inorganic chemical toxin from a contaminated site, comprising the steps of:
   (a) preparing a composition comprising dispersed and stabilized zero valent iron nanoparticles from a mixture comprising:
      (i) water;
      (ii) iron salt;
      (iii) carboxymethyl cellulose; and
      (iv) a reducing agent;
   (a) delivering an effective amount of said composition to a contaminated site so that said zero valent iron nanoparticles remediate one or more inorganic chemical toxin in said site.

* * * * *

UNITED STATES PATENT AND TRADEMARK OFFICE
Certificate

Patent No. 7,635,236 B2                                Patented: December 22, 2009

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Dongye Zhao, Auburn, AL (US); Yinhui Xu, Lake Mary, FL (US); and Zhong Xiong, Irvine, CA (US).

Signed and Sealed this Eleventh Day of March 2014.

<div align="right">

DAVID BAGNELL
*Supervisory Patent Examiner*
Art Unit 3672
Technology Center 3600

</div>